United States Patent
Dravida et al.

(10) Patent No.: US 8,139,593 B2
(45) Date of Patent: Mar. 20, 2012

(54) MEMORY MANAGEMENT FOR HIGH SPEED MEDIA ACCESS CONTROL

(75) Inventors: Subrahmanyam Dravida, Shrewsbury, MA (US); Sriram Narayan, Westford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 11/694,408

(22) Filed: Mar. 30, 2007

(65) Prior Publication Data

US 2007/0230493 A1 Oct. 4, 2007

Related U.S. Application Data

(60) Provisional application No. 60/787,915, filed on Mar. 31, 2006.

(51) Int. Cl.
*H04L 12/28* (2006.01)
*H04L 12/56* (2006.01)

(52) U.S. Cl. .......... 370/412; 370/351; 359/115

(58) Field of Classification Search ........... 370/412
See application file for complete search history.

(56) References Cited

U.S. PATENT DOCUMENTS

| | | | |
|---|---|---|---|
| 6,426,943 B1 * | 7/2002 | Spinney et al. | 370/235 |
| 6,473,425 B1 | 10/2002 | Bellaton et al. | |
| 6,606,301 B1 * | 8/2003 | Muller et al. | 370/230 |
| 6,832,261 B1 | 12/2004 | Westbrook et al. | |
| 6,959,002 B2 | 10/2005 | Wynne et al. | |
| 7,310,337 B2 | 12/2007 | Katti et al. | |
| 7,457,313 B2 | 11/2008 | Patrick | |
| 7,580,355 B2 | 8/2009 | Zhao et al. | |
| 2003/0016686 A1 | 1/2003 | Wynne et al. | |
| 2005/0055406 A1 | 3/2005 | Singhai et al. | |
| 2005/0147034 A1 | 7/2005 | Zhao et al. | |

(Continued)

FOREIGN PATENT DOCUMENTS

GB 2429080 2/2007

(Continued)

OTHER PUBLICATIONS

Kumar, A., et al.: "Integrated Scheduling and Buffer Management Scheme for Input Queued Switches Under Extreme Traffic Conditions" IEEE, Jul. 2005, pp. 1020-1025, ISBN: 0-7803-8938.

(Continued)

*Primary Examiner* — Daniel Wu
*Assistant Examiner* — Frederick Ott
(74) *Attorney, Agent, or Firm* — Liberty E. Mann

(57) ABSTRACT

Aspects disclosed herein address the need in the art for memory management for high speed media access control. A packet buffer may store packets with a first data structure, comprising the packet length, sequence number, and a pointer to a second data structure. Packet data may be stored in a linked list of one or more second data structures. Transmit and receive queues may be formed using linked lists or arrays of the first data structures. Memory locations for storing first and second data structures may be kept in lists indicating free locations for the respective data structure types. A flexible memory architecture is disclosed in which two configurations may be selected. In a first configuration, a first memory comprises per-flow parameters for multiple flows, and a second memory comprises a packet buffer. In a second configuration, the first memory comprises per-flow pointers to per-flow parameters in the second memory. The packet buffer resides in a third memory. Various other aspects are also presented.

33 Claims, 46 Drawing Sheets

U.S. PATENT DOCUMENTS

| | | |
|---|---|---|
| 2005/0175014 A1 | 8/2005 | Patrick |
| 2006/0168313 A1 | 7/2006 | Robinson |

FOREIGN PATENT DOCUMENTS

| | | |
|---|---|---|
| JP | 4156030 A | 5/1992 |
| JP | 4237238 | 8/1992 |
| JP | 6237270 A | 8/1994 |
| JP | 9171492 A | 6/1997 |
| JP | 11234339 | 8/1999 |
| JP | 2000242588 A | 9/2000 |
| JP | 2003174475 A | 6/2003 |
| JP | 2003228515 A | 8/2003 |
| RU | 2234806 | 8/2004 |
| RU | 2254686 | 6/2005 |
| WO | 9514269 | 5/1995 |
| WO | 9612235 | 4/1996 |
| WO | 03043303 | 5/2003 |
| WO | WO2004066571 A1 | 8/2004 |
| WO | 2005043275 | 5/2005 |

OTHER PUBLICATIONS

International Search Report—PCT/US07/065678, International Search Authority—European Patent Office—Oct. 19, 2007.

European Search Report—EP11150416—Search Authority—Munich—Mar. 14, 2011.

Written Opinion—PCT/US2007/065678 International Search Authority European Patent Office Oct. 19, 2007.

\* cited by examiner

CONTENTS OF TX FLOW STATE TABLE

PACKET TYPE
*1102*

SECURITY POLICY
*1104*

RECEIVER ADDRESS
*1106*

SEQUENCE NUMBER
*1108*

MIC KEY
*1110*

FRAME CONTROL
*1112*

*PER FLOW*

QOS CONTROL
*1114*

LIFETIME
*1116*

MAX BUFFER OCCUPANCY
*1118*

MAX PACKETS PER FLOW
*1120*

CUMULATIVE PACKETS FOR THE FLOW
*1122*

TAIL Q POINTER
*1124*

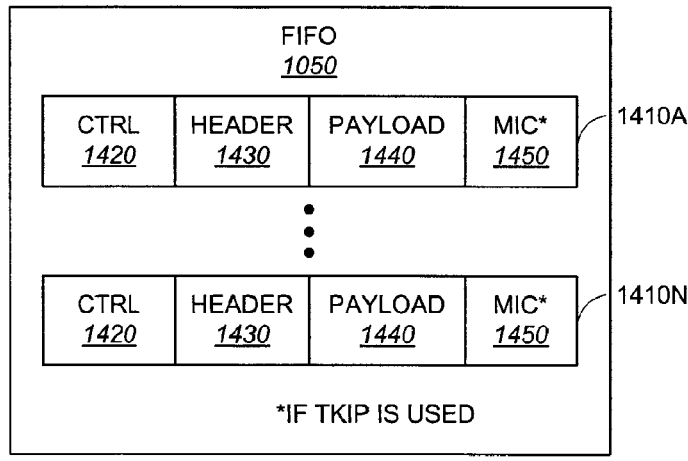
FIG. 14   [CTRL IS STRIPPED OFF BEFORE WRITE]
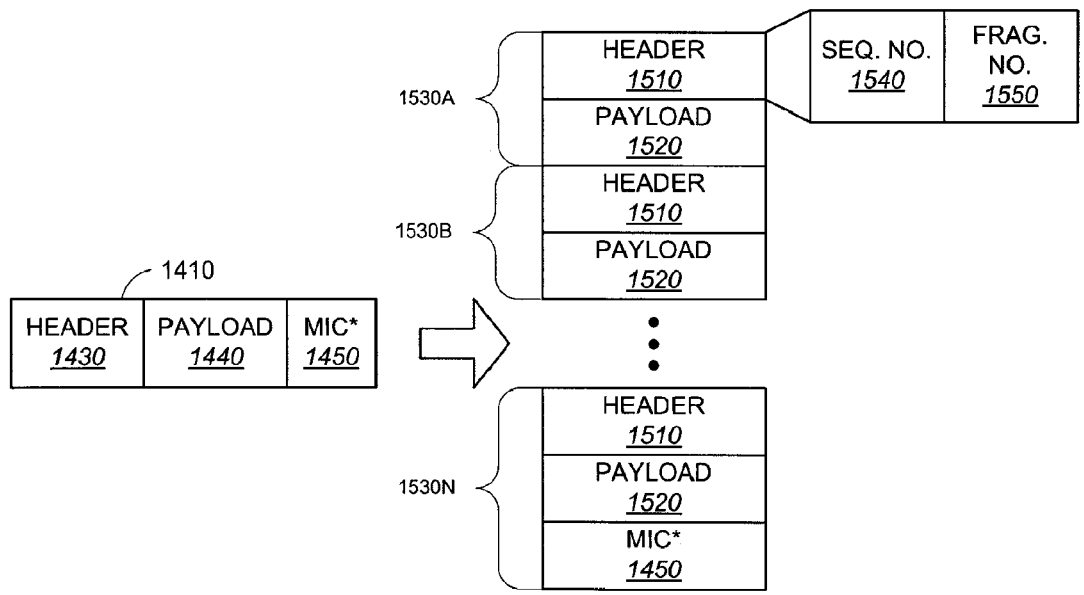
FIG. 15   *IF TKIP IS USED

DECISION STATE TABLE

| FLOW ID | 10 BITS | 8 BITS | 8 BITS | 1 BIT | 2 BITS | |
|---|---|---|---|---|---|---|
| 0 | DECISION OFFSET 4012A | HANDOFF COUNT 4014A | NEXT POINTER 4016A | IN QUEUE 4018A | PRIORITY 4020A | 4010A |
| ⋮ | | | ⋮ | | | |
| N | DECISION OFFSET 4012N | HANDOFF COUNT 4014N | NEXT POINTER 4016N | IN QUEUE 4018N | PRIORITY 4020N | 4010N |

Q ARRAY STATE TABLE

| PRIORITY | 8 BITS | 8 BITS | 8 BITS | |
|---|---|---|---|---|
| 0 | Q COUNT 4112A | HEAD POINTER 4114A | TAIL POINTER 4116A | 4110A |
| ⋮ | | ⋮ | | |
| M | Q COUNT 4112M | HEAD POINTER 4114M | TAIL POINTER 4116M | 4110M |

4100

FIG. 41

MEMORY MANAGEMENT FOR HIGH SPEED MEDIA ACCESS CONTROL

CLAIM OF PRIORITY UNDER 35 U.S.C. §119

The present Application for Patent claims priority to Provisional Application No. 60/787,915 entitled "High Speed Media Access Control" filed Mar. 31, 2006, and assigned to the assignee hereof and hereby expressly incorporated by reference herein.

BACKGROUND

1. Field

The present disclosure relates generally to wireless communications, and to high speed media access control.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon the Quality of Service (QoS) shortcomings of previous 802.11 standards.

802.11(n) specifications are now being introduced, which define high speed wireless networks and MAC protocols for operating with them. The previous 802.11 standards have been concerned with primarily data transfer, browsing and email type of applications. 802.11(n) is intended to serve multi-media distribution applications which require high throughput, robustness of performance and Quality of Service. With these requirements comes the need for efficient implementations and techniques for providing Quality of Service and high speed operability. There is therefore a need in the art for efficient high speed media access control.

SUMMARY

Aspects disclosed herein address the need in the art for efficient high speed media access control.

According to one aspect, an apparatus is described which includes a first data structure associated with a packet, a second data structure comprising data from the associated packet, and wherein the first data structure comprises, a length field indicating the length of the associated packet, a sequence number field indicating the sequence number of the associated packet, a second data structure pointer field indicating the location in a packet buffer of the second data structure.

According to another aspect, an first data structure is described, which is operable with a second data structure comprising data from an associated packet, and which includes a length field indicating the length of the associated packet, a sequence number field indicating the sequence number of the associated packet, and a pointer field storing a location in the memory of the second data structure.

According to another aspect, a method is disclosed for storing in a first data structure in a packet buffer the length of a first packet, the sequence number of the packet, and a second packet buffer location of a second data structure in the packet buffer, and storing data from the first packet in the second data structure identified by the stored second packet buffer location.

According to another aspect, a method is disclosed for storing a plurality of packets in a packet buffer, each packet stored with an associated first data structure and one or more associated second data structures, the one or more second data structures formed into a linked list; wherein each first data structure comprises a length field indicating the length of the associated packet, a sequence number field indicating the sequence number of the associated packet, and a second data structure pointer field indicating the location in a packet buffer of the first of the one or more second data structures; and wherein each second data structure comprises data from the associated packet and a next second data structure pointer field indicating the next second structure in the respective linked list, if any.

According to another aspect, an apparatus is described which includes means for storing in a first data structure in a packet buffer the length of a first packet, the sequence number of the packet, and a second packet buffer location of a second data structure in the packet buffer, and means for storing data from the first packet in the second data structure identified by the stored second packet buffer location.

According to another aspect, an apparatus is described which includes a first data structure associated with a packet, and one or more second data structures comprising data from the associated packet; and wherein the first data structure comprises a length field indicating the length of the associated packet, a sequence number field indicating the sequence number of the associated packet, and a second data structure pointer field indicating the location in a packet buffer of one of the second data structures; and means for storing the packet in one or more of the second data structures.

According to another aspect, an apparatus is described which includes a first memory, configured in a first mode to store one or more parameters for each of a plurality of communication flows and configured in a second mode to store a pointer for each of the plurality of communication flows, each pointer indicating a location associated with the respective communication flow; a second memory, configured in the first mode to store packets for each of the plurality of communication flows and configured in the second mode to store a plurality of sets of one or more parameters for each of the plurality of communication flows, each set of one or more parameters stored in the location indicated by the pointer associated with the respective communication flow; a memory interface operable with a third memory, configured in the second mode to be operative to store packets for each of the plurality of communication flows; and a processor selecting a selected mode as the first mode or the second mode, configuring the first memory according to the selected mode, configuring the second memory according to the selected mode, and configuring the memory interface according to the selected mode.

According to another aspect, a wireless communication device is described which includes a first integrated circuit, comprising a first memory, configured in a first mode to store one or more parameters for each of a plurality of communication flows and configured in a second mode to store a pointer for each of the plurality of communication flows, each pointer indicating a location associated with the respective communication flow; a second memory, configured in the first mode to store packets for each of the plurality of communication flows and configured in the second mode to store a plurality of sets of one or more parameters for each of the plurality of communication flows, each set of one or more parameters stored in the location indicated by the pointer associated with the respective communication flow; a memory interface operable with a third memory, configured in the second mode to be operative to store packets for each of the plurality of communication flows; and a processor selecting a selected mode as the first mode or the second mode, configuring the first memory according to the selected mode, configuring the second memory according to the selected mode, and configuring the memory interface according to the selected mode; and a second integrated circuit comprising a third memory storing packets for each of the plurality of communication flows, coupled with the memory interface of the first integrated circuit.

According to another aspect, a wireless communication device is described which includes a first memory storing one or more parameters for each of a plurality of communication flows; and a second memory storing packets for each of the plurality of communication flows, comprising a first data structure associated with a packet; and a second data structure comprising data from the associated packet; and wherein the first data structure comprises a length field indicating the length of the associated packet, a sequence number field indicating the sequence number of the associated packet, and a second data structure pointer field indicating the location in the second memory of the second data structure.

According to another aspect, a wireless communication device is described which includes a first memory storing a pointer for each of a plurality of communication flows, each pointer indicating a location associated with the respective communication flow; and a second memory storing a plurality of sets of one or more parameters for each of the plurality of communication flows, each set of one or more parameters stored in the location indicated by the pointer associated with the respective communication flow; and a third memory storing packets for each of the plurality of communication flows.

According to another aspect, an apparatus is described which includes means for selecting a first or second mode, means for configuring a first memory in a first mode to store one or more parameters for each of a plurality of communication flows, means for configuring the first memory in a second mode to store a pointer for each of the plurality of communication flows, each pointer indicating a location associated with the respective communication flow, means for configuring a second memory in the first mode to store packets for each of the plurality of communication flows, means for configuring the second memory in the second mode to store a plurality of sets of one or more parameters for each of the plurality of communication flows, each set of one or more parameters stored in the location indicated by the pointer associated with the respective communication flow, and means for configuring a memory interface operable with a third memory in the second mode to be operative to store packets for each of the plurality of communication flows.

According to another aspect, computer readable media is described which is operable to perform selecting a first or second mode, configuring a first memory in a first mode to store one or more parameters for each of a plurality of communication flows, configuring the first memory in a second mode to store a pointer for each of the plurality of communication flows, each pointer indicating a location associated with the respective communication flow, configuring a second memory in the first mode to store packets for each of the plurality of communication flows, configuring the second memory in the second mode to store a plurality of sets of one or more parameters for each of the plurality of communication flows, each set of one or more parameters stored in the location indicated by the pointer associated with the respective communication flow, and configuring a memory interface operable with a third memory in the second mode to be operative to store packets for each of the plurality of communication flows.

BRIEF DESCRIPTION OF THE DRAWINGS

FIG. 11 depicts an example embodiment of the contents of a TX flow state table;

FIG. 14 depicts an example embodiment of a FIFO;

FIG. 15 illustrates an example process of breaking a MSDU into one or more fragments;

FIG. 40 illustrates an example decision state table;

FIG. 41 illustrates an example embodiment of a handoff queue;

DETAILED DESCRIPTION

Various aspects will be detailed below, one or more of which may be combined in any given embodiment. Aspects disclosed herein support highly efficient operation with very high bit rate WLAN physical layers (or similar applications using newly emerging transmission technologies). The example WLAN is operable in two frequency band modes, 20 Mhz and 40 Mhz. It supports bit rates in excess of 100 Mbps (million bits per second) including up to 300 Mbps in channel bandwidths of 20 MHz, and up to 600 Mbps in channel bandwidths of 40 Mhz. Various alternate WLANs are also supported, including those with more than two frequency band modes, and any number of supported bit rates.

Various aspects preserve the simplicity and robustness of the distributed coordination operation of legacy WLAN systems, examples of such systems are found in 802.11 (a-g). The advantages of the various embodiments may be achieved while maintaining backward compatibility with such legacy systems. (Note that, in the description below, 802.11 systems may be described as example legacy systems. Those of skill in the art will recognize that the improvements may also be compatible with alternate systems and standards.)

One or more exemplary aspects described herein are set forth in the context of a wireless data communication system. While use within this context is advantageous, different embodiments of the disclosure may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present disclosure. The word "exemplary" is used herein to mean "serving as an example, instance, or illustration." Any embodiment described herein as "exemplary" is not necessarily to be construed as preferred or advantageous over other embodiments.

Figure 1:
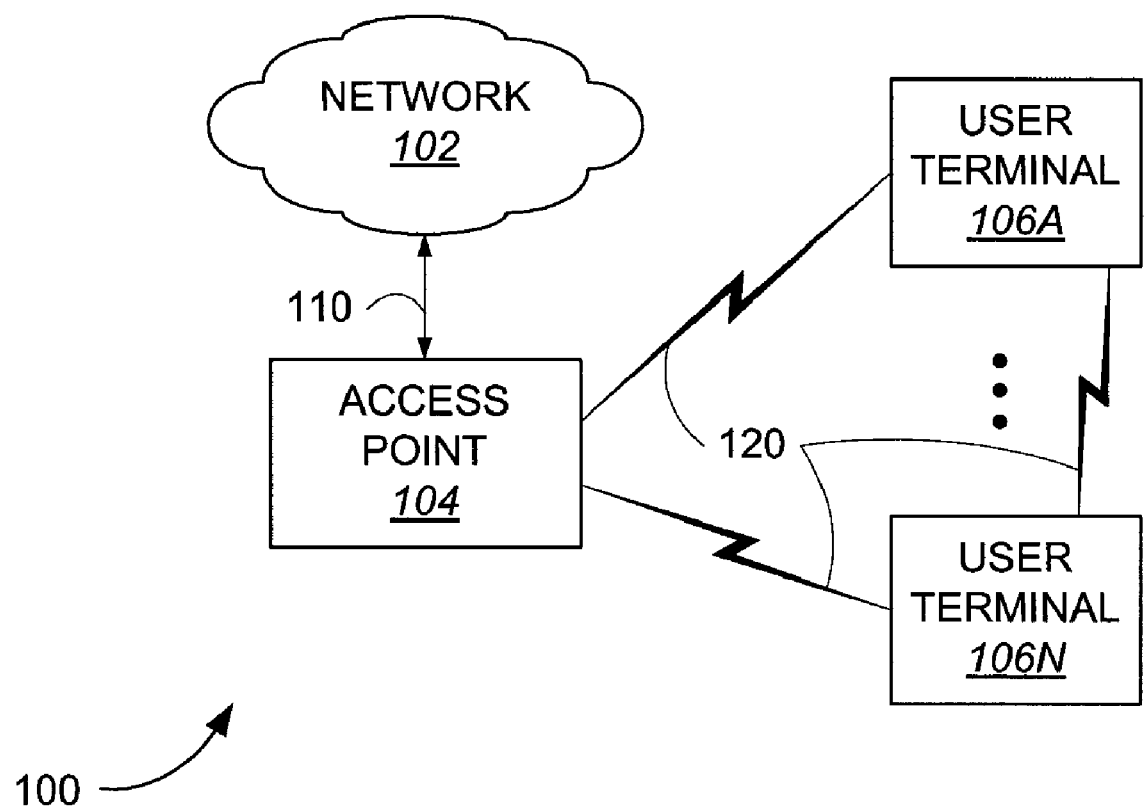
FIG. 1 is a general block diagram of a wireless communication system capable of supporting a number of users.

FIG. 1 illustrates exemplary embodiments of a system 100, comprising an Access Point (AP) 104 connected to one or more User Terminals (UTs) 106A-N. In accordance with 802.11 terminology, in this document the AP and the UTs are also referred to as stations or STAs. The techniques and aspects described herein are also applicable to other types of systems (examples include the cellular standards detailed above). As used herein, the term base station can be used interchangeably with the term access point. The term user terminal can be used interchangeably with the terms user equipment (UE), subscriber unit, subscriber station, access terminal, remote terminal, mobile station, or other corresponding terms known in the art. The term mobile station encompasses fixed wireless applications.

Note also that user terminals 106 may communicate directly with one another. The Direct Link Protocol (DLP), introduced by 802.11(e), allows a STA to forward frames directly to another destination STA within a Basic Service Set (BSS) (controlled by the same AP). In various embodiments, as known in the art, an access point is not required. For example, an Independent BSS (IBSS) may be formed with any combination of STAs. Ad hoc networks of user terminals may be formed which communicate with each other via wireless network 120 using any of the myriad communication formats known in the art.

The AP and the UTs communicate via Wireless Local Area Network (WLAN) 120. In the embodiments detailed below, WLAN 120 is a high speed MIMO OFDM system. However, WLAN 120 may be any wireless LAN. Optionally, access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

System 100 may be deployed with a centralized AP 104. All UTs 106 communicate with the AP in one embodiment. In an alternate embodiment, direct peer-to-peer communication between two UTs may be accommodated, with modifications to the system, as will be apparent to those of skill in the art, examples of which are illustrated below. Any station may be set up as a designated AP in embodiments supporting designated access points. Access may be managed by an AP, or ad hoc (i.e. contention based).

In one embodiment, AP 104 provides Ethernet adaptation. In this case, an IP router may be deployed in addition to the AP to provide connection to network 102 (details not shown). Ethernet frames may be transferred between the router and the UTs 106 over the WLAN sub-network (detailed below). Ethernet adaptation and connectivity are well known in the art.

In an alternate embodiment, the AP 104 provides IP Adaptation. In this case, the AP acts as a gateway router for the set of connected UTs (details not shown). In this case, IP datagrams may be routed by the AP 104 to and from the UTs 106. IP adaptation and connectivity are well known in the art.

Figure 2:
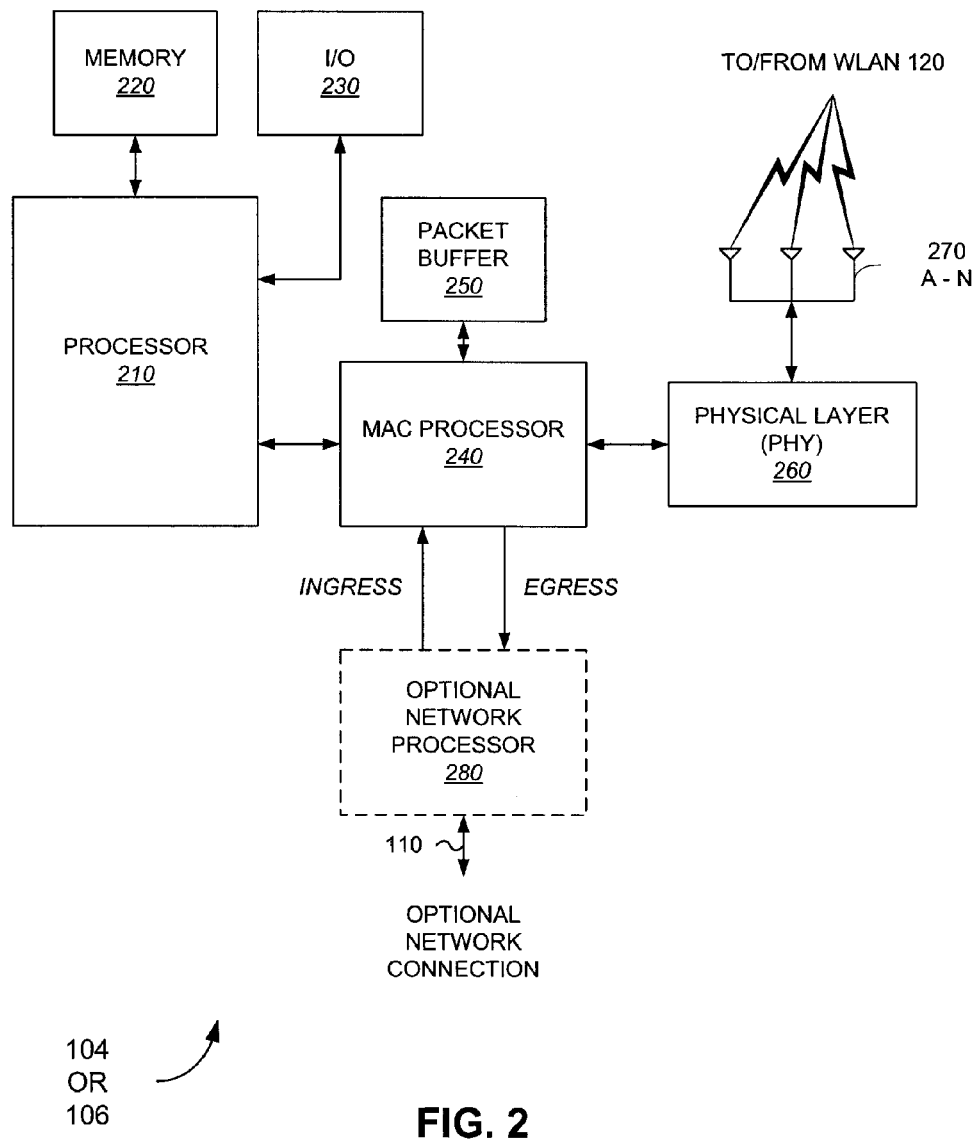
FIG. 2 depicts aspects of a wireless communication device, which may be configured as an access point or user terminal.

FIG. 2 depicts aspects of a wireless communication device, which may be configured as an access point 104 or user terminal 106. A wireless communication device is an example STA, suitable for deployment in system 100.

Processor 210 is deployed to perform a variety of tasks for the wireless communication device, including tasks for performing communications. In this example, processor 210 carries out tasks that are referred to herein as "firmware" tasks. For simplicity, in embodiments detailed below, reference to firmware includes such tasks performed by processor 210, as well as tasks performed in conjunction with various other components or blocks. Processor 210 may be a general-purpose microprocessor, a digital signal processor (DSP), or a special-purpose processor. Processor 210 may be connected with special-purpose hardware to assist in various tasks (details not shown). Various applications may be run on externally connected processors, such as an externally connected computer or over a network connection, may run on an additional processor within wireless communication device 104 or 106 (not shown), or may run on processor 210 itself.

Processor 210 is shown connected with memory 220, which may be used for storing data as well as instructions for performing various procedures and methods described herein, and many others. Those of skill in the art will recognize that memory 220 may be comprised of one or more memory components of various types, that may be embedded in whole or in part within processor 220. I/O 230 is shown connected to processor 210, which may comprise one or more input and/or output functions, examples of which are well known in the art.

Media Access Control (MAC) processor 240 is connected to processor 210. In many of the embodiments detailed below, MAC processor 240 performs high speed processing of packets, i.e. at line speed. In general, lower rate processing, or "firmware" tasks, will be performed by processor 210 in conjunction with "line speed" processing, typically handled by MAC processor 240. MAC processor 240 delivers data for transmission to physical layer (PHY) 260 for transmission on WLAN 120, and processes data from PHY 260, received on WLAN 120. Processor 210 may also receive physical layer data and process data to form packets for outgoing flows (generally in conjunction with MAC processor 240, in examples detailed below). The format of data delivered to and received from PHY 260 will be in accordance with the specification of the communication system or systems supported by the wireless communication device 104 or 106.

MAC processor 240 receives and transmits data via connection 110 according to the physical layer requirements of network 102. An optional network processor 280 may be deployed to receive and transmit according to the physical layer of network 102 on optional network connection 110. The network processor may receive and deliver data to MAC processor 240 using any type of data format. Example data packets are detailed further below (these and alternate data formats will be well known to one of ordinary skill in the art). These data may be referred to herein as flows. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

MAC processor 240 receives flow data, the process of which is referred to as ingress, and stores the flow data packets in packet buffer 250. MAC processor 240 retrieves packets for transmission on WLAN 120, referred to as transmit or TX, and delivers them to PHY 260. Packets received on WLAN 120, referred to as receive or RX, are delivered from PHY 260 to MAC processor 240, which stores them in packet buffer 250. MAC processor 240 retrieves RX packets from packet buffer 250 for delivery on network connection 110 (or optional network processor 280), a process referred to as egress. Example packet buffer 250 embodiments are detailed below. Various embodiments detailed below identify aspects for performing high-speed packet processing for ingress, transmit, receive, and egress.

While ingress and egress are identified with network 110, and RX and TX are identified with WLAN 120, in the example shown, MAC processor 240 may be suitably deployed for operation with any egress or ingress function, as well as any type of receive or transmit function. Flow classification may be performed by a driver, which may be included in processor 210 or network processor 280, or in any other suitable component, as is well known in the art. Various drivers may be deployed to allow MAC processing of a variety of data types, formats, flow classes, etc.

WLAN related control and signaling (i.e. 802.11 or other standards) may also be communicated between the AP and various UTs. MAC Protocol Data Units (MPDUs) encapsulated in Physical layer (PHY) Protocol Data Units (PPDUs) are delivered to and received from PHY 260. An MPDU may also be referred to as a frame. When a single MPDU is encapsulated in a single PPDU, sometimes the PPDU may be referred to as a frame. Alternate embodiments may employ any conversion technique, and terminology may vary in alternate embodiments. Feedback corresponding to various MAC IDs may be returned from PHY 260 for various purposes. Feedback may comprise any physical layer information, including supportable rates for channels (including multicast as well as unicast traffic/packets), modulation format, and various other parameters.

PHY 260 may be any type of transceiver (and may include both a receiver and transmitter, but either may deployed in an alternate embodiment). In one embodiment, PHY 260 includes an Orthogonal Frequency Division Multiplexing (OFDM) transceiver, which may be operated with a Multiple Input Multiple Output (MIMO) or Multiple Input Single Output (MISO) interface.

MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, assigned to the assignee of the present application, and incorporated by reference herein. Alternate embodiments may include Single Input Multiple Output (SIMO) or Single Input Single Output (SISO) systems.

PHY 260 is shown connected with antennas 270 A-N. Any number of antennas may be supported in various embodiments. Antennas 270 may be used to transmit and receive on WLAN 120.

PHY 260 may comprise a spatial processor in communication with each of the one or more antennas 270. The spatial processor may process the data for transmission independently for each antenna or jointly process the received signals on all antennas. Examples of the independent processing may be based on channel estimates, feedback from the UT, channel inversion, or a variety of other techniques known in the art. The processing is performed using any of a variety of spatial processing techniques. Various transceivers of this type may transmit utilizing beam forming, beam steering, eigen-steering, or other spatial techniques to increase throughput to and from a given user terminal. In some embodiments, in which OFDM symbols are transmitted, the spatial processor may comprise sub-spatial processors for processing each of the OFDM sub-carriers (also referred to as tones), or bins.

In an example system, the AP (or any STA, such as a UT) may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. In this case, the pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals throughout the system. The PHY 260 may determine the supportable rate based on whichever spatial processing is being used for the physical link between the AP and the UT. This information may be fed back for use in MAC processing.

Figure 3:
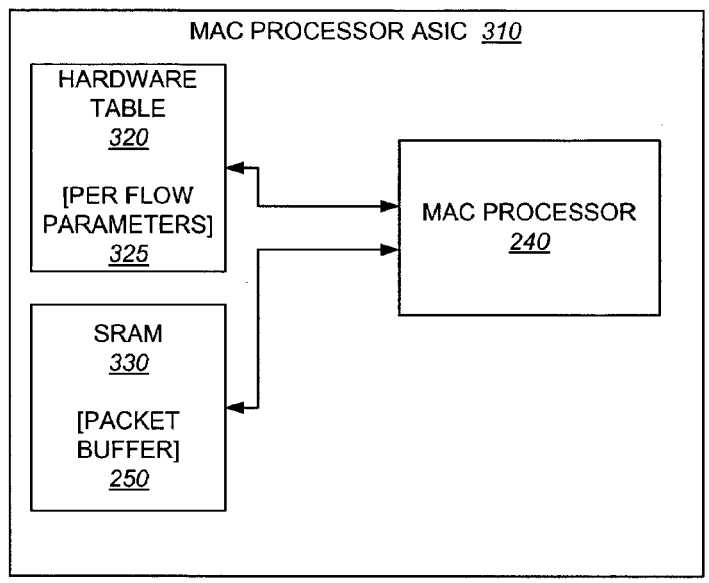
FIG. 3 depicts an embodiment of a MAC processor configured for a user terminal.
Figure 4:
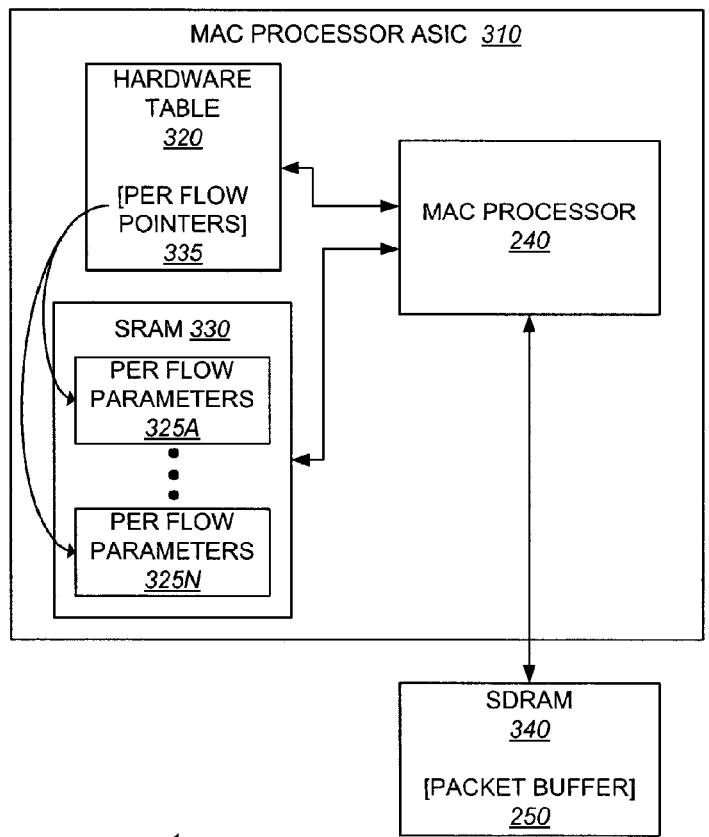
FIG. 4 depicts an embodiment of a MAC processor configured for an access point.

In one aspect, a single ASIC Application specific integrated circuit (ASIC) is provided to support MAC processing in wireless communication devices including both access points and user terminals. FIGS. 3 and 4 illustrate conceptually such an ASIC 310 configured for use in a user terminal 106 and an access point 104, respectively.

In FIG. 3, MAC processor ASIC 310 is shown in an example configuration for a user terminal 106. In this configuration, MAC processor 240, described above, is connected to a hardware table 320. Hardware table 320 contains, among other things, parameters for each flow that is active in the station. Thus, during various MAC processing functions, examples of which are detailed below, MAC processor 240 accesses hardware table 320 to retrieve per flow parameters 325. MAC processor 240 is also connected to SRAM 330. In this configuration, SRAM 330 is adapted to perform the function of packet buffer 250. MAC processor ASIC 310 may comprise various other components, examples of which are detailed below. Of note, in this embodiment, is that packet buffer 250 resides within MAC processor 310. Note that hardware table 320 is shown as a separate block for clarification purposes only. In various embodiments, hardware table 320 and SRAM 330 may both be included within MAC processor 240.

FIG. 4 depicts a MAC processor ASIC 310 configured for use as an access point. This configuration may also be used for a station capable of supporting a higher number of flows and/or higher throughput, a so-called super station. In the examples detailed below, the super station and access point configuration may simply be referred to as an access point or an access point configuration. In this embodiment, MAC processor ASIC 310 comprises MAC processor 240, hardware table 320 and SRAM 330, as in FIG. 3. Again, these components are shown separately for illustration purposes only, and one or more of them may be included in a MAC processor 240. In this configuration, hardware table 320 no longer contains all of the per-flow parameters used for MAC processing. In this case, per flow pointers 335 are contained in hardware table 320, each of which points to respective associated per flow parameters 325, which are stored in SRAM 330. Note that some per flow parameters may also be stored in hardware table 320, if desired. Note that the same processor ASIC 310, comprising the same hardware components shown, can be adapted to either configuration to support different requirements. In this example, SRAM 330 is repurposed from being a packet buffer 250 in STA mode, to being a repository of per flow parameters 325 in access point mode. Thus, MAC processor 240 accesses hardware table 320 for parameters, and, depending on the configuration, will retrieve those parameters or follow a level of indirection to retrieve them from SRAM 330. Firmware (performed by processor 210, for example) may configure the various components of the MAC processor ASIC 310 to perform in a first mode (station mode) or a second mode (access point mode). Various techniques for selecting modes are well known in the art. For example, register settings, mode select signals, and the like, may be used to indicate to one or more components the current configuration state. Furthermore, firmware may populate hardware table 320 and SRAM 330 differently, depending on the configuration selected.

Continuing with FIG. 4, it can be seen that an external memory, SDRAM 340 in this example, is included to perform the function of packet buffer 250. Thus, in access point mode, a greater number of flows may be supported by using SRAM 330 for storing per flow parameters alone (presuming that the hardware table 320 is smaller than SRAM 330). The size of SRAM 330 may be selected to accommodate the requirements of the packet buffer for a wireless communication device in station mode. In one embodiment, this size is also suitable for storing all of the per-flow parameters needed for the number of flows supported by an access point. In an alternate embodiment, SRAM 330 may be sized to support a greater number of flows, which may require a larger SRAM size than would otherwise be needed for the packet buffer. SDRAM 340 may be selected to accommodate the number of flows supported by the access point. Those of skill in the art will recognize how to select suitable sizes for hardware table 320, SRAM 330, and SDRAM 340.

Thus, a single MAC processor ASIC 310 may be designed to support multiple modes. The hardware components may be reused in each mode to provide different functions. More detailed examples of the use of hardware tables and packet buffers are illustrated below. Deploying a single MAC processor ASIC 310, with the ability to be configured as depicted in FIG. 3 allows for smaller size and lower cost. The same MAC processor ASIC 310 may also be used in higher performance devices, such as an access point, or super station, by adding an external SDRAM 340, and reconfiguring MAC processor ASIC 310. Various different sizes of SDRAM 340 may be selected depending on the performance needs of the given configuration.

Figure 5:
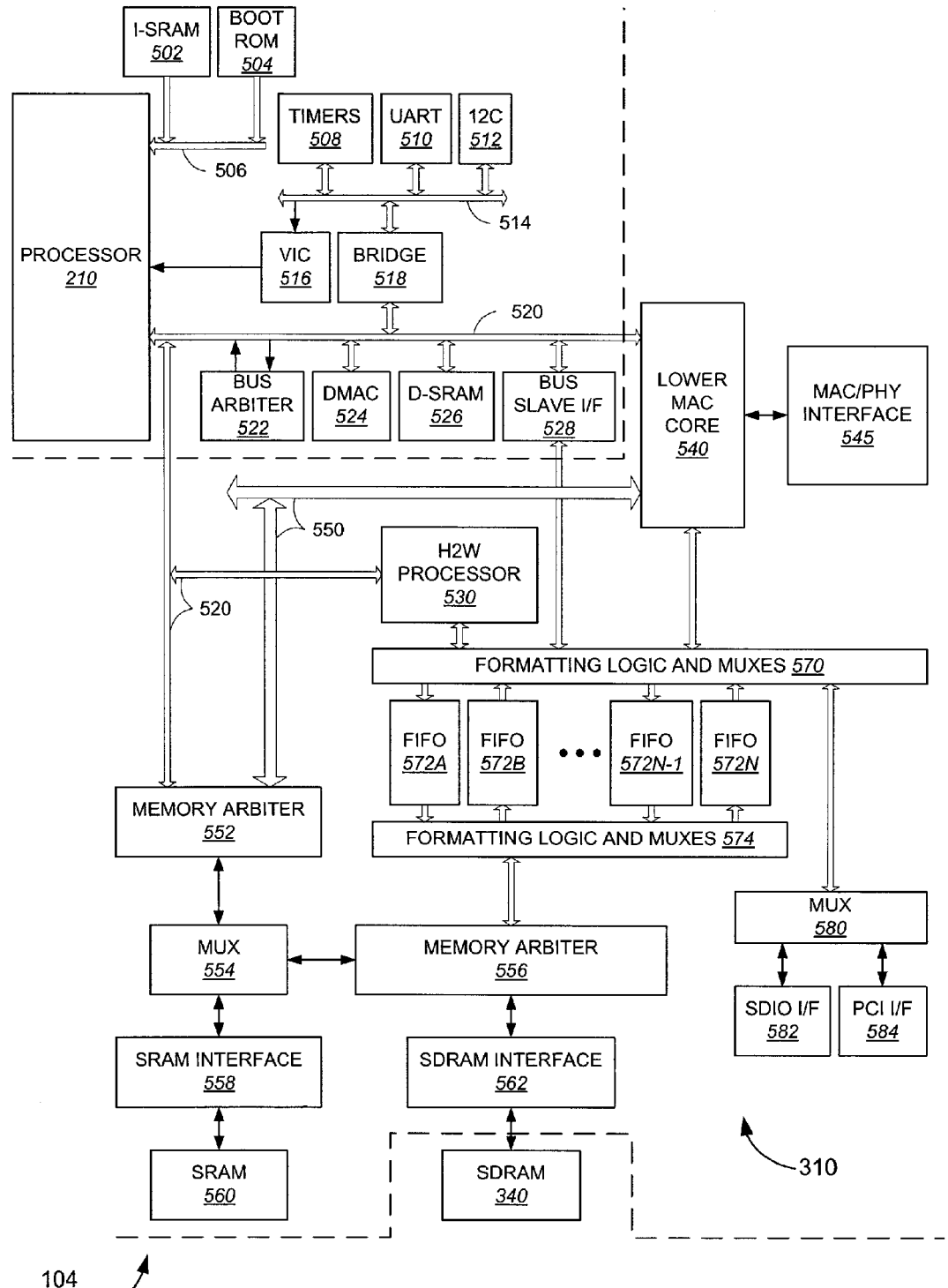
FIG. 5 depicts a more detailed example embodiment of a wireless communication device.

FIG. 5 depicts a more detailed example embodiment of a wireless communication device such as a STA 104 or AP 106. In this example, MAC processing for a wide variety of example packet features will be described using one MAC processor (broadly described). In an alternate embodiment, MAC processing functions for different types of packets may be divided into two or more MAC processors (example alternate embodiments are detailed below with respect to FIGS. 48 and 49).

As before, processor 210 is deployed to perform firmware tasks. An example set of support functions are illustrated that may be typical in such a deployment. Various alternate embodiments will be clear to one of ordinary skill in the art. Processor 210 communicates with an instruction SRAM 502 and a boot ROM 504 via instruction bus 506. These memories may be used to perform well-known instruction storage and retrieval for use in firmware processing on processor 210.

Example I/O functions and support functions are illustrated by components connected to bus 514. In this example, timers 508 may be deployed to perform various timing functions. A Universal Asynchronous Receiver Transmitter (UART) 510 may be deployed. Another example of I/O is the I2C interface 512. In this example, the various ancillary components connect via bus 514 to Vector Interrupt Controller (VIC) 516, which is connected to processor 210. Thus, timing interrupts, I/O interrupts, and related processing may be performed by processor 210 in accordance with the related functions deployed. Various alternate functions are well known in the art for connecting with processors of various types and will be known to one of ordinary skill in the art. Bridge 518 connects the components attached to bus 514 with other components connected to bus 520. Thus, various components connected to bus 520, including processor 210, may communicate data onto bus 514 for delivery to or receipt from those respective components. In this example, a bus arbiter 522 is deployed for controlling access to bus 520 DMA controller, additional components attached to bus 526 include a Direct Memory Access (DMA) controller 524, data SRAM 526, and a bus slave interface 528. Bus slave interface 528 provides a conduit between bus 520 and formatting logic and muxes 570, which will be described in further detail below. The components thus described may be conceptually identified with various components such as processor 210, memory 220, and I/O 230, described above with respect to FIG. 2.

The components of FIG. 5, except for SDRAM 340, form portions of one example embodiment of a MAC processor ASIC 310, such as described above in FIGS. 3 and 4. These components may be configured for use as a STA 106 configuration, detailed in FIG. 3, or an access point or super-station configuration, detailed in FIG. 4. In light of the previous discussion, it can be seen that the various components detailed in FIG. 5 may form portions of MAC processor 240 and hardware table 320. Various components described may be configured in different modes to perform different functions. Various components such as processor 210 and example ancillary components 502-528 may or may not be incorporated in an example embodiment of a MAC processor ASIC 310.

Note that the processor 210, and the various other components shown, can communicate with components of the MAC processor via bus 520. In this example, the MAC processor comprises two major functions, including lower MAC core 540 and a host-to-WLAN subsystem, shown as H2W processor 530. Example embodiments of these components are detailed further below. This segregation of components into various parts is just one example, those of skill in the art will readily deploy the various processes and functions described in alternate configurations as will be clear in light of the teaching herein.

SRAM 560 can be accessed via SRAM interface 558 which is connected to MUX 554. Mux 554 selects as an input to SRAM interface 558 the connection to memory arbiter 556 or the connection to memory arbiter 552. Memory arbiter 552 receives requests and arbitrates for access to SRAM 560 from a variety of sources, including components on bus 520, as well as bus 550. In this example, bus 550 provides a direct coupling between lower MAC core 540 and memory (SRAM) 560. Note that a path also exists between those components via bus 520. In this example, additional bus 550 is provided to guarantee access performance with SRAM 560 to retrieve and store time-sensitive data to and from lower MAC core 540. Note that, as described in FIGS. 3 and 4, SRAM 560 may serve as a packet buffer in one configuration and as a repository of per-flow parameters in another configuration.

Lower MAC core 540 is connected to MAC/PHY interface 545 which may be used to deliver packets for transmission to PHY 260, and to process received packets from PHY 260. Example embodiments of components within the lower MAC core 540 are detailed further below.

H2W processor 530 processes ingress packets, example embodiments will be described in further detail below. In one embodiment, ingress may be decoupled from processing of the incoming packets. In this case, ingress packets may be written into the packet buffer at line-speed (i.e. at the ingress rate). The processing of those packets may take place later, by reading them from the packet buffer. This decoupling allows the processing rate to differ from the ingress line-speed rate. The drawback of this approach is that there is an extra read and write to the packet buffer, as the packets must be read, processed, and placed back in the packet buffer to await transmission. This memory bandwidth penalty may be acceptable in certain embodiments. An alternate embodiment, illustrated in the examples below, provides for inline processing of ingress packets. In these example embodiments, MAC processing is designed to allow for each ingress packet to be formatted for transmission at line-speed, with a single write to the packet buffer (followed by a read when the time for transmission of the packet arrives). In the second case, the burden on memory bandwidth is reduced in comparison with the first case. Those of skill in the art will readily adapt either approach with various aspects taught herein in various embodiments.

SDRAM 340 is shown as an external component to MAC processor ASIC 310 in this embodiment. This is in keeping with the discussion of FIG. 3 and 4 above, in which wireless communication devices needing to support a higher number of flows (with the resultant higher need for increased packet buffer space, such as an access point or super-station) may be accommodated with a single lower cost MAC processor ASIC 310 and an optional external memory such as SDRAM 340. SDRAM 340 may be accessed via SDRAM interface 562, which is coupled to memory arbiter 556. In an alternate embodiment, SDRAM 340 may also be incorporated onto a MAC processor ASIC 310. The allocation of components as shown in FIG. 5 is one example only. Any of the components shown may be incorporated on a single ASIC or may be incorporated into one or more external devices, depending on the area requirements of each ASIC, and the performance desired.

In this example, ingress and egress of packets is performed through one of two example external interfaces. Those of skill in the art will recognize that alternate interfaces may be deployed in addition to or instead of these interfaces. In this example, SDIO interface 582 and PCI interface 584 are deployed to receive and handoff packets to external (or internal) devices communicating with one or more of those interfaces. SDIO interface 582 and PCI interface 584 are selected via MUX 580.

In order to accommodate interfaces of varying speeds, as well as provide for varying demands for storing and processing incoming and outgoing packets, FIFOs, muxes, and formatting logic may be deployed to perform rate matching and queues for relieving congestion in accessing memories such as SRAM 560 and SDRAM 540, and MAC processing functions such as H2W processor 530 and lower MAC core 540. For example, ingress and egress interfaces may operate at higher speeds relative to the throughput capabilities of the WLAN. Incoming flows may be bursty and high speed. Information received from processor 210 or any other component connected to bus 526 may arrive at yet another rate. H2W processor 530 and lower MAC core 540 will generate access requests and retrieve or store data resulting from those requests as processing for various tasks is completed, as described further below. Thus, in this example, FIFOs 572 may be deployed, between formatting logic and muxes 570 and formatting logic and muxes 574. In one example, a set of FIFOs 572, one for buffering data from formatting logic and muxes 570 to formatting logic and muxes 574, and another for buffering data in the opposite direction, may be deployed for interfacing to ingress and egress functions (such SDIO interface 582 or PCI interface 584). Another set of FIFOs 572, one in each direction, may be deployed for supporting data to and from H2W processor 530. Another similar set may be deployed for use in conjunction with lower MAC core 540. Yet another similar set may be deployed for interfacing between components on bus 520, accessed via bus/slave interface 528. Those of skill in the art will recognize that this configuration is but one example. Various alternate embodiments may be deployed, which will be apparent to one of ordinary skill in the art in light of the teaching herein. Thus, the example embodiment of wireless communication device 104 or 106 depicted in FIG. 5 serves to illustrate one possible interconnection of various components, details of which are described below. Myriad alternate configurations using subsets of these components and/or additional components (not shown) may be deployed within the same scope.

Packet Buffer and Memory Management

Figure 6:
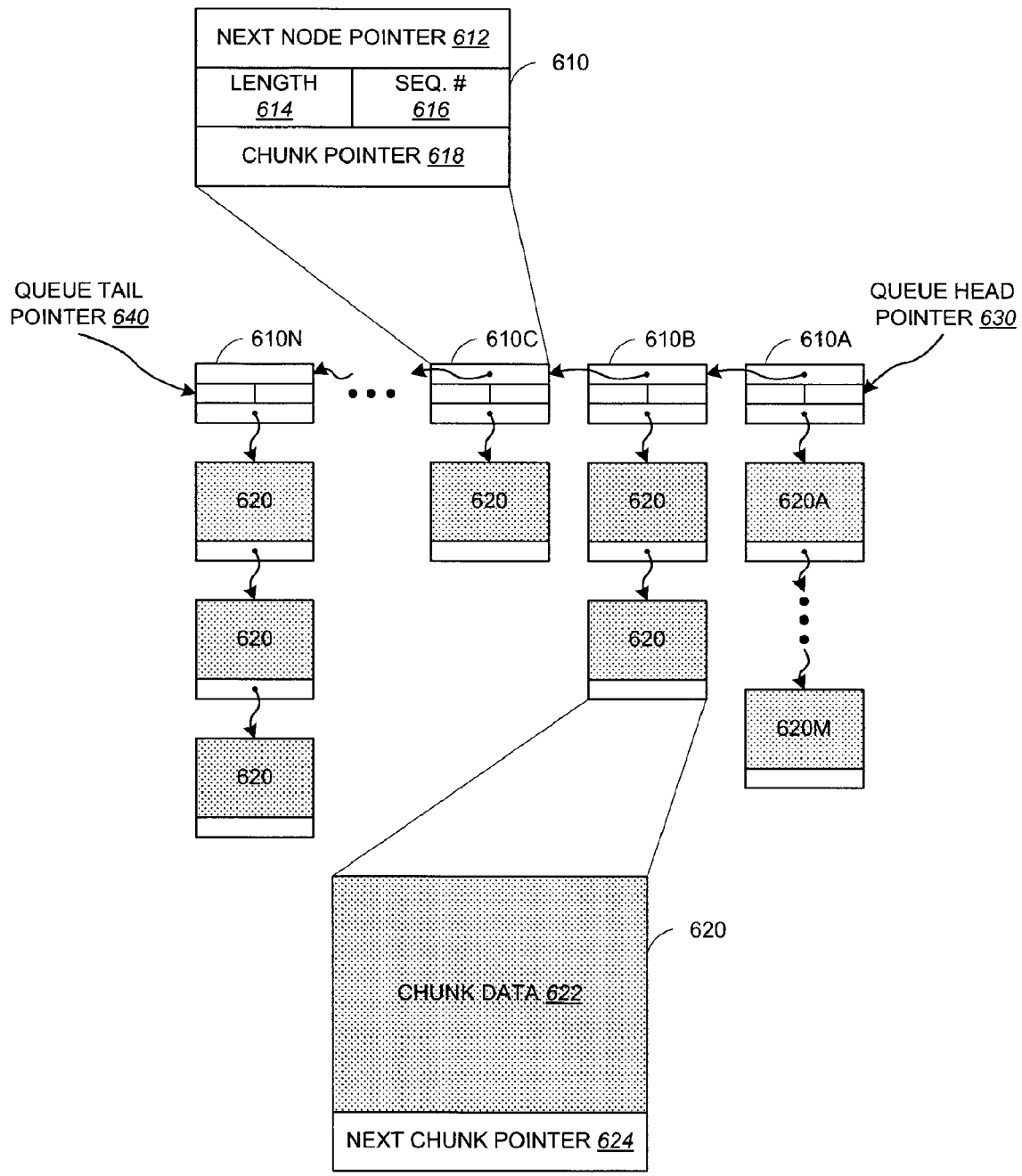
FIG. 6 depicts an example embodiment of a packet buffer.

FIG. 6 depicts an example embodiment of a packet buffer 250. In various example embodiments detailed herein, a packet buffer 250, as shown in FIG. 6, illustrates data structures and associated linked lists which are useful for performing various functions for packet processing within a MAC processor 240. While various embodiments detailed herein do not require such a structure, and alternate packet buffers may be deployed in alternate embodiments, embodiments detailed throughout this specification will utilize these linked lists and data structures to illustrate their use in those various functions. Furthermore, a packet buffer, such as described in FIG. 6, may be deployed for use in various alternate functions, in addition to those detailed herein. Those of skill in the art will readily adapt this packet buffer and the components and subcomponents thereof in various embodiments, including those for which relatively high speed packet processing is desired. The example packet buffer 250 may include additional data structures not shown in FIG. 6, which are detailed further in FIG. 7, described below.

In this example, each packet is stored into packet buffer 250 using two types of data structures, a first data structure referred to herein as a node 610 and a second data structure referred to herein as a chunk 620. Each packet, or packet fragment (if fragmentation is deployed such as described in 802.11(g) and (e)), includes one node 610 and one or more chunks 620. The number of chunks required to store the packet data will vary depending on the size of the packet or fragment. Thus, a packet resides in packet buffer 250 as a linked list structure comprising a node pointing to a first chunk and, when additional chunks are required, the linked list comprises the additional chunks, each chunk pointing to a subsequent chunk (except the final chunk).

One advantage of such segmentation between nodes and chunks is that information crucial for control decisions may be kept in a node, while the data itself is kept in relatively larger chunks. This allows for nodes, which are representative of their respective packets, to be used in control processing without requiring access of the entire packet.

Additionally, arriving ingress packets, as well as packets awaiting egress, will generally be associated with one or more flows. The node and chunk structure depicted also facilitates efficient formation of queues of packets within the packet buffer, each queue associated with its respective flow. This general structure is illustrated in FIG. 6 with an example of a single queue comprising various nodes and chunks. In this example, nodes 610A-N form a linked list associated with a queue for a flow. The queue has a head identified by queue head pointer 630, and queue tail pointer 640 identifies the last node in the queue. In this example, there are N packets in the queue, each with a node 610 associated therewith. Each node 610 comprises a series of chunks 620A-M, as illustrated. Any number of chunks may be associated with a single node. The remaining chunks illustrated in this figure are simply labeled 620. Those of skill in the art will recognize that nodes of various sizes may be deployed as well as chunks of various sizes. In the example embodiment, a chunk is 512 bytes. Thus, since example packets are usually less than 2 Kbytes, at most 4 chunks will be needed for each packet (and typically fewer), including the packet header and other information associated therewith. In alternate embodiments, any chunk size accommodating any packet size may be deployed.

In this example embodiment, control and data are separated in memory. For transmission and reception purposes a number of manipulations of the control structures may be needed. However, for data payloads, only one write into memory is performed (either upon ingress or reception from the WLAN) and one read out of that memory (upon transmission on the WLAN or egress via external interface). Thus the memory bandwidth requirements may be reduced, as transfers into and out of memory are relatively efficient.

An example node 610 is illustrated in FIG. 6. Node 610 comprises a next node pointer 612 which is used to link to the subsequent node in the queue. A length field 614 and a sequence number 616 are included. These fields are useful when processing packets, as described further below, and allow for MAC processing to be performed without accessing or moving data contained in the chunks 620. For example, the length field is useful for aggregation, when aggregating packets into a TXOP. The sequence number is useful when sending a block ACK request. In general, any packet information useful for processing may be added to alternate node embodiments. Node 610 also includes chunk pointer 618, which points to the first chunk containing the packet data.

This structure allows flexibility for generating queues of any length, limited only by the overall memory packet buffer size. Thus, various different flow types may be supported, and the supported number of flows need not be fixed. For example, several flows requiring a low number of packets may be allocated storage with flows requiring higher numbers of packets, and thus a smaller packet buffer size may be deployed to support a given number of flows. Alternatively, a varying number of flows may be accommodated for any given memory size. As can be seen, the queues can grow and shrink independently and, since nodes and chunks can be reused by any flow or packet, respectively, the structure affords great flexibility with very efficient memory management.

An example chunk 620 is illustrated as well. The chunk data 622 comprises the packet, including any header fields, frame check sequences, and the like. A next chunk pointer 624 is included in the chunk to point to the next chunk in the linked list, if any.

In one embodiment, chunks are a fixed size. This allows for a packet buffer memory to comprise a fixed portion of memory allocated to chunks. The linked list structure allows any chunk to be used in any packet linked list. As packets come and go, chunks may be reused with ease, without the requirement for additional memory management overhead (such as re-allocation of space for different size packets and the like). This structure also allows for efficient processing, in that, in general, chunks may be written once to the packet buffer, where they remain until they are ready for transmission on the WLAN or handoff to an egress destination. Packets can also be moved within queues or moved to new queues simply by rewriting pointers (i.e. changing the link list). This is useful when processing packets for retransmission. The use of these structures provides for additional efficiencies as will be detailed further below. Each linked list can use any of a variety of list terminators for the last node in a queue or the last chunk in a packet. In the example embodiment, the first and last nodes in a linked list are indicated by header and tail pointers while the chunk pointers are threaded to indicate the last chunk in a packet. In an alternate embodiment, it may be desirable to add the number of chunks in the node header along with the packet length and the packet sequence number. Alternate embodiments including variable chunk sizes are also envisioned.

Figure 7:
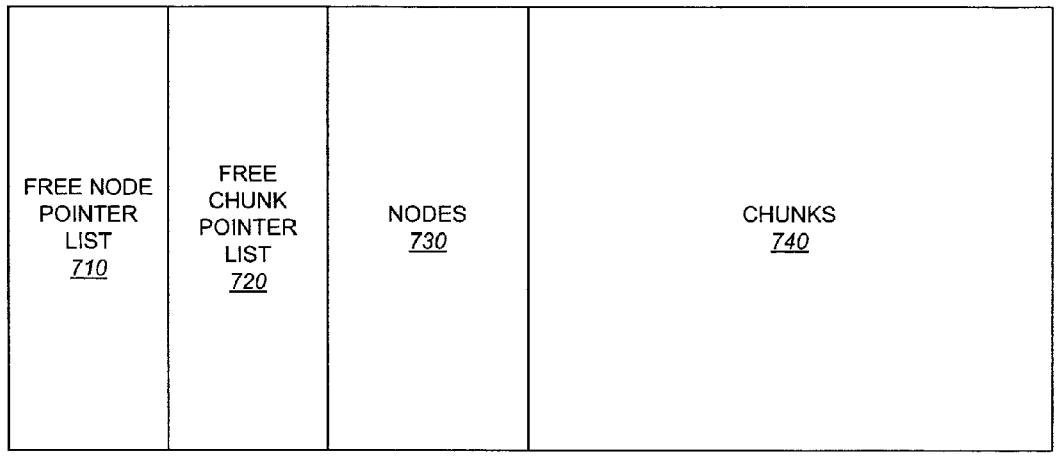
FIG. 7 further illustrates an example packet buffer.

FIG. 7 further illustrates an example packet buffer 250. Contiguous chunks of memory may be allocated to various data structure types, although this is not a requirement. As described above, a portion of a segment 730 may be allocated for nodes, and a segment 740 may be allocated for chunks. In the example embodiment, each of these segments is a contiguous space of memory, including fixed-size nodes and chunks, reusable for any packet and/or flow, as described above. In addition, a free node pointer list 710 and a free chunk pointer list 720 are maintained. A variety of data structures may be deployed for free pointer lists, as will be apparent to those of skill in the art. In one example, node pointers and chunk pointers may be pushed and popped to their respective pointer lists 710 or 720. These lists can be, for example, circular buffers. Once a pointer is popped to form a new node or chunk, that pointer will remain in use until the node or chunk is freed up, then the pointer can be pushed back for future use.

Figure 8:
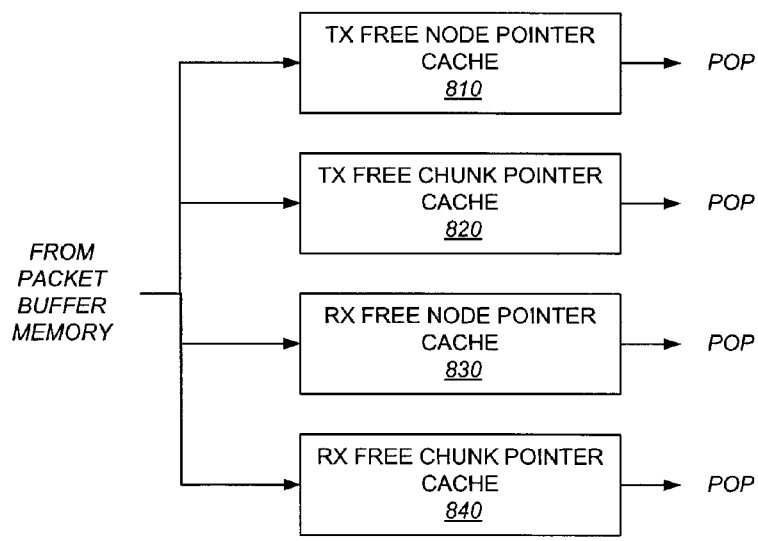
FIG. 8 depicts additional components that may be deployed within a MAC processor.

FIG. 8 depicts additional components that may be deployed within a MAC processor, such as in example embodiments detailed herein. These components are not required, but may yield advantages in certain situations due to particular properties of the type of memory being used. For example, there is generally latency associated with SDRAM access. There may also be inefficiencies when performing small transfers (i.e. in retrieving or storing a single node or chunk pointer). Using certain types of SDRAM, when factoring row access, column access, etc., the overhead cycles may overwhelm the actual data transfer cycles. To prevent large delays, various caches may be deployed for retrieving several pointers at once for use in MAC processing. FIG. 8 depicts examples of several of these caches. Some or all of these caches may be deployed in various alternate embodiments. Example caches used in embodiments detailed herein include TX free node pointer cache 810, a TX free chunk pointer cache 820, an RX free node pointer cache 830, and an RX free chunk pointer cache 840. The data structure illustrated above for packets may be simplified for use with receive packets, an example embodiment of which is detailed further below with respect to FIG. 33. In general, each of these caches 810-840 receives one or more pointers from their respective node pointer lists in packet buffer 250 in order to create efficiencies. A plurality of each pointer type may be retrieved at once from the packet buffer. In this example, a plurality of pointers may be popped from the respective list. These pointers then populate the respective cache, and single pointers may be popped from the respective cache for use in the various MAC processing components. The use of pointers and their respective caches will be illustrated further via various example embodiments detailed below.

Figure 9:
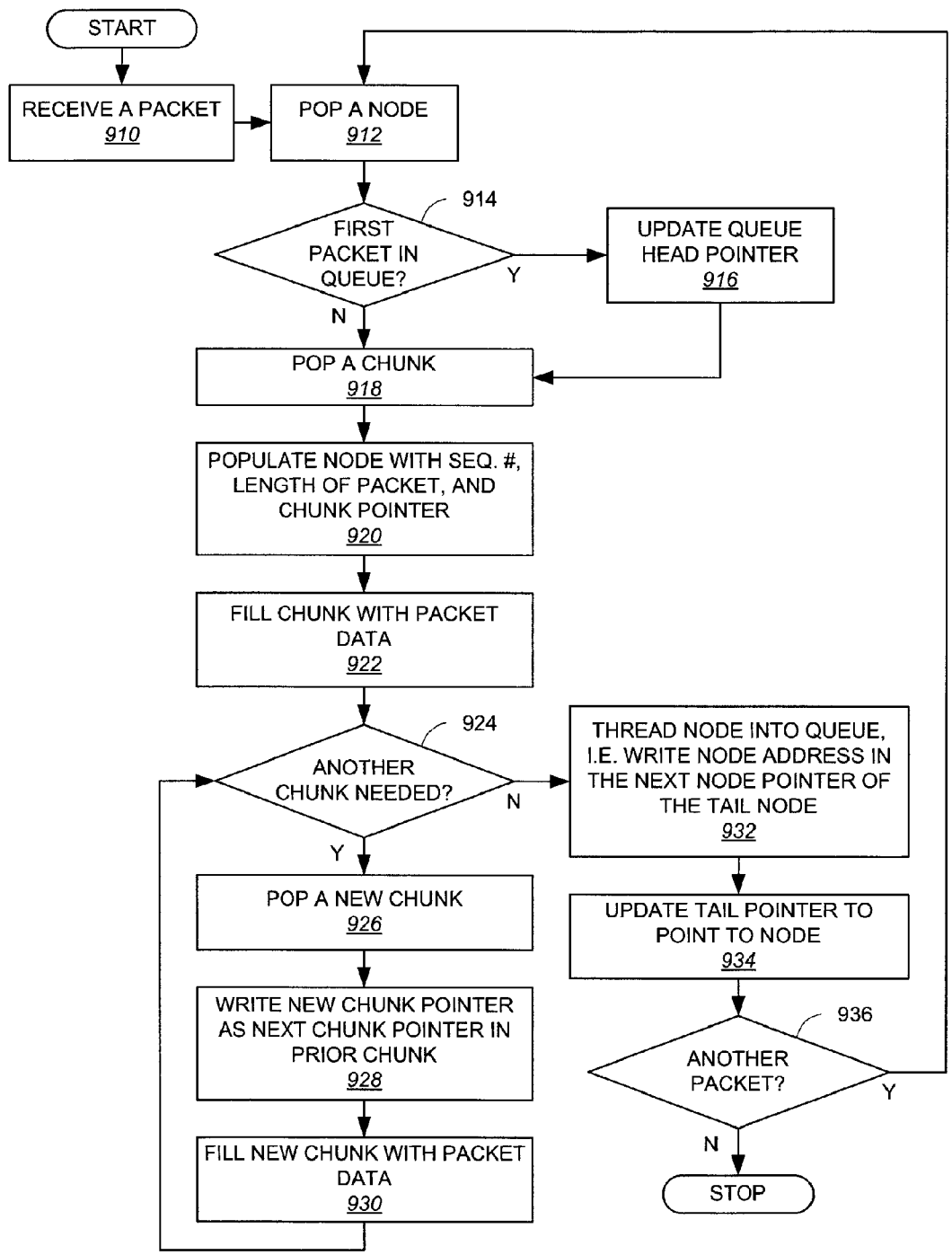
FIG. 9 depicts an example embodiment of a method for writing packets into a packet buffer and creating queues.

FIG. 9 depicts an example embodiment of a method 900 for writing packets into a packet buffer and creating queues. A queue may be formed using a data structure, a linked list in this example. Queues may also be formed as arrays (an example is given as node array 3330, detailed below). This method is suitable for deployment in conjunction with a packet buffer such as described in FIGS. 6 and 7 above. Method 900 illustrates example techniques that may be used for writing ingress packets to a packet buffer. Similar techniques may be used for writing received packets to the packet buffer to await handoff processing for egress. Example embodiments for handoff will be detailed further below. Optionally, pointer caches (i.e. 810-840, as described in FIG. 8) may also be deployed and may also be the primary source for new pointers. Various embodiments may be deployed with or without caches and this method may be used with any such configuration, as will be apparent to one of ordinary skill in the art.

At 910, a packet is received. At decision block 912, pop a node for association with the packet. At decision block 914, if this packet is the first packet in the respective queue, proceed to 916 and update the head queue pointer to point to the node associated with the new packet (for example, queue head pointer 630 illustrated in FIG. 6). Then proceed to 918. At decision block 914, if this packet is not the first packet in the respective queue, proceed to 918.

At 918, pop a chunk pointer. Again, popping of nodes and chunks (shorthand for popping the respective pointer) may be performed directly from the packet buffer, and in particular from the free node pointer list or free chunk pointer list, respectively. In the example embodiment, the pointers are popped from the transmit free node pointer cache 810 and transmit free chunk pointer cache 820 (which may need to be replenished as they are exhausted). At 920, populate the node with the sequence number and length of the packet and insert the chunk pointer retrieved at 918 into the chunk pointer field of the node (i.e., using a node format such as node 610 illustrated in FIG. 6). At 922, fill the chunk with packet data. A chunk 620 as illustrated in FIG. 6 may be deployed in one example.

At decision block 924, if another chunk is needed because the packet is greater than will fit within the first chunk, proceed to 926. If not, proceed to 932. At 926 pop a new chunk pointer. At 928 write the new chunk pointer into the next chunk pointer field of the prior chunk. At 930, fill the new chunk with packet data. In the example embodiment, the packet data will be written sequentially into the series of chunks. Then return to decision block 924 to determine if yet another chunk will be needed. This loop may be repeated until the packet has been entirely written into one or more chunks.

At 932, the process for writing the packet is completed. Thread the node associated with the packet into the proper queue. For example, this may be accomplished by writing the node address, i.e. the pointer retrieved at 912, in the next node pointer of the tail node. In this example, the tail node is identified by the queue tail pointer (such as queue tail pointer 640 illustrated in FIG. 6). At 934, update the tail pointer to point to the current node, which will become the tail node.

At decision 936, if another packet is received, loop back to 912 and the process may repeat. If another packet is not ready for writing into the packet buffer, the process may stop. For clarity, the details of associating the packet with its associated flow, from which the appropriate queue and its associated head and tail pointers will be derived, are omitted. Example embodiments associating packets with flows are illustrated in further detail below.

H2W Processor and Ingress Policing

FIG. 10 illustrates an example embodiment of Host to WLAN subsystem such as H2W processor 530. A packet may be received from a variety of sources. In this example, two sources are shown for illustration. This example embodiment illustrates a subset of components that may be contained in an H2W processor 530. Some of the components shown in FIG. 10 may correspond to components of FIG. 5 not included in H2W processor 530 and are shown for clarity of discussion. Those of skill in the art will recognize that the components shown and their partition is illustrative only. Typical ingress packets, in this example, come from an external interface such as the SDIO interface 582 or PCI interface 584 illustrated in FIG. 5. Another example packet input may be from processor 210 or any other component connected to bus 520, as shown in FIG. 5. External interface packets arrive in H2W processor 530 via external interface 1006. Packets from bus 520, for example, may arrive via processor interface 1002. FIFOs may be deploying to hold one or more packets for processing. For example FIFO 1004 and 1008 may be deployed to hold packets received from processor interface 1002 or external interface 1006, respectively. The block 1004 may be deployed for holding management and control packets coming from the processor that need to be transmitted on the WLAN. In an alternate embodiment, detailed below with respect to FIG. 48, processor interface 1002 and related components may be omitted, as legacy packets and other lower throughput packets (for example) are processed in processor 210 (or another alternate MAC processor) and therefore this interface may not be needed.

In this example, the destination MAC address, in conjunction with the Traffic Stream Identifier (TSID), are used to uniquely identify a flow. In alternate embodiments other mechanisms may be deployed for flow mapping. As mentioned above, there will typically be a driver for performing classification of flows, which may be running in firmware, or on some other external processor. The driver may produce the MAC address with a Destination Address (DA), TSID, and a source address. In this example, the DA and the TSID may be used to identify the flow. The DMAC-TSID is delivered to flow mapping block 1020 from which a flow ID is returned, corresponding to the DMAC-TSID.

Figure 10A:
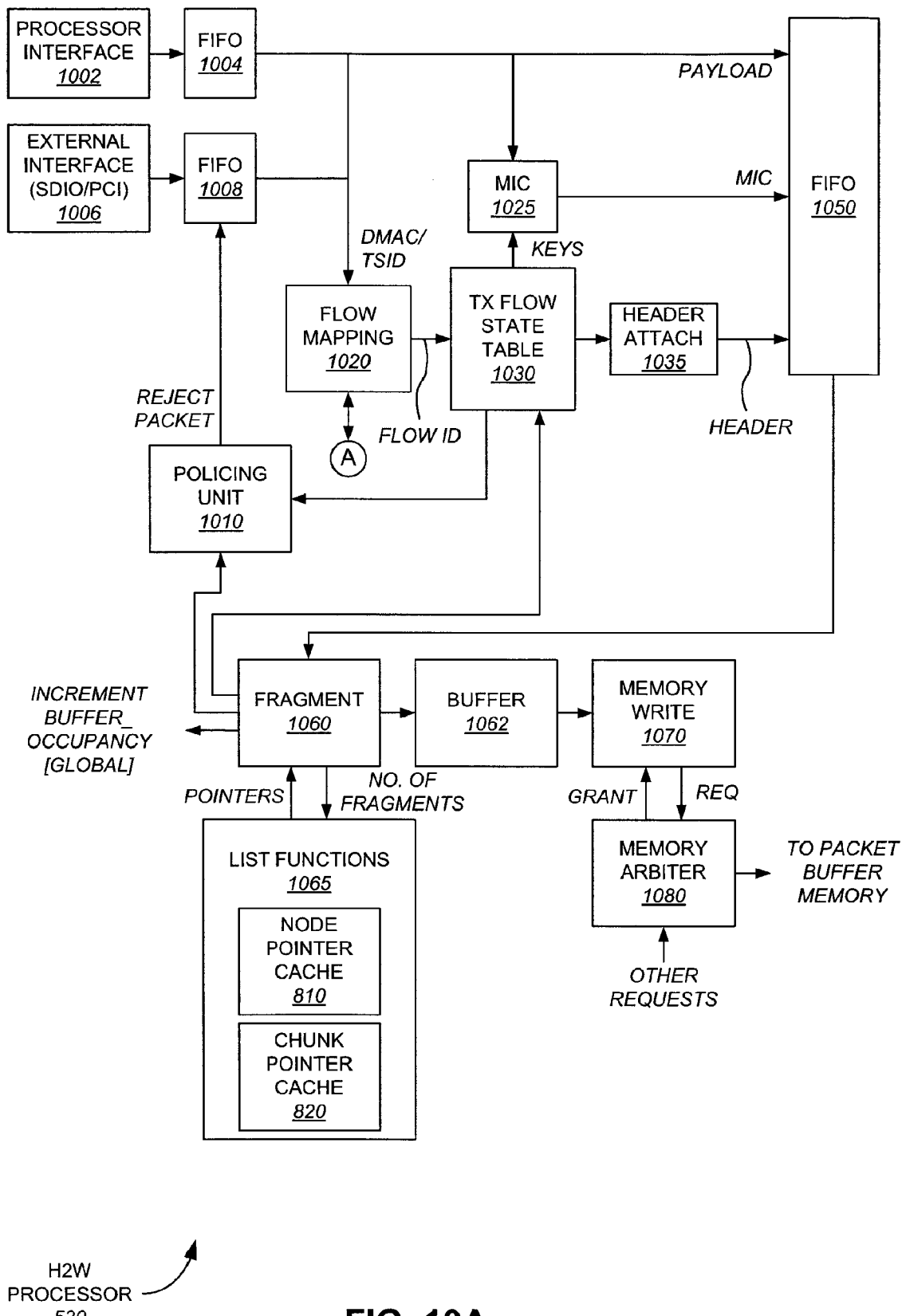
FIG. 10 illustrates an example embodiment of a host to WLAN subsystem.
Figure 10B:
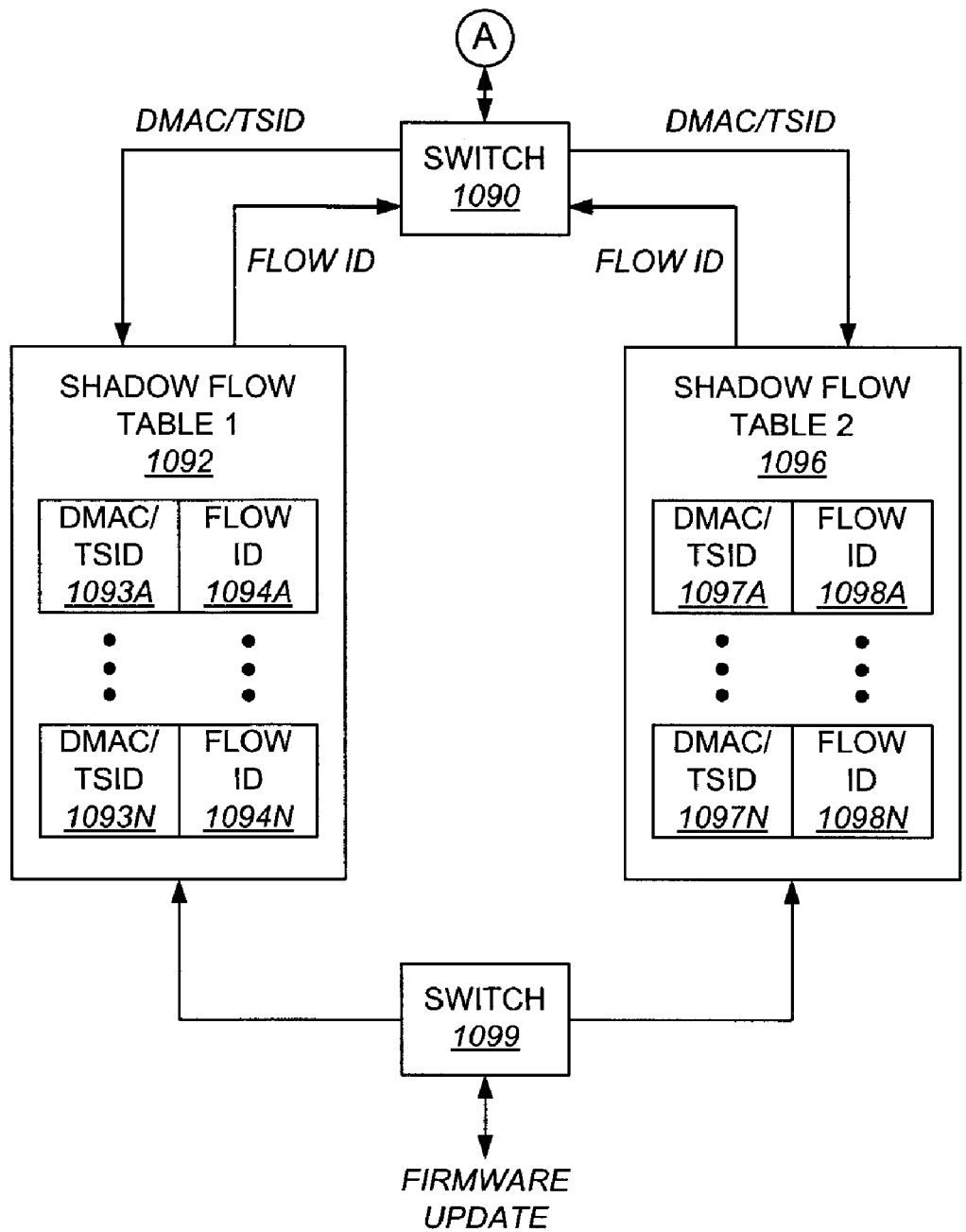

Example embodiments of flow mapping block 1020 may use any type of look up or other function to determine a flow ID from the given identification information. One example is shown in FIG. 10B. In the example embodiment, it is desirable to decouple firmware interaction form line speed processing, as described above. However, it may be that firmware is well suited for creating tables for flow mapping. In order to decouple the firmware interaction, two shadow flow tables, table 1 1092 and table 2 1096, are deployed. H2W processor 530 utilizes one shadow table, selected by switch 1090, while firmware may update the other shadow table, as selected by switch 1099. Thus, a ping pong technique may be deployed, whereby the firmware updates one table while the other is used for MAC processing. Each shadow flow table 1092 or 1096 comprises a list of DMAC-TSID entries with corresponding flow IDs. Shadow flow table 1 1092 comprises DMAC-TSIDs 1093A-N associated with flow IDs 1094A-N. Shadow flow table 2 1096 comprises DMAC-TSID's 1097A-N with associated flow IDs 1098A-N. Thus, flow mapping block 1020 delivers a DMAC-TSID to the actively selected shadow flow table, and a flow ID is returned. In the example embodiment, in order to perform fast searching of the flow ID, a binary search is performed. Firmware is well suited to put the DMAC-TSID fields in order, to facilitate a binary search. Those of skill in the art will recognize alternate flow mapping procedures which may be substituted in alternate embodiments.

Returning now to FIG. 10A, the flow ID is delivered to TX flow state table 1030, an example embodiment of which is detailed below with respect to FIG. 11. TX flow state table 1030 comprises a variety of parameters for each flow. The physical location of TX flow state table 1030 may vary, as described above with respect to FIGS. 3 and 4. For example, in one configuration, TX flow state table may be kept in a hardware table, in H2W processor 530. In an alternate embodiment the hardware table may reside in lower MAC core 540, details not shown, and both blocks 530 and 540 may share the same hardware table. Or, each block 530 and 540 may maintain portions of the hardware table, as conceptually illustrated in FIGS. 3 and 4. From the Flow ID delivered, a portion of the TX flow state table 1030 corresponding to the Flow ID may be selected and various parameters retrieved. Example parameters will be described throughout these embodiments.

Some parameters may be delivered to policing unit 1010. Example policing unit embodiments are detailed further below. If encryption is enabled, an encryption block, in this example Message Integrity Code (MIC) 1025, may have keys delivered for use in encryption.

In MIC block 1025, from the keys supplied and the data in the payload portion of the packet, a MIC computation may be generated. In this embodiment, a separate component is used to perform encryption of the payload (see legacy protocol engine 2210, detailed below.) Alternate encryption techniques are well known in the art and may be substituted.

Other parameters may be delivered to header attach 1035 to produce a header. The header generated may include fields for use in the packet header itself as well as control values for use while the packet traverses through the MAC processing functions. These control values may be removed before the packet is delivered for transmission. This is one example technique for maintaining state information for a packet while MAC processing is performed. Those of skill in the art will recognize alternate techniques for maintaining state of packets while performing various MAC functions upon them.

Policing unit 1010, in association with the parameters delivered from flow state table 1030, may reject the packet, in which case encryption functions, such as MIC computation, will not be performed, and the packet may be removed from the FIFO. Example ingress policing embodiments are detailed further below. If the policing unit 1010 allows the packet, then the payload along with the MIC portion generated in MIC 1025, if enabled, and the appropriate header are delivered for storage in FIFO 1050.

FIG. 11 depicts an example embodiment of the contents of the TX flow state table 1030. Sets of parameters are maintained for each flow. The parameters of a single flow are illustrated. Packet type 1102 specifies what type of packet is being received. For example the packet may be an 802.11(g), (e), or (n) packet. Other packet types may be supported and can be indicated in the packet type 1102 field.

Security policy 1104 indicates whether security techniques will be used (such as encryption). The example embodiment supports AES-CCMP (Advanced Encryption Standard—Counter Mode Cipher Block Chaining Message Authentication MAC Protocol) and RC4-TKIP (Rivest's Cipher-4—Temporal Key Integration Protocol). Receiver address 1106 indicates the MAC address of the receiver for which the packet is destined. The sequence number 1108 indicates the packet sequence number. MIC key 1110 identifies the MIC key if TKIP is enabled. Frame control 1112 includes information for building the appropriate header.

Quality of Service (QoS) control 1114 can be used to indicate the QoS level. In the example embodiment, four QoS levels are maintained. Examples of queue handling for differing QoS values are illustrated further below.

Lifetime field 1116 may be used to indicate how long a packet can remain in the buffer. Once the lifetime value is expired, for example, the packet may be flushed. Max buffer occupancy 1118, max packets per flow 1120, and cumulative packets per flow 1122 are used, in the example embodiment, in ingress policing, such as in policing unit 1010, examples of which are detailed further below with respect to FIGS. 12 and 13. Note that a global variable Current Buffer Occupancy may be used in conjunction with these three parameters to perform a variety of ingress policing techniques. Tail queue pointer 1124 is used to identify the tail node, as described above, with respect to FIGS. 6 and 9.

These TX flow state table variables or parameters are illustrative only. Those of skill in the art will recognize that additional variables or parameters may be useful for maintaining per flow and can also be included. Furthermore, not all features need be supported in all embodiments and thus a subset of these parameters may be deployed.

Figure 12:
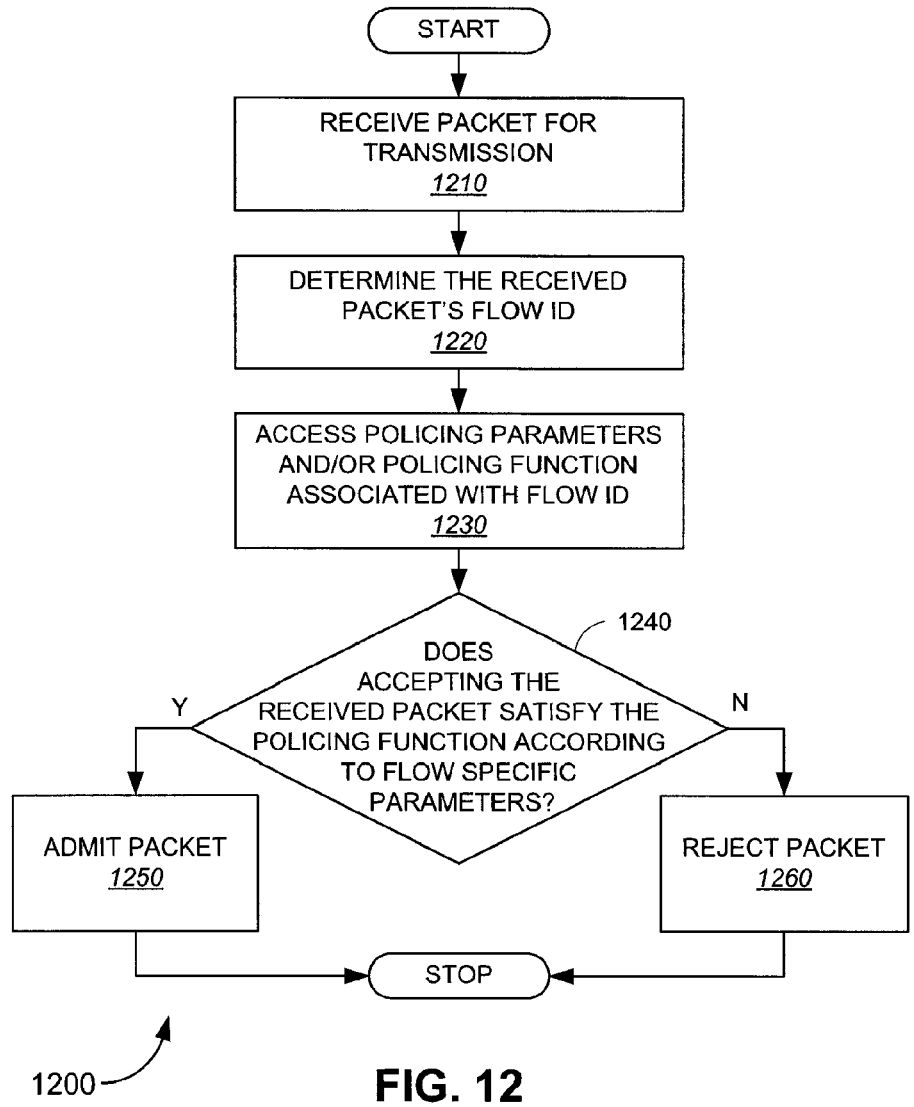
FIG. 12 depicts an example embodiment of method for performing ingress policing.

FIG. 12 depicts an example embodiment of method 1200 for performing ingress policing. A more generalized discussion of the advantages of ingress policing is provided below with respect to FIG. 34, in the context of egress handoff and overall WLAN QoS. As described above with respect to example TX flow state table 1030 in FIG. 11, a variety of parameters may be maintained for each flow. These parameters may be tailored, based on QoS level, to more readily admit or reject packets by the policing function.

While related to WLAN QoS, this is an additional technique which recognizes that, when interfacing with high speed ingress (which may be bursty and comprise a mix of high and low QoS flows), a bottleneck can be formed in the MAC processing unit separate from congestion on the WLAN itself. For example, it is possible that the MAC processing functions may be filled with lower QoS packets. Without proper policing, lower QoS packets may be introduced into the pipeline during times of relatively low congestion, and a bottleneck may be formed if conditions on the WLAN degrade and the throughput is lowered. Thus, policing unit 1010 can be configured to allow higher QoS packets to maintain their priority during times of relative congestion, and can more freely allow lower QoS packets to be processed when congestion is lowered. The 802.11 standards (b, g, e and n, for example) have paid attention to QoS control on the WLAN without, however, enough attention to ingress. Therefore, if a low QoS application occupies all of the buffers in a station, then a high priority packet cannot get access to the system. Ingress policing, as described herein, may prevent such scenarios and provide end-to-end QoS, not just on the WLAN QoS. Those of skill in the art will recognize various alternate embodiments for policing functions in light of the teaching herein.

Returning to FIG. 12, at 1210, a packet is received for transmission. For example, the packet may be introduced to an H2W processor 530 and a policing unit 1010 may determine whether to accept or reject the packet for further MAC processing. At 1220, determine the received packet's ID. For example, flow mapping block 1020 may be used. At 1230, access policing parameters and/or a policing function associated with the flow ID. In an example embodiment, these parameters may be stored in TX flow state table 1030, and may include max buffer occupancy 1118, max packets per flow 1120, and cumulative packets per flow 1122. Not shown in the example TX flow state table 1030 of FIG. 11 is the possibility that a plurality of policing functions may be specified (and perhaps alternate parameters associated therewith), with different policing functions used for differing flows. At decision block 1240, if accepting the received packet satisfies the appropriate policing function specified for the flow, according to the flow specific parameters and any global variables related to current congestion or other system conditions, proceed to 1250 and admit the packet. If not, proceed to 1260 and reject the packet. Then the process may stop.

Figure 13:
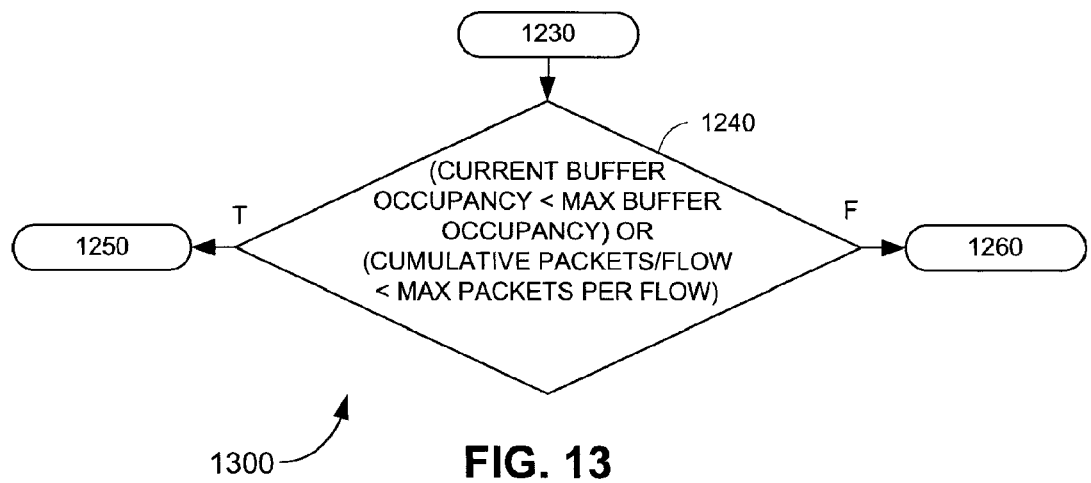
FIG. 13 illustrates an example embodiment of a method of ingress policing.

FIG. 13 illustrates one example embodiment of a method 1300 of a policing function, suitable for deployment as step 1240 in FIG. 12. As described above, the parameters max buffer occupancy and max packets per flow can be tailored for each individual flow. These may be associated with the QoS levels of the flow. Note, in the example embodiment, four QoS levels are deployed. However, these parameters may be sized to accommodate a larger variation than the predefined QoS levels. Thus, in some embodiments, the policing function may be implemented with finer granularity than an example QoS setting. In this example, decision block 1240, which may be arrived at from 1230 when deployed as shown in FIG. 12, determines whether or not to admit a packet (and proceed to block 1250 or 1260 respectively when deployed as shown in FIG. 12).

The example test at decision block 1240 comprises two terms. Satisfying either term allows the packet to be accepted. If both are unsatisfied, the packet is rejected.

The first term can be thought of as an indicator of congestion within the MAC processing unit. When the MAC processing unit is relatively uncongested, the first term will be true with more likelihood, even for lower priority packets, and hence the packets will more likely be admitted. In the example shown, the first term is true when the current buffer occupancy is less than the maximum buffer occupancy. Here, the current buffer occupancy is a global variable available to the process, which indicates the overall occupancy of the packet buffer. Note that the max buffer occupancy can be tailored differently for different flows, thus causing the first term of the OR statement to be more or less stringent, as desired. For example, a high QoS flow may have a higher max buffer occupancy setting, thus admission is more likely. In contrast, a lower max buffer occupancy setting would reduce the likelihood of admission. In other words, max buffer occupancy may be specified per flow, which allows for differing notions of what congestion means based on the flow type.

The second term will generally govern when there is relative congestion. In this case, per flow information dominates. In the example shown, the second term is true if the current packets per flow for the given flow is less than the specified maximum packets per flow. Specifically, max packets per flow can be set for the flow such that higher priority flows are assigned a higher value and lower priority flows are assigned a lower value. Thus, when the current buffer occupancy is relatively congested (thus the first term will not be true), higher priority packets having a higher maximum packets per flow makes it more likely they will be admitted. The max packets per flow for lower priority can be tuned lower. So, short of actually restricting them altogether, relatively few of the lower priority packets will be admitted. In an alternate embodiment, the cumulative packets per flow may be computed with a time value (the time value may vary between flows) to generate a packet rate for a flow. The maximum packets per flow may then similarly be set to a per-flow packet rate. Various alternate parameters and related conditions for admitting or rejecting packets are envisioned, and will be apparent to those of skill in the art in light of the teaching herein.

Note that these parameters need not remain static and may be updated based on other conditions of the system (for example, link quality and associated rates, as indicated in rate feedback from the PHY). Those of skill in the art will recognize myriad settings for each of the variables and will recognize that these settings may be changed in varying ways with response to changing system conditions.

The net result is that an effective policing function may be deployed efficiently at line speed merely by retrieving per flow parameters from the TX flow state table 1030, and a decision can be made quickly for each incoming packet. Note that admitting or rejecting packets according to an ingress policing function may be combined with any flow control technique, examples of which are well known in the art, such that variable rates of packet processing may be realized without packet loss. In one embodiment, a flow identifier may be received prior to receiving an entire packet on an external interface to allow the ingress policing decision to be made, avoiding using interface bandwidth to receive a packet when the packet is rejected.

In summary, this example highlights several options for policing. Under high load, a single flow (even a high priority flow) may be prevented from dominating the resources, while allowing higher priority flows greater access. Under lighter load, less restrictive decisions may allow low priority flows to utilize resources, since they are not being consumed at the time. Ingress policing may be any function of the four variables described (and alternate embodiments may utilize other variables or parameters). Policing may be used for fairness, to allow at least some access to all flow types, even if others are preferred to whatever degree is desired. Policing can also be used to manage poor link quality. Regardless of whether link quality or congestion tailoring is desired, or a combination of the two, the same (or similar) parameters may be used.

Returning to FIG. 10A, the output of FIFO 1050 is delivered to fragment block 1060. Recall that FIFO 1050 may include one or more packets that have been accepted, along with their respective headers, and a MIC computation, if applicable. Fragmentation may be performed depending on the packet type. For example, fragmentation may be enabled for 802.11(e) or (g), or any other packet type for which fragmentation is desired. In the example embodiment, a global variable, the Fragmentation Threshold (FT), is set through the AP management function (it is a capability element set in the beacon frame). It generally does not change over short periods of time. Firmware may set the fragmentation threshold in a register. If a packet exceeds the fragmentation threshold, then break the packet into FT sized fragments, with a potential residual partial fragment.

Note that fragmentation is not required. In an alternate embodiment, fragment 1060 and all the related functions may be omitted. In another alternate embodiment, detailed further below with respect to FIG. 48, more than one MAC processing block may be deployed. In such an embodiment, one MAC processing block may be equipped to perform fragmentation while another MAC processing block would not be so equipped. In one situation, high speed packets may not require or support fragmentation, and may be processed in a H2W processor 530 without fragment block 1060, while support for other packet types including fragmentation (such as legacy 802.11 packets) may be provided in an additional MAC processor, such as MAC processor 4810 detailed below. Those of skill in the art will readily appreciate the tradeoffs when deploying an embodiment including a single processor capable of processing all the functions of various packet types and another embodiment comprising two or more MAC processors, each capable of providing any subset of functionality. Of course, a single MAC processor capable of processing packets requiring a single set of functionality may also be deployed.

Fragment block 1060 determines the number of fragments based on the fragmentation threshold and the length of the packet. The number of fragments is delivered to list functions block 1065, which returns pointers to fragment block 1060. When fragmentation is not enabled, or the fragmentation threshold is not exceeded, the number of fragments will be one, and a single node pointer and its associated one or more chunk pointers will be returned. List functions block 1065 performs various linked list procedures, applicable for the memory structure deployed (such as described in FIG. 6 above. Note that, as shown, node pointer cache 810 and chunk pointer cache 820 reside in the list function block, as an example. Thus, a pool of available pointers may be taken from the available pool in each cache. The details of how to refresh and replenish these caches are not shown, but would be apparent to one of ordinary skill in the art in light of the teaching herein. Conceptually, as shown in FIG. 10A, a number of fragments may be sent to list functions 1065 and a group of pointers for that number of fragments may be returned. If there is no fragmentation, the number of fragments is one, and a single node pointer and its associated chunk pointer or pointers may be returned. In an alternate embodiment, a similar function may be performed by fragment block 1060, wherein repeated calls to list function 1065 are made for each fragment until the entire packet has been fragmented. As each pointer is returned, the global variable buffer occupancy is incremented according to the number of chunks or packets. Buffer occupancy could be either measure in the example embodiment, and alternate embodiments may use alternate measures.

FIG. 14 depicts an example embodiment of FIFO 1050. FIFO 1050 includes one or more MAC Service Data Unit (MSDUs) 1410A-N. Each MSDU comprises a header 1430, a payload 1440, and a MIC computation 1450 (if TKIP is used), as described above. In one embodiment, control data may be added to each MSDU in FIFO 1050, which may be fed back from fragment block 1060, as described above. In an alternate embodiment, control information is not maintained in FIFO 1050. Note that control information added for use in H2W processor 530 will be stripped off prior to writing the packet in packet buffer memory.

If no fragmentation is needed, then the MSDU may be stored directly in buffer 1062. It may be stored with the node pointer and chunk pointers retrieved from list functions 1065. The list functions give the number and chunk addresses for each packet, the packet payload (and hence the chunk payloads) are written into memory in the corresponding addresses. If fragmentation is desired, then each fragment that gets created is also stored in buffer 1062.

The contents of buffer 1062 are delivered to memory write 1070. Memory write 1070 interfaces with memory arbiter 1080, which contends for access to the packet buffer memory to actually enter the packet and/or fragments into the packet buffer. Note that memory arbiter 1080 may be implemented as one of memory arbiters 556 or 552, as shown in FIG. 5, depending on the configuration of the MAC processor ASIC 310.

Memory arbiter 1080 is shown to receive a request from memory write 1070 and may receive other requests from other components contending for access to the packet buffer memory. When access is granted, a grant will be returned to memory write 1070 and the packet and/or fragments are written into the packet buffer memory. A method similar to that described in FIG. 9 may be used to perform the memory write. For example, the node is created and filled with the current data, including the length and chunk pointers, etc., as described. The chunks are then written in 64 byte accesses, in the example embodiment, until each 512-byte chunk is filled. Memory write 1070 continues to make requests until the entire packet, including all fragments, if any, are written into RAM. The pointers used for threading the packet into the appropriate queue are retrieved as the node pointer for the packet (or node pointers for each fragment) as well as the tail queue pointer to identify the last node in the queue (the place where subsequent new packets and/or fragments will be appended).

In one embodiment, a memory arbiter receives requests from an Ingress State Machine, a WLAN Tx State machine, a WLAN Rx State machine and an Egress State machine. It may arbitrate between these requests with priorities—an example is the following order of priorities: WLAN Rx, WLAN Tx, Egress and Ingress. The state machines may need the whole packet to be read or written. At other times, the state machines may be only looking for a node pointer, a chunk pointer, and/or other control information in order to perform scheduling and other functions. A system of priorities may be established covering control and packet reads and writes for WLAN Rx/Tx and Egress/Ingress purposes.

Flows are set up when a specification of the flow (i.e. a TSPEC) is made by a station. At that time, the firmware may set up an entry in all the flow related tables. It may also populate a head pointer (and, hence, a first packet) for that flow. Those of skill in the art will recognize various other methods for keeping track of new queues and for updating associated head queue pointers.

In the example embodiment, the memory arbiter restricts the memory access to a limited number of bytes (i.e. 64) in order to allow other components fair access to the packet buffer memory. In an example embodiment, round robin access is given to the memory between ingress write requests, WLAN RX writes, and WLAN TX egress (i.e. handoff, detailed further below). For example, a 1500 byte MPDU would introduce a lot of latency to others awaiting access if the entire MPDU was written in an interrupted stream. A schedule, such as round-robin, prevents stalling in other processes.

FIG. 15 illustrates the process of breaking a MSDU 1410 into one or more fragments (each sized to the Fragmentation Threshold), plus a possible residual fragment. In this example, control 1420 is omitted. In one alternate embodiment, control 1420 could simply be prepended to the first header 1510, as shown. Control information may include pointers, or any other control information, which may be prepended to each header 1510, and may be stripped off before completing a memory write. In FIG. 15, each fragment 1530A-N is prepended with a header 1510 and each fragment is identified as payload 1520, which is a portion of payload 1440 from the MSDU. Each header 1510 includes the sequence number 1540, which is the sequence number of the packet and a fragment number 1550, which is the number associated with each individual fragment.

In the example embodiment, after fragmentation is performed, each fragment is subsequently treated as a packet. This allows for efficient processing of packets and fragments through the various MAC processing techniques detailed herein. Alternate embodiments need not share this requirement. The final fragment 1530N includes MIC 1450, if TKIP is used. Recall that, in the example embodiment, the MIC was computed over the packet prior to fragmentation by MIC 1025.

Figure 16:
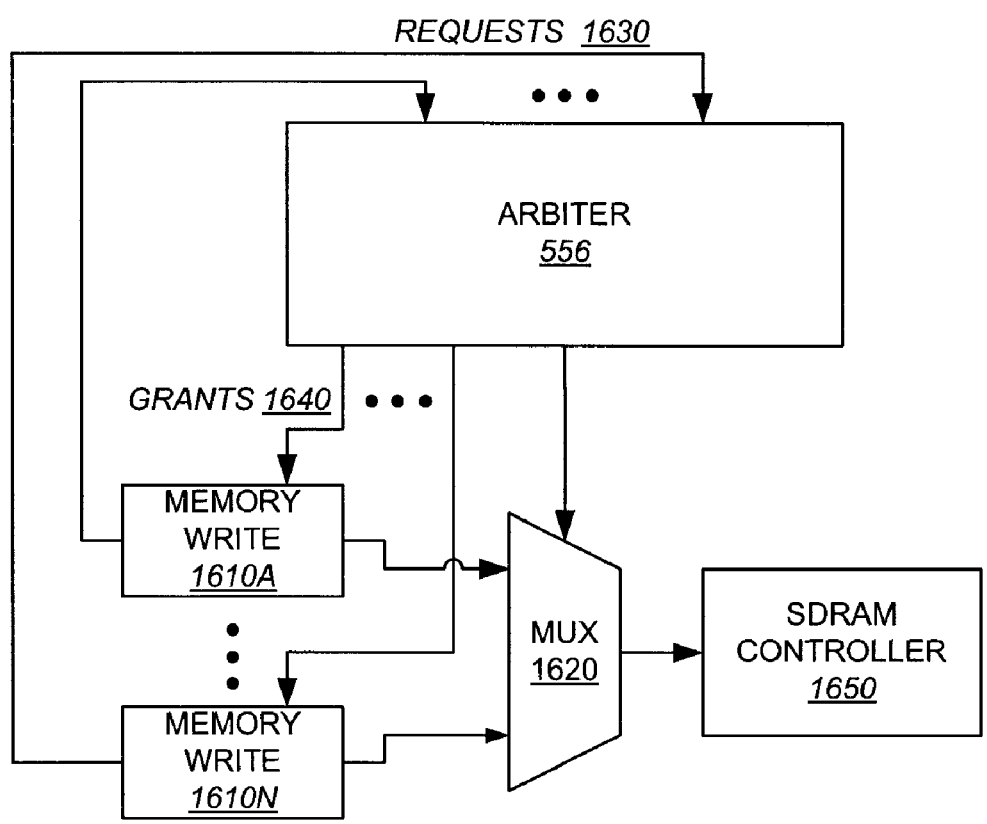
FIG. 16 depicts a conceptual configuration of an arbiter in conjunction with two or more memory writes.

FIG. 16 depicts a conceptual configuration of arbiter 556 in conjunction with two or more memory writes 1610A-1610N. A memory write 1610 could be memory write 1070, just described or one of the various others detailed below. Each memory write block sends a request 1630 to arbiter 556. Arbiter 556 sends a grant line 1640 to each memory write block indicating when memory writes begin. Arbiter 556 may also control MUX 1620 to select the output of the granted memory write component for delivery to SDRAM controller 1650. For example, SDRAM controller 1650 may be SDRAM interface 562, in the example shown in FIG. 5, or may include any other components coupled to SDRAM 340. Note that a similar arbitration scheme may be deployed for a memory arbiter 552 in order to write packets to the packet memory in accordance with the configuration modes selected. Various memory arbitration schemes are well known in the art, any of which may be deployed in various embodiments herein. In an example embodiment, generally, the controller is followed by an interface. The controller may control the logic of reads and writes to the memory, while the interface provides the physical connection. FIG. 16 serves as one illustrative example.

Transmit Processing

In the previous section, various embodiments illustrating aspects for efficient MAC processing of ingress packets were described, culminating in the processing of packets into the packet buffer, utilizing various data structures, to await transmission. In this transmit processing section, further efficiencies gained by the use of data structures introduced above will become evident. In addition, other aspects that enhance the efficiency for high speed MAC processing will be introduced.

In general, an access point capable of supporting many flows for multiple STAs provides a more complex analysis than a relatively simple STA supporting 16 flows. Thus, in many of the embodiments detailed below, the more complicated access point will be used as a reference. When necessary, differences between a STA and an access point will be highlighted. It is generally desirable in transmit processing to be able to accommodate a high number of flows, and still respond quickly when transmit opportunities become available. Further, support for legacy transmission specifications may be important. Some aspects are highlighted because of the reduction in circuit area, more efficient use of circuits, simplicity of design, and/or the ability to interface with legacy protocols and components.

One example illustrating the need for prompt response when a transmit opportunity arises includes the Unscheduled Automatic Power Save Delivery (UAPSD) protocol. Another example is immediate block ack. Embodiments detailed below provide efficient support for multiple flows by keeping a subset of packets ready for quick response. This allows support for UAPSD, immediate block ack, and prompt delivery when a TXOP is earned. This will, in most cases, prevent the need for previously used techniques for reserving bandwidth such as sending CTS to self, etc. In one example, if congestion in accessing memory prevents a larger aggregate to be prepared, a small set of packets may be transmitted quickly during a TXOP. Once an ack is received for that set of packets, if there is remaining capacity in the TXOP, additional packets may be transmitted. As stated earlier, removing firmware from the high-speed portions of packet processing increases efficiency. In example embodiments, various caches and queues may be deployed to decouple firmware processing (and its relatively lower speed) from MAC processing. These and other aspects will be illustrated in various embodiments below.

In example embodiments detailed below, several aspects are illustrated. In one aspect, a plurality of caches are deployed, each used to store elements associated with packets of a flow. These caches (illustrated by node caches 1810, below) allow for low-latency response times in a variety of applications. Low-latency response allows a station or AP to make efficient use of transmit opportunities of various types, such as reverse direction grants, UAPSD and similar requests, and to be able to capture remaining transmit opportunity following a transmission. Low latency response facilitates avoiding collisions (for example, a successful prompt response in an early transmission opportunity may avoid a collision caused by contention that would occur in a later response attempt). Low latency response may facilitate power savings.

In another aspect, shadow queues (referred to below as ping-pong queues, and defined by a queue-in-waiting and a queue-in-service) allow for queuing up elements of a flow in advance of a transmit opportunity (even while another flow is being processed for transmission). Thus, the flow is waiting, ready to be processed. This facilitates deferring processing until as late as possible. Deferring is often desirable to allow deferring a rate decision for a flow, because the rate decision is then as recent and fresh as possible, allowing for the appropriate rate to be selected to maximize throughput and/or minimize errors.

In another aspect, filling a queue (illustrated as queues 1842, 1850, and 1855, below) with elements associated with packets for a flow facilitates quick length determination for forming a packet (useful with deferred rate determination) as well as facilitating aggregation of packets promptly. In addition to aggregation in general, aspects illustrated facilitate retransmission (i.e., in response to a received block acknowledgement). These aspects are separately desirable in many contexts, and may also be combined.

In legacy 802.11 systems, support for four EDCA queues is typically provided. Recall that EDCA queues contend for access during unscheduled periods on the medium and, once a TXOP is earned, transmit as much data as possible, up to a maximum specified TXOP. In order to accommodate competing EDCA queues, various backoff schemes are deployed to prevent continuous, simultaneous attempts to earn a TXOP by competing EDCA queues. Thus, each EDCA queue may be associated with a channel, for which various timers are maintained, clear channel assessment (CCA) is made, and other procedures for gaining access performed. Some of these functions may be shared across channels or queues, and some may be different. In a wireless communication device, such as an access point, desiring to support many flows simultaneously (i.e. 256 flows in an example embodiment), maintaining back off timers and performing the various overhead associated with earning TXOPs for each of a large number of flows may not be desirable. Different settings for the various parameters of a channel type may result in providing differing quality of service levels.

Figure 17:
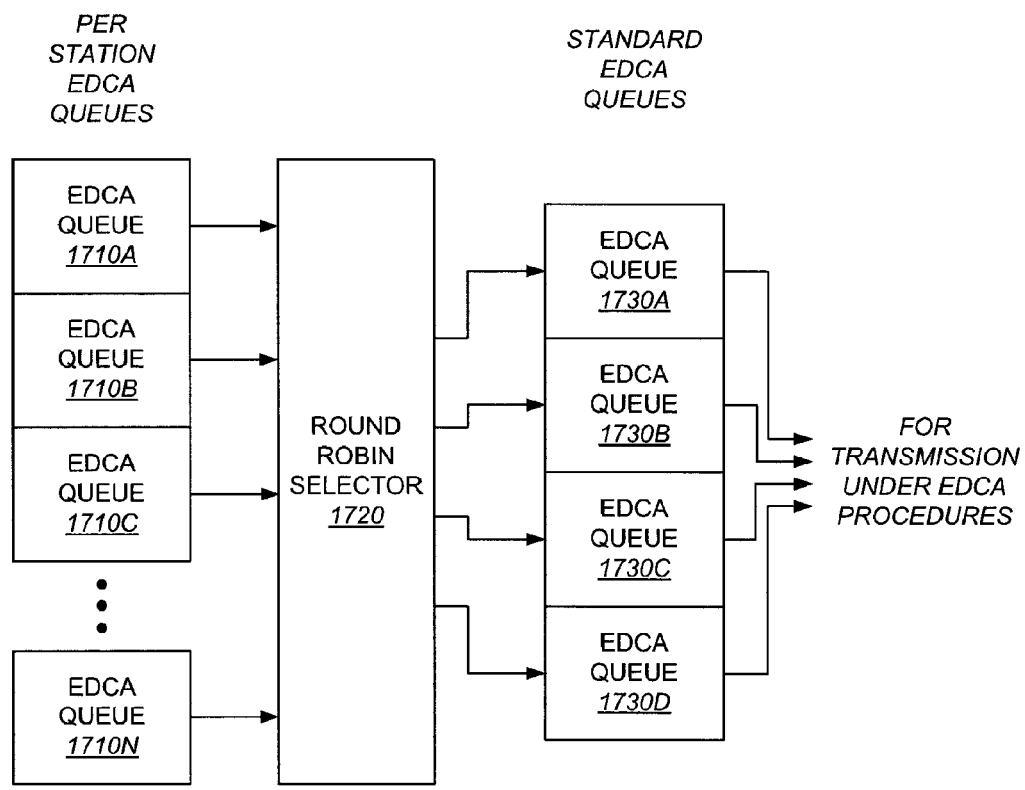
FIG. 17 depicts an example embodiment of a portion of a wireless communication device configured to support a relatively large plurality of EDCA queues using a smaller, fixed set of standard EDCA queues.

FIG. 17 depicts an example embodiment of a portion of a wireless communication device configured to support a relatively large plurality of EDCA queues 1710 using a smaller, fixed set of standard EDCA queues 1730. In one application, a plurality of EDCA queues may be deployed, each providing a different quality of service level. In this example, a plurality of N per-station EDCA queues 1770A-N are maintained. In the example embodiment, 256 such queues for each of the 256 flows supported may be maintained. Round robin selector 1720 arbitrates between the per-station EDCA queues and selects data to be queued up in one of 4 standard ECDA queues 1730A-D. An alternate scheduling algorithm besides round robin may be performed in a selector 1720, in an alternate embodiment. A selector may be deployed in a variety of ways, an example of which is detailed below in FIG. 18. In the example embodiment, firmware includes a scheduling function which provides the selection criteria for selecting per station EDCA queues for delivery using one of the standard EDCA queues. In alternate embodiments, naturally, any number of EDCA queues may be supported. Four queues are deployed in one embodiment due to the availability of existing legacy processing components, with the necessary timers and channel assessment components required to contend for and gain access to the shared channel. Those of skill in the art will readily find multiple legacy 802.11 cores and components, which may be included in various embodiments herein, or modified to support additional features desired. Example embodiments utilizing legacy cores and/or components in accordance with principles disclosed herein are detailed further below. Packets scheduled in EDCA queues 1730A-D may be transmitted using standard EDCA procedures. A firmware scheduler may perform additional scheduling besides EDCA, such as polled TXOPs (an example of which is known in the HCCA protocol). Various other protocols may be developed for which a scheduler can be adapted, as will be apparent to one of skill in the art. In addition to round robin selecting of EDCA queues 1710 for transmission with standard queues, it is generally more efficient to aggregate packets for each STA and do eigensteering (or other spatial processing) for all of the packets from that station. Eigensteering provides the greatest benefit when transmissions are steered to a particular station (or a group of similarly situated stations). Thus, it may make sense to put all the packets headed for a given station into one buffer so that they may be aggregated and transmitted to that station. It is possible, in an alternate embodiment, to have a single buffer for all EDCA packets. However, in this case, when the packets are interleaved with those to other stations (with other eigensteering values) then aggregation may be difficult or unable to be done.

The use of EDCA queues is illustrative only. In general, a selection of queues may be deployed, associated with channels of various types. The channel types may vary based on quality of service level and/or transmission type, such as scheduled or contention based access, for example.

Figure 18:
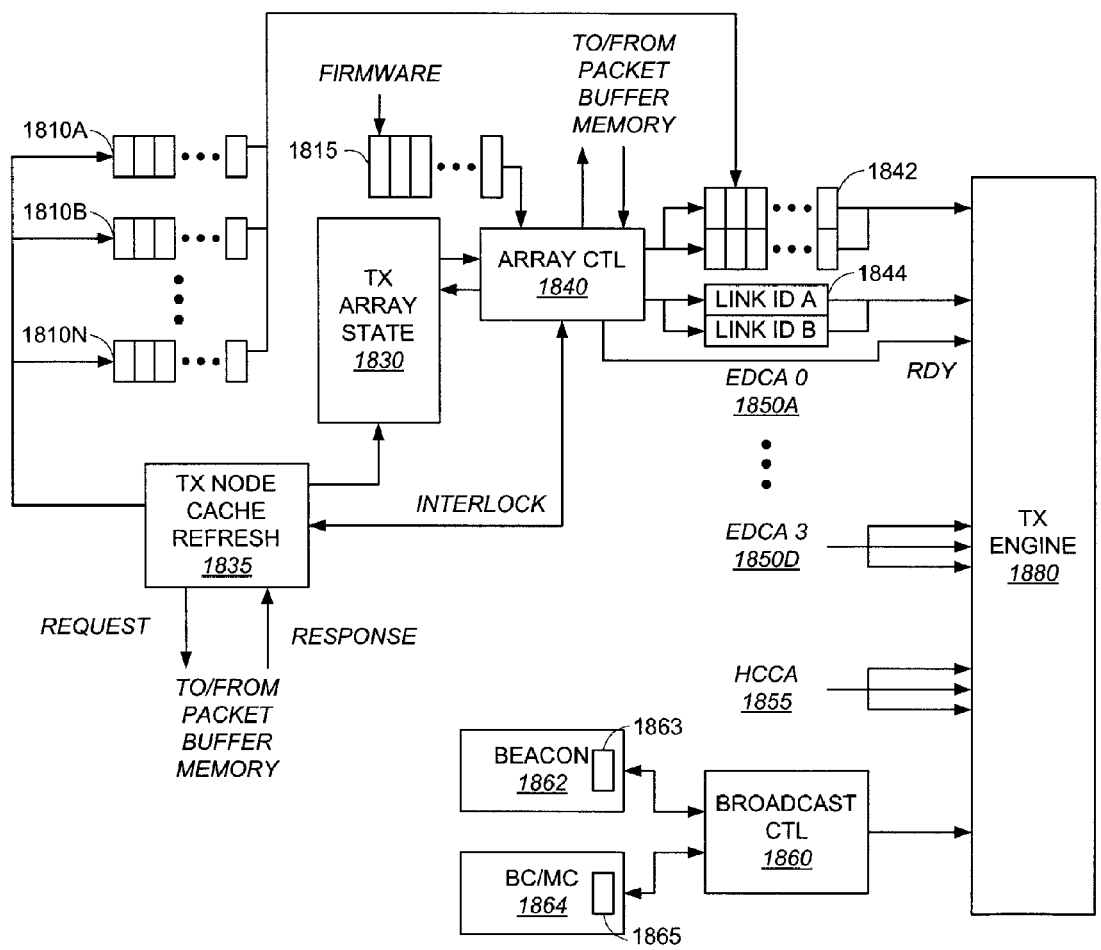
FIG. 18 depicts an example embodiment illustrating various components of a lower MAC core.

FIG. 18 depicts an example embodiment illustrating various components of a lower MAC core 540. Various aspects providing efficiencies of the use of nodes for packet processing, queues and caches for decoupling firmware from packet processing speed, and other aspects will be illustrated in the following example. Those of skill in the art will recognize that additional components (not shown) may be deployed, and not every aspect or feature illustrated is required in any particular embodiment to take advantage of other aspects or features. The details of FIG. 18 illustrate the scheduling of flows and the identification of various packets scheduled for ultimate transmission. The results culminate in delivery of the identifiers associated with scheduled packets, associated parameters, and a ready signal for each channel type to transmit (TX) engine 1880. In this embodiment, the packet identification is performed using nodes, as detailed above. In this example, legacy 802.11 type channels are used for illustration purposes. Those of skill in the art will recognize that any channel type may be accommodated using similar components detailed in FIG. 18. In this example, four EDCA queues are maintained, EDCA 0-3 1850A-D. An HCCA queue 1855 is deployed as well, along side a broadcast control channel 1860. The structure of EDCA 0 is illustrated in further detail, with details omitted for the other channels, as they may be the same or similar in various embodiments.

Transmission scheduling begins with firmware filling one or more command lists 1815 associated with each channel (1850 or 1855, for example). The command lists are filled with flow IDs to be scheduled. The command list may contain a flow ID along with a TXOP. For EDCA queues, the TXOP will be contended for, and thus the transmission time may not be known in advance. However, a maximum TXOP size may be included along with the flow ID. For HCCA scheduling, the TXOP size may be known, as well as the scheduled delivery time, and this TXOP information may be included with the flow ID in an associated command list 1815. For each channel, an array controller 1840 may control the scheduling of packets for the channel. The array controller pops a flow ID from the command list 1815 to determine the next scheduled flow for transmission. Maintaining several of these command lists allows the firmware scheduler to make a batch of decisions at once and put them in the respective lists, which may be carried out over time. This allows the various array controllers 1840 to process the flow IDs from the lists, reducing the need for firmware interaction. This allows a reduction in or elimination of interrupts to firmware and decouples the firmware scheduling from the MAC processing, as described above. Alternate techniques for scheduling flows for service in a supported set of channels, including EDCA type contention based channels or HCCA-type polled or scheduled channels will be readily adapted by those of skill in the art.

In this example, a TX node cache 1810 is maintained for each of the plurality of flows supported. TX node caches 1810 serve as examples of general per-flow caches, and are suitable for deployment as queues 1710 illustrated above. In the example embodiment, 256 such flows will be maintained. Each flow cache comprises space for a plurality of nodes (which represent respective packets for the flow). In the example embodiment, four nodes for each flow are maintained in each TX node cache 1810. Thus, at least 4 packets are identified as the next to be transmitted for each of 256 flows. Any immediate transmission required for those flows can be satisfied by at least these four nodes. In alternate embodiments, additional nodes may be supported, if desired.

While nodes are used in this example embodiment to illustrate one aspect, there are a number of equivalent techniques that may be deployed. For example, alternate data structures could be cached. In another example, the packet itself could be cached. In general, the caches, illustrated as the plurality of caches 1810, will be used to store one or more elements from which a respective one or more packets may be identified and retrieved following processing of the cached elements.

TX node cache refresh 1835 interacts with the caches 1810 to keep them filled and updated. TX node cache refresh 1835 may interact with a memory arbiter, such as memory arbiter 1080 detailed above. In one embodiment, a request is made to retrieve one or more nodes for flows and when access is granted to the packet buffer, the retrieved nodes may be placed in the respective TX node cache 1810. TX node cache refresh may be operated relatively autonomously from the rest of the processing shown in FIG. 18.

Array controllers 1840 for each channel determine the next flow ID for transmission from the command list 1815. From the flow ID, array controller 1840 accesses a TX array state table 1830 to retrieve various parameters and/or store state associated with that flow ID. Thus, TX array state 1830 maintains per-flow state information for the supported flows. (Note that, in an alternate embodiment, TX array state table 1830 may be combined with any other per-flow state table, such as TX Flow state table 1030, detailed above.) Note that TX node cache refresh 1835 also interacts with TX array state table 1830 to update certain parameters associated with cache refresh, illustrated further below. For example, TX node cache refresh 1835 retrieves nodes for the flow based on the respective node's transmit queue.

Array controller 1840 utilizes per-flow state for the scheduled flow to fill its respective TX node array 1842 (an illustration of a queue). TX node array 1842 is an array of nodes for the flow sequenced in order of transmission for delivery to TX engine 1880. As shown, the set of nodes stored in TX node cache 1810 for the current scheduled flow, identified by the command list 1815, are delivered to the TX node array 1842 for the channel on which the flow is scheduled to transmit. This allows for scheduling of a set of known nodes immediately when transmission becomes available. In the example embodiment, four nodes are available for each flow to be placed in TX node array 1842. The rest of TX node array 1842 may be filled with additional nodes for a flow. In an example embodiment, TX node arrays 1842 hold 64 packet identifiers, i.e. nodes, at a time for scheduled delivery through TX engine 1880. The first four are retrieved from the flow's TX node cache and the remaining packets are retrieved from the packet buffer memory. In similar fashion to other packet buffer memory accesses, requests may be made for retrieval of nodes for the flow from the packet buffer memory (details not shown). In an alternate embodiment, a node array may be filled directly from the packet buffer without first retrieving elements from a cache such as cache 1810. In yet another embodiment, caches 1810 need not be deployed at all, and aspects illustrated by node arrays 1842 may still be enjoyed.

Array control 1840, command lists 1815, and related components are examples of components that may be included in a selector (such as described above with respect to FIG. 17) for selecting elements from a plurality of caches (i.e. 1810) and storing them in one of a plurality of queues (such as illustrated by queue 1842 and EDCA and HCCA queues 1850 and 1860, respectively). In general, any number of per-flow caches or per-flow queues (i.e. a transmit queue in a packet buffer) may be selected by a selector for storing elements in a queue such as node array 1842, or in one of a plurality of such queues, based on any factors desired (such as quality of service, channel type, and the like).

In the example embodiment, as stated above, autonomous operation of the TX node cache refresh 1835 is desired, separate from the various array controllers 1840 filling TX node arrays 1842 for delivery to TX engine 1880. However, from time to time it may be possible that the TX node cache for respective flow may need refreshing around the same time that an array controller 1840 is accessing packets from the queue for that flow from packet buffer memory. Thus an interlock function may be defined to prevent either the array controller 1840 or the TX node cache refresh 1835 from corrupting the transmit queue, preventing either duplicating or dropping packets from that queue. Various interlock techniques will be apparent to one of skill in the art, and an example embodiment is detailed further below with respect to FIG. 20.

An additional aspect may be incorporated into the various channels, such as EDCA channels 1850, the HCCA channel 1855 or the broadcast control channel 1860. In the example embodiment, the TX node array 1842 is implemented as two shadow node arrays. Thus, a first shadow TX node array can be filled with nodes for a scheduled flow and a ready signal can be asserted to the TX engine 1880. The array controller 1840 may then proceed to pop the next flow ID from its command list 1815, and perform processing necessary to load a second shadow TX node array with packets for the next flow. In this way one TX node array may be processed for transmission while the other is being filled, reducing possible latency associated with waiting for a transmission to complete before beginning a new node array filling process. A link ID 1844 is associated with the TX node array 1842 so the TX engine 1880 may retrieve the proper link parameters and state for use in transmitting the flow on the actual physical link between two stations. When a ping pong or shadow cache is deployed as just described, link ID 1844 stores a link ID A for the flow contained in one shadow TX node array and Link ID B contains the link ID for the flow in a second shadow TX node array. Other parameters may also be stored along with the link ID in 1844, associated with each respective flow, in an alternate embodiment.

The two shadow node arrays are illustrations of a general aspect of shadow or ping-pong queues. In general, a queue may correspond to a particular type of channel, such as an EDCA or HCCA channel. Each channel may have an associated quality of service level, selected from a plurality of quality of service levels. The queue in this example comprises two shadow queues. The queue may also be described as comprising a queue-in-service and a queue-in waiting. The physical shadow queues alternate as being assigned as the queue-in-service or the queue-in-waiting. Thus, as described above, the queue-in-waiting may be filled without interfering with processing of the queue-in-service. When the queue-in-service has finished processing, then its corresponding shadow queue may be reselected to be the queue-in-waiting, and may begin to be filled with another flow at any time. The shadow queue that was the queue-in-waiting is then reselected as the queue-in-service, and processing for transmission may then commence. In this way, a relatively high number of flows, which may be associated with a variety of quality of service levels, may be selected for storing in the appropriate queue (according to quality of service level, as well as scheduled or contention based access, etc.). The selection may be round-robin based, as described above, or any other type of selection criteria.

As stated above with respect to caches 1810, while nodes are used in this example embodiment to illustrate one aspect, there a number of equivalent techniques that may be deployed. For example, alternate data structures could be stored in queues such as 1842 (or 1850 and 1855). In another example, the packet itself could be stored. In general, the queues, illustrated as the queue 1842, will be used to store one or more elements from which a respective one or more packets may be identified and retrieved following processing of the queued elements.

While filling one side of the "ping-pong" buffer 1842, for example with the four nodes from the node array cache 1810, there may be time during transmission to continue filling that array. Already mentioned, and detailed further below is the U-APSD mode, which makes immediate use of the first four packets. In U-APSD, an indicator such as a "more" bit may be sent with the first four packets. After transmission of the packets and awaiting an acknowledgement of the first four packets (with any required inter-frame spacing), the transmitter needs to be ready for additional transmission. During this time, additional nodes from the flow may be accessed from the TX node cache or the packet buffer, as appropriate in accordance with the embodiment deployed. For other transmission types, there may be similar opportunities to keep the TX node array full for transmission of all the packets afforded by the available transmit opportunity.

Broadcast control 1860 may be deployed with similar functionality to array controller 1840 in any given embodiment. However, it may require a reduced or alternate set of functionality. In this example, a beacon block 1862 is deployed which comprises a pointer 1863 pointing to a beacon packet. Firmware can generate the beacon packet, including any header information, parameters desired, etc., as well known in the art. Beacon 1862 can retrieve the created packet for transmission at the appropriate time. For example, the firmware scheduler may generate a time stamp value for the beacon being created and deliver this to beacon block 1862. Thus the beacon may be transmitted at or near the appropriate period (i.e. TBTT in 802.11 embodiments). In such an example, beacon 1862 generates, through broadcast control 1860, a ready signal to TX engine 1880. Contention for the medium is performed and the beacon will be transmitted at the appropriate time, adjusted for any delay associated with waiting for the channel to clear. Those of skill in the art will readily adapt FIG. 18 to accommodate beacons or other system signaling messages in light of the teaching herein. In an alternate embodiment, beacon 1862 may actually store the beacon packet directly, rather than using an indirection pointer 1863.

In similar fashion, a broadcast or multicast channel may be generated as well. Broadcast and/or multicast channels are essentially special purpose flow IDs. A broadcast channel need not be scheduled with multiple IDs like the command lists 1815 described above. However, if multiple broadcast channels and/or a variety of multicast channels are desired, similar scheduling procedures may also be deployed (details not shown). A broadcast or multicast packet may be identified by a pointer 1865 in broadcast multicast block 1864 for transmission on TX engine 1880 (via broadcast control 1860). Alternatively, the packet may be stored itself in 1864. Note that, as used in describing FIG. 18, it will be apparent that reference to a packet can be substituted for reference to a node, when a packet buffer memory scheme such as detailed above with respect to FIG. 6 is deployed. Thus, as can be seen, when nodes and chunks are used for storing packets, maintaining the queues is efficient and easy within the packet buffer memory itself. Furthermore, caches for scheduling a variety of flows, as illustrated in FIG. 18, may be maintained by simply retrieving and storing nodes (rather than moving the packets along with the nodes). As will be detailed further below, the only time the actual packet data gets removed from the packet buffer is at the point of transmission of the packet. In the meantime, the packet processing and scheduling is accomplished simply using the node. Additional aspects illustrating benefits of nodes are detailed further below in describing the TX engine 1880. Similar benefits are enjoyed on the receive processing side as well.

Figure 48:
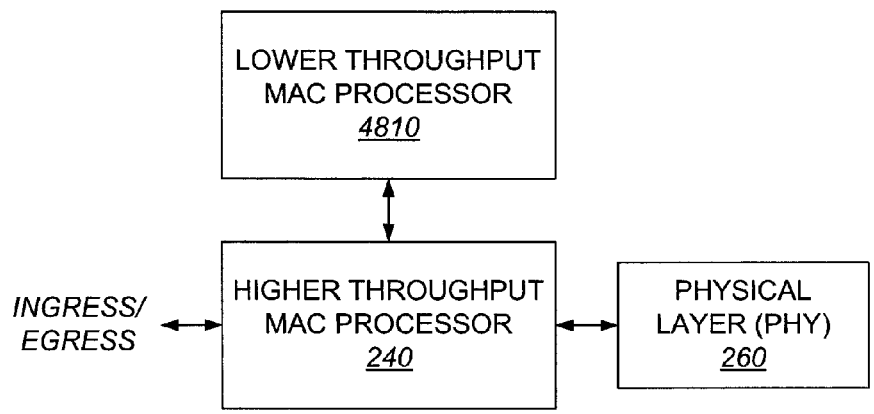
FIG. 48 illustrates an alternate embodiment deploying more than one MAC processor.

Note that, as detailed further below with respect to FIGS. 48 and 49, in an alternate embodiment there may be packets for delivery on TX engine that come from other sources than the packet buffer. For example, legacy or low throughput packets may be formatted in the processor using a firmware MAC processor, and those packets may be provided for transmission. Note that the structures detailed above may be adapted to such an embodiment. For example the command lists 1815 may be used to schedule transmission from the alternate sources as well. For example, a flow ID, number of packets to send, and an indicator of whether the packet is high or low throughput (or, more generally, from the packet buffer or an external packet sources). If a low throughput packet is scheduled, it may be retrieved from a transmit processor memory FIFO (i.e. 4950), or alternatively, from the processor memory (e.g., through DMA), as described below. Note that, in such an embodiment, the messages generated for broadcast control 1860, for example the beacon and any broadcast or multicast messages, may be alternatively formed in the firmware as well. Thus, components 1862, 1864 and 1860 may be omitted.

Figure 19:
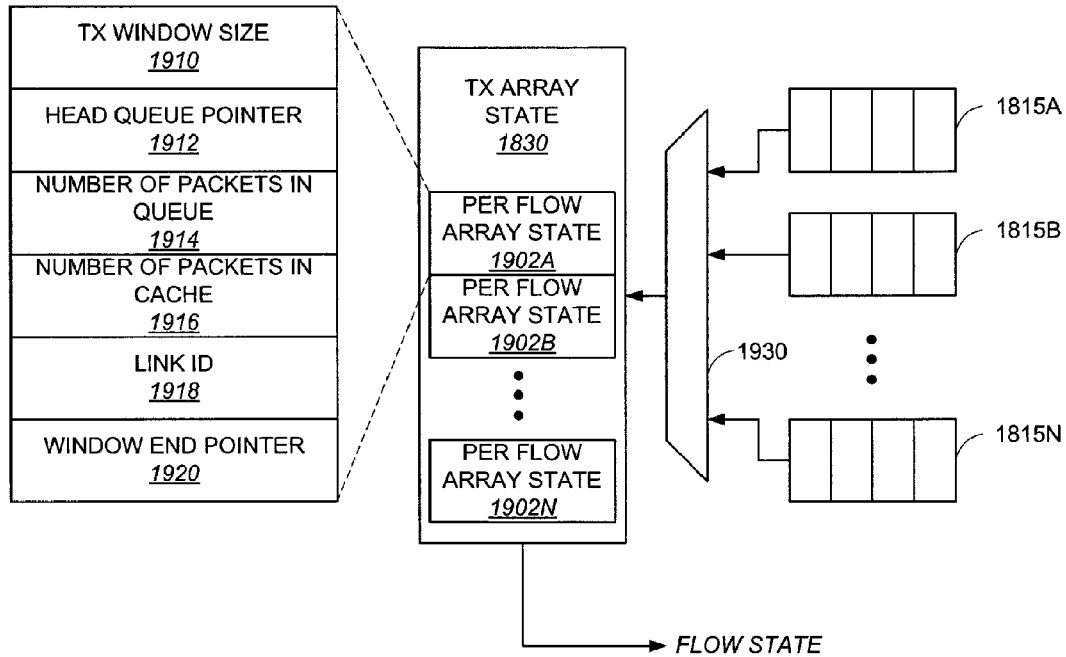
FIG. 19 depicts an example detailed embodiment of a section of a lower MAC core processor.

FIG. 19 depicts an example detailed embodiment of a section of lower MAC core processor 540. As shown in FIG. 19, a selector 1930 delivers flow IDs retrieved from command lists 1815. This is a conceptual illustration, in that it is arbitrary what type of channel is being accessed. Any number of command lists may be selected and coupled to TX array state 1830. When the flow ID from the selected channel is presented to TX array state 1830, the associated per-flow array state 1902 is retrieved and delivered to one or more components needing various components of that state. Selector 1930 is an example illustrating a selector selectively retrieving per-flow parameters (i.e. stored in an array state 1902) based on a flow identifier. In general, flow state tables (or any other set of per-flow parameters) may be retrieved by a flow identifier, or may be retrieved via indirection by selecting a flow index in accordance with a flow identifier, and using the flow index to locate per-flow parameters (perhaps stored in one or more memories. Examples illustrated herein show a variety of receive and transmit per-flow parameters, which may be stored and/or accessed using any of these techniques. As illustrated generally in FIGS. 3 and 4., an integrated circuit (for example) may be deployed to use either type of per-flow parameter storage, depending on in which mode the integrated circuit is configured. This facilitates the ability to support a variable number of flows, whether large or small, efficiently in the memories available.

An example per flow array state 1902 is illustrated. When retrieving nodes from the packet buffer for an associated flow, the number of nodes to retrieve is the minimum of the window size and the packets available. Thus, for either the total number of packets available or the transit window size 1910, a series of up to 64 nodes (in the example embodiment) may be filled into the TX node arrays. As described above, each subsequent node in the respective flow's TX queue is determined by reading the next queue pointer in each node, retrieving the next node, placing the node in the TX array, and so forth, until the packets available for the flow are depleted or the window is filled.

Head queue pointer 1912 indicates the pointer to the node at the head of the queue for the respective flow's transmit queue (e.g. a linked-list data structure). The head queue pointer is the first node to be retrieved in sequence when packets from the flow are to be transmitted. The number of packets in the queue is stored in field 1914. This number will be increased when ingress packets are received for the flow and decreased as they are transmitted. The number of packets in the cache, as stored in field 1916, which can be used in association with the TX node cache refresh 1835 to replenish the TX node cache 1810 and for populating the TX node array 1842 with nodes therefrom. Link ID 1918 is retrieved for the given flow and may be stored in link ID 1844 for use in the transmitter to retrieve the link specific state and/or parameters. In some embodiments, the linked-list of nodes may consist of a large number of packets. The window size may be used to make sure only those packets within the window are processed for transmission. Window end pointer 1920 may used for window management. Alternate embodiments may include additional fields, and may omit some of those described. Example additional fields include an AMPDU density field and a transmit queue tail pointer.

Figure 20:
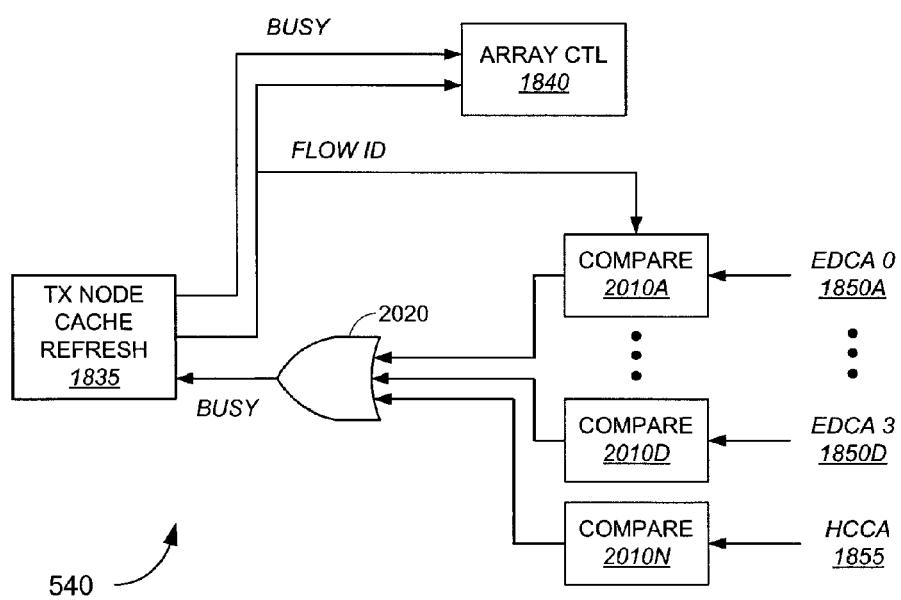
FIG. 20 illustrates an example interlock.

FIG. 20 illustrates an example interlock that may be deployed for use as shown in FIG. 18. In this example, TX node cache refresh 1835 generates a busy signal when it is in the process of retrieving information from the packet buffer memory. During this time it also indicates the flow ID of the TX node cache that it is updating. Array controller 1840 then knows whether a flow ID that it may be processing is having nodes accessed from the packet buffer (note that there may be several array controllers 1840, each receiving these signals, one for each channel). Thus array controller 1840 may defer accessing the packet buffer RAM for that flow ID, as some packets from that flow ID may be in transit to the node array cache. This prevents the array controller 1840 from interfering with the TX node cache refresh operation for a flow.

In addition, a number of compare blocks 2010 are deployed for receiving the flow ID from the TX node cache refresh. Each compare block receives a flow ID from a channel (i.e. EDCA 0-3 1850A-D, details not shown) indicating that the respective channel's array controller 1840 is accessing the packet buffer to retrieve nodes for filling additional spaces in respective TX node arrays 1842. If any of these flow IDs match, the respective line will be asserted. OR gate 2020 provides the logical OR of all the comparison outputs generates a busy signal. TX node cache refresh 1835 may wait to continue updating until the busy signal goes away. Or, it can change the flow ID to attempt to update a different flow's cache. If changing the flow ID de-asserts the busy signal, the TX node cache refresh 1835 knows that it will not be interfering with the operation of any of the array controllers 1840. Those of skill in the art will recognize various modifications to this interlock scheme, as well as other interlock schemes, which may be deployed within the scope of the teachings herein.

In an alternate embodiment (details not shown), a Four Packet Node Cache (FPNC) 1810 is maintained for each flow, as above. Each cache contains node pointers (12 Bytes). As above, these are the first four packets that will be transmitted on the WLAN when the respective flow gets a transmit opportunity. In this embodiment, when a packet is received at ingress, it is placed in the SDRAM and a node cache Finite State Machine (FSM) (which may be similar to or deployed in place of TX node cache refresh 1835) is signaled. If there is room in the four node packet cache corresponding to the received packet, node information is added to the respective cache memory. When the node information is sent to the SDRAM to be placed in the linked list, it is also sent to the FPNC. If there is room in the FPNC and if the FPNC is not in use (during a WLAN Tx Op for the respective flow), then the node info is placed in the FPNC. An in-service bit may be set by the array controller 1840 to indicate to the FSM that the flow is in service. This is similar in effect to the interlock detailed above.

The FPNC state machine operates on a first come first served basis to update the FPNC. The FPNC is particularly useful to serve packets for U-APSD enabled stations, detailed further below. When a trigger is received, lower MAC core 540 acknowledges the trigger and can respond with an aggregate of up to 4 packets immediately, as described above. The FPNC state machine needs to replenish FPNC after it is depleted due to a Tx Op. The FPNC state machine may operate utilizing a queue identifying flows that need to be replenished. The queue may consists of flows in priority order for service by the FPNC—the priority being decided by considerations such as whether the station is in U-APSD mode, whether the flow is an HCCA or EDCA based flow, and others.

The effect of this alternate embodiment may be similar to the TX node cache refresh block 1835 using the interlock detailed above. In general, there may be need to update the node array caches based on a trigger from ingress and/or a periodic refresh. An instantaneous (or nearly so) trigger from ingress may be desirable for time critical applications such as voice. Periodic refresh can be used to replenish the TX node caches with packets that are in the packet buffer (i.e. after one or more of the packets for the flow have been sent on for transmission and are no longer in the node cache 1810. (For example, if a packet arrived at ingress, and the node cache was full, so the packet simply went into the packet buffer, the generally desired outcome is to keep the caches full). Periodic refresh may be a background process, operating autonomously, in the example embodiment. Those of skill in the art will recognize that state machines, in-service bits, interlocks, and various other techniques may be used to keep the node caches full, and to fill them in response to needs generated by arriving ingress packets as well as departing transmit packets.

Figures 21, 22:
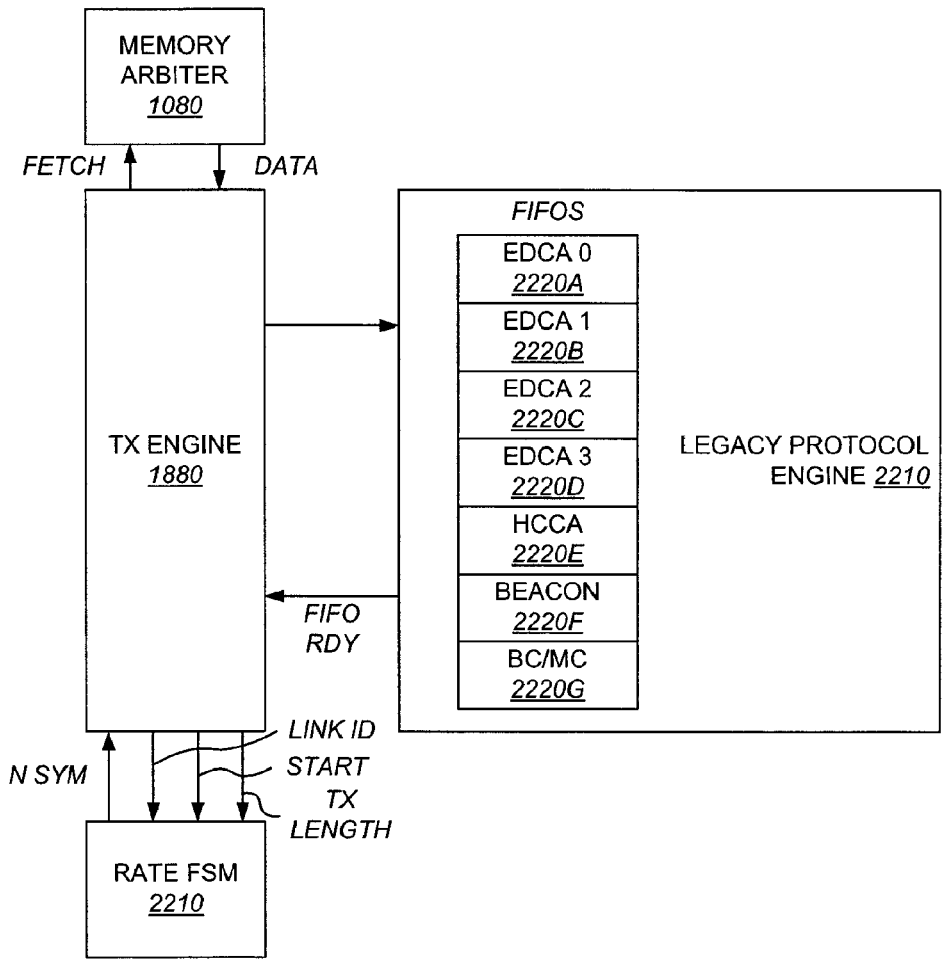
FIG. 21 depicts an example embodiment of a link ID.
FIG. 22 depicts additional components of an example embodiment of a lower MAC core.

FIG. 21 depicts an example embodiment of link ID 1844, detailed above with respect to FIG. 18. As shown, link ID A 2110 is stored identifying the link ID with the flow in one of the shadow TX node arrays incorporated in TX node array 1842. Field 2120 identifies the number of packets (i.e. nodes) that are included with that link ID. Note that, in this embodiment, aggregation is still based on the flow ID, as the link ID is used to identify physical layer parameters (such as PHY rates) and security keys. The index into this table is the flow ID.

Similarly, link ID B 2130 is stored for identifying the link ID of the flow in the other shadow TX node array incorporated within TX node array 1842. The number of packets associated with that link ID is stored in field 2140. Note that various other parameters and/or state variables may be stored alongside these, associated with the respective flows, for use in alternate embodiments, where desired.

FIG. 22 depicts additional components of an example embodiment of a lower MAC core 540. As described above with respect to FIG. 18, a plurality of channels may be connected to TX engine 1880, each of which asserts a ready indicator to let TX engine 1880 know that one or more packets are ready to be sent. Nodes identifying the packets will be waiting in TX node arrays 1842, and an associated link ID for those packets will be stored in link ID 1844. A set of each of these components may be present for each channel. FIG. 22 illustrates the further processing of these packets as they move down stream in the transmit chain.

TX engine 1880 receives the various ready signals and arbitrates between them to perform a variety of processes and tasks. When TX engine 1880 is ready to prepare packets for transmission, it knows the size of the TXOP, which indicates the length of time available to use the shared medium. However, since data rates are variable based on link conditions, the number of packets to send within the TXOP also varies. In the example embodiment, Rate Finite State Machine (FSM) 2210 is deployed for use in determining the number of OFDM symbols that a particular packet will use. TX engine 1880 delivers to Rate FSM 2210 a TX length indicating the length of the packet in bytes (which is conveniently located in the length field of the node). A link ID is delivered (from link ID 1844) and a start signal to indicate that the Rate FSM 2210 should begin its process. Rate FSM 2210 returns the number of symbols that the packet will use. This information may be used to determine the number of symbols for each packet that can be accumulated when performing aggregation, detailed further below. Note that a variety of alternate techniques for determining number of symbols, rates, and the like, may be deployed. The use of an external FSM which performs symbol computation per packet is but one of many examples suitable for deployment. An example embodiment of a rate FSM 2210 is detailed below.

TX engine 1880 is also coupled to a memory arbiter, such as memory arbiter 1080, described above. For each of the packets that are ready for transmission, TX engine 1880 fetches the chunks from the packet buffer according to the information in the respective node, and any linked chunks identified by the next chunk pointer. The chunk data is returned to TX engine 1880 where it is delivered to one or more FIFOs 2220. In this example, FIFOs 2220 are contained in a legacy protocol engine 2210. Note that the writing of data into one or more FIFOs may be regulated by a FIFO ready signal, or any other flow control mechanism. As described above, and detailed further below with respect to FIGS. 48 and 49, in an alternate embodiment, there may be additional inputs to TX engine 1880 for interfacing with more than one MAC processor. In an example alternative embodiment, the processor 210 and firmware implement a MAC processor for processing low throughput packets. These packets may be delivered to TX engine 1880, from processor memory fifos 4950 (or directly from processor memory, in another alternate embodiment).

As discussed above, it may be convenient to use existing legacy protocol components to perform a variety of functions to support 802.11 MAC processing. Other standardized protocol engines may also be deployed, and a legacy protocol engine 2210 may be modified to provide various features desired. In the example embodiment of a legacy protocol engine, there are four FIFOs 2220 A-D, one for each of the four EDCA queues. There is an additional FIFO 2220 E for the HCCA channel, and FIFOs 2220 F-G are deployed for the beacon and a broadcast/multicast channel. Note that a FIFO may be deployed as a single buffer (i.e. for storing a beacon signal). Any number of FIFOs, or other buffer types, may be deployed for receiving packets for transmission.

Figure 23:
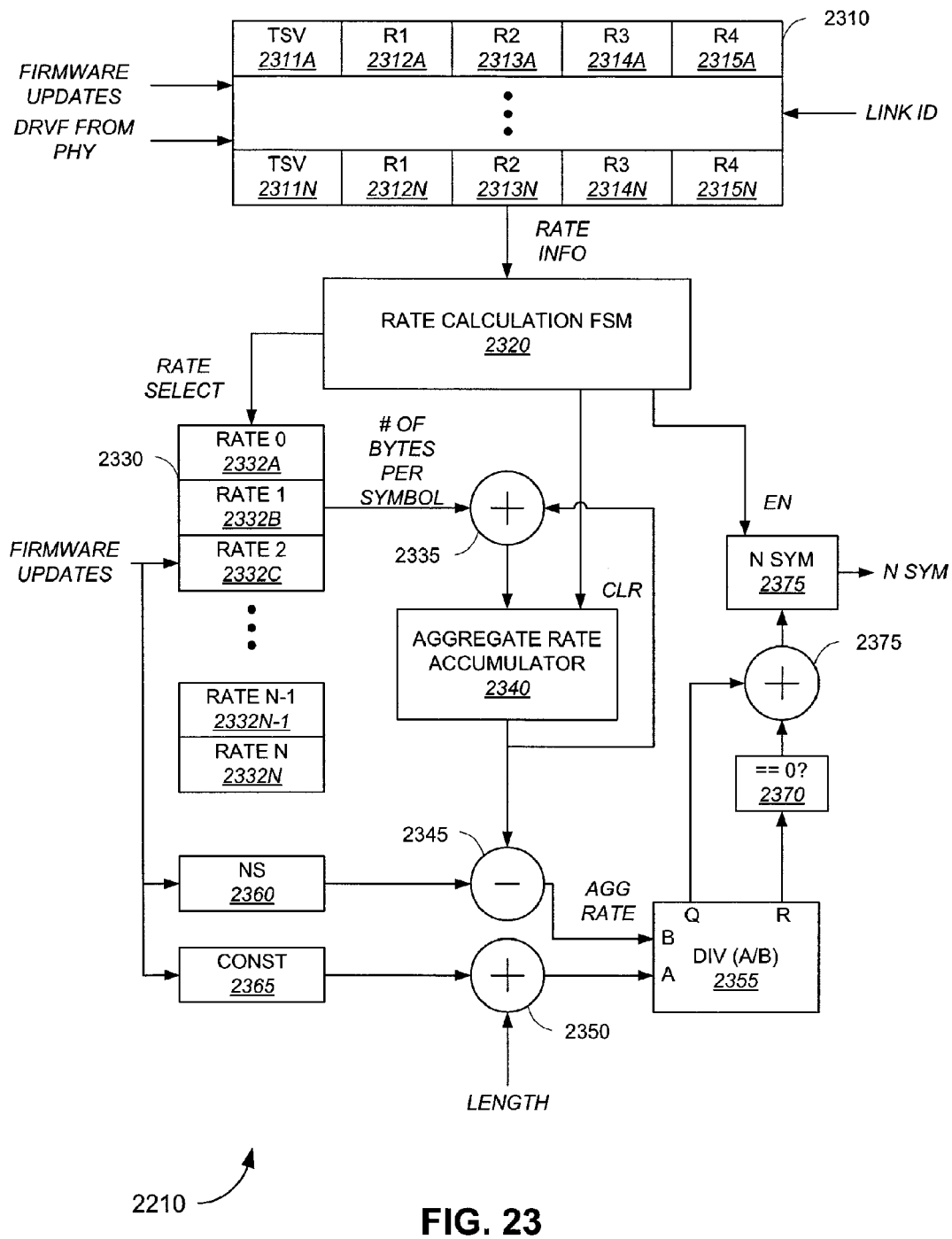
FIG. 23 depicts an example embodiment of a rate FSM.

Upon receiving a ready assertion, TX engine 1880 puts the first packet chunk in the proper core FIFO as specified in the first node. As just described, this may continue with additional chunks, if any, until the first packet is completed. Simultaneously, the total number of packets that may be transmitted may be determined using the rate FSM 2210. While monitoring FIFO ready, TX engine 1880 may continue the procedure, placing the remainder of packets in the respective FIFO. In the example embodiment, placing packets into the FIFO drives the legacy protocol engine 2210 to contend for access (for EDCA-type accesses) and begin transmitting (when access is earned, or during a scheduled TXOP FIG. 23 depicts an example embodiment of a rate FSM 2210. The received link ID is used as an index into rate table 2310. Table 2310 is stored on a link ID basis and comprises one or more rates associated with the link as well as a Time Stamp Value (TSV) 2311. Rate table 2310 can be updated in any of a variety of ways. Firmware may provide updated rates. A data rate vector feedback packet received may include rate information and may be used to update a variety of rates. TSV 2311 may be used to indicate the time stamp of when a packet containing rate feedback is received, thus providing an indication of whether the rate information is fresh or stale. For example, if a rate has not been updated in some time, a conservative approach may be to lower the rate in case the channel has deteriorated in the intervening time frame. Firmware may determine if there is aging and whether or not to back off rates and update the rate table. In the example embodiment, there are four rates R1—R4 2312-2315, corresponding to each of four antennas. Other information may be used in rate calculation as well, such as whether eigensteering mode or another spreading mode is used. Rate information from table 2310 is sent to the rate calculation FSM 2320.

For each rate, rate select table 2330 comprises a table updated by firmware with the number of bytes per symbol available for each of the rates. In an example embodiment, there are N=16 rates 2332, each with a corresponding number of bytes per symbol, thus each rate select value is 4 bits. The number of bytes per symbol is delivered to adder 2335, the output of which goes to aggregate rate accumulator 2340.

Aggregate rate accumulator 2340 is used to accumulate the aggregate rate and the output is fed back to adder 2335. Accumulator 2340 may be cleared with a clear signal from the rate calculation FSM 2320. For each of the rates available, the number of bytes per symbol is added to accumulate the total aggregate rate from which a certain number of symbols NS 2360 may be used to indicate the number of streams. NS 2360 is subtracted in 2345 to provide the aggregate rate. NS 2360 may be updated by firmware. The length of the packet, delivered in bytes in the example embodiment, is added in 2350 to a constant 2365 (also updatable by firmware), to generate the true length. CONST 2365 may indicate an optional constraint. For example, an AMPDU density may be deployed providing a minimum separation between successive MPDU headers. In divider 2355, the true length, A, is divided by the aggregate rate, normalized for NS, and generates a quotient and a remainder. The quotient is delivered to adder 2375 to produce, conceptually, a ceiling function, where, if there is any remainder in 2370, one additional symbol must be used (i.e. a fraction of a symbol was filled, so the entire symbol must be deployed). A register N SYM 2375 is enabled by the rate calculation FSM 2320 to store the resulting number of symbols for delivery and use by TX engine 1880.

Figure 24:
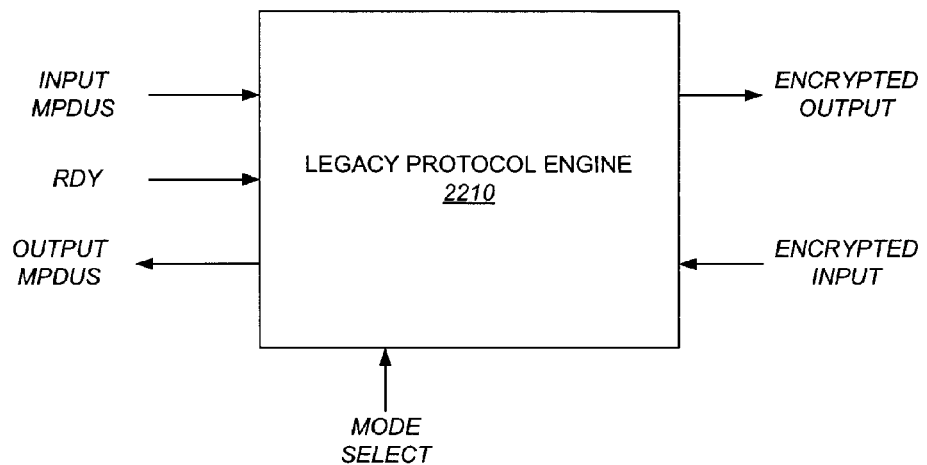
FIG. 24 shows an example legacy protocol engine.

FIG. 24 shows a conceptual legacy protocol engine 2210. A mode select signal may be used to indicate one of a variety of modes in which the protocol engine functions. In general, MPDUs are delivered, along with the ready signal to indicate that transmission should begin. The legacy protocol engine may generate encrypted output from the input MPDUs. In the example embodiment, the encryption features of legacy protocol engine (commonly found in a typical 802.11 core) are utilized. In an alternate embodiment, any type of encryption apparatus may be included, as is well known in the art. Also shown in FIG. 24 is an encrypted input (for example, received from WLAN 120) delivered to legacy protocol engine 2210 to produce unencrypted output MPDUs.

Figure 25:
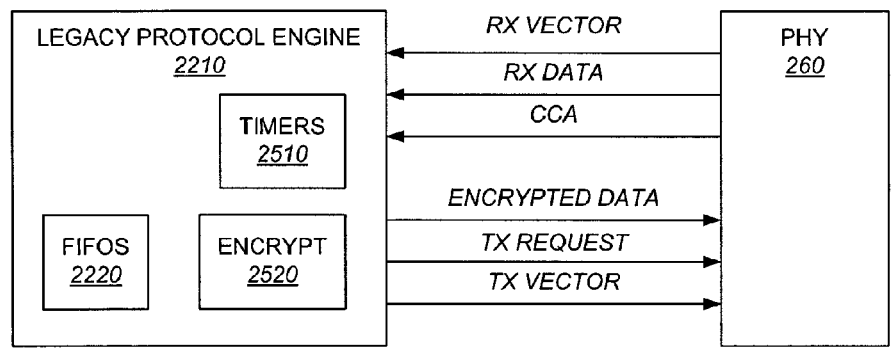
FIG. 25 shows an example legacy protocol engine connected with conceptual links to a PHY.

FIG. 25 shows a typical legacy protocol engine connected with conceptual links to PHY 260. As shown, an RX vector is delivered from PHY 260 to legacy protocol engine 2210 along with received data and a Clear Channel Assessment (CCA) signal. The RX vector may comprise a variety of information, such as the modulation type, length of received data, and other parameters. In particular, data rate feedback, useful for rate determination such as in rate FSM 2210, described above, may be returned. Clear channel assessment may be used with timers 2510, associated with various channels, to contend for access to the medium when using contention-based protocols (such as EDCA). Encryption and decryption may be performed in block 2520. FIFOs 2220 may be similar to those described above. For HCCA, of course, the transmission is scheduled, and may begin at a predetermined time. Encrypted data is sent to PHY 260 with a TX request signal indicating that transmission should begin. A TX vector delivered to PHY 260 indicates a variety of parameters resulting from legacy functions. Note that, in the example embodiment, when operating in a legacy mode, the output of legacy protocol engine may be sufficient for transmission on PHY 260.

Figure 26:
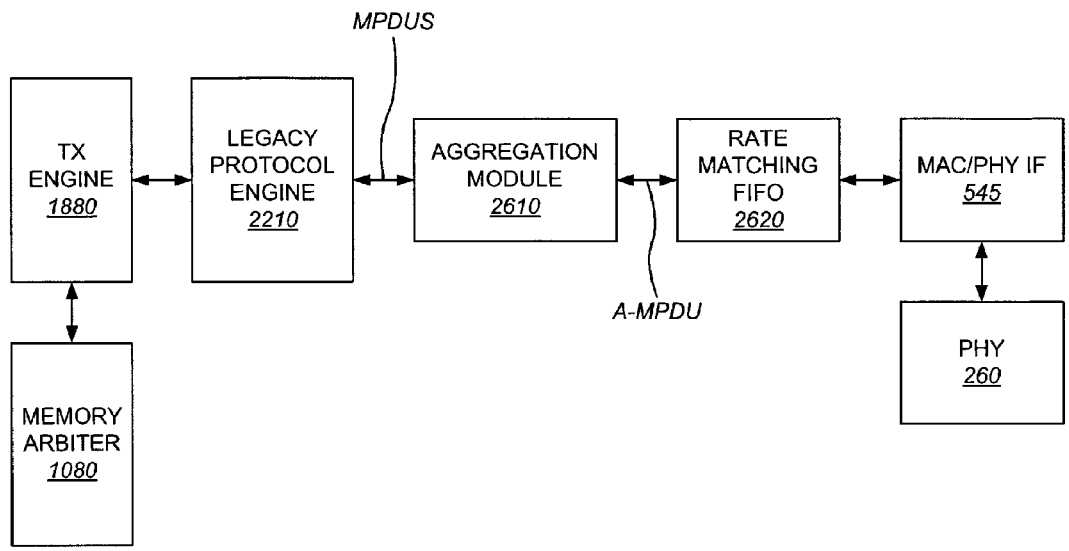
FIG. 26 depicts an example embodiment further detailing the MAC processing of transmit packets.

FIG. 26 depicts an example embodiment further detailing the MAC processing of transmit packets. In the example embodiment, the output of legacy protocol engine, MPDUs (encrypted when applicable) are delivered to an aggregation module 2610. In contrast to the embodiment detailed in FIG. 25, encrypted data output from the legacy protocol engine 2210 is not delivered directly to the PHY. In the example embodiment, modifications may be made to the legacy protocol engine 2210 so that a timed steady stream of encrypted MPDUs are delivered to the aggregation module, then onto the PHY for delivery. The modifications may be made to remove interframe spacings (such as SIFS) or any other features of the MPDUs that are not required for producing an aggregated frame. In various embodiments, aggregated frames may be of various forms, and may comprise various types of packets or MPDUs. A variety of techniques for timing the packets, such as time stamp, contention for access, and the like, have been detailed above, and are well known in the art.

The number of packets for aggregation may be computed in TX engine 1880. A call to the rate FSM 2210 may be made for each packet and, for the number of symbols returned per packet, the TXOP may be reduced by that number of symbols. An aggregate packet count may be incremented for each aggregate packet until the total number of packets that will fit within the TXOP is determined. This information may be delivered to aggregation module 2610.

Figure 27:
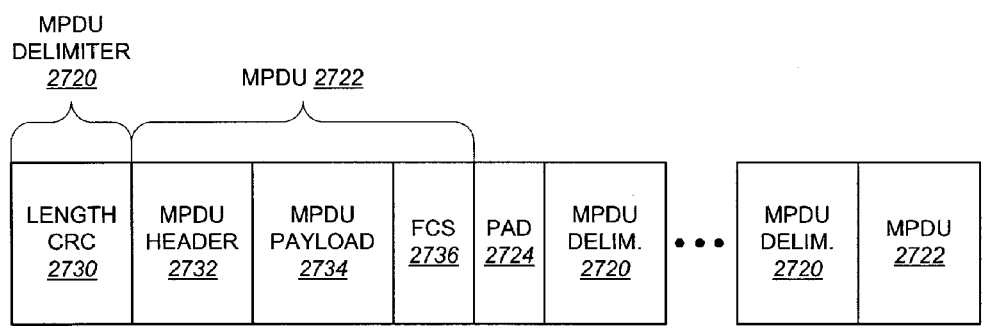
FIG. 27 depicts an example format of an A-MPDU.

Any number of aggregation formats and/or schemes may be deployed in various embodiments. In the example embodiment, an Aggregated MPDU (A-MPDU) is output from aggregation module 2610. The format of the A-MPDU 2710 is depicted in FIG. 27. As shown, an MPDU delimiter 2720 is interspersed between each MPDU 2722 in the aggregated MPDU 2710. One or more pad symbols 2724 may be inserted at the end of an MPDU 2722 such that the length of a sub frame of the A-MPDU is a multiple of 4 bytes. Each MPDU 2722 comprises an MPDU header 2732, MPDU payload 2734, and a frame check sequence 2736. In this example, the MPDU delimiter 2720 is a length CRC field comprising reserve bits set to zero, the length of the MPDU, a CRC of the reserved bits and length, and a unique pattern that may be used to scan for and detect the MPDU. In an example embodiment, the unique pattern is set to the ASCII value for the character 'N'.

Returning now to FIG. 26, aggregate MPDUs may be stored in a rate matching FIFO 2620 (in alternate embodiments, a rate matching FIFO may not be necessary depending on the type of PHY deployed and its characteristics). Rate matching FIFO 2620 is coupled to MAC/PHY interface 545 for ultimate delivery of packets for transmission on PHY 260.

Receive Processing

Figure 28:
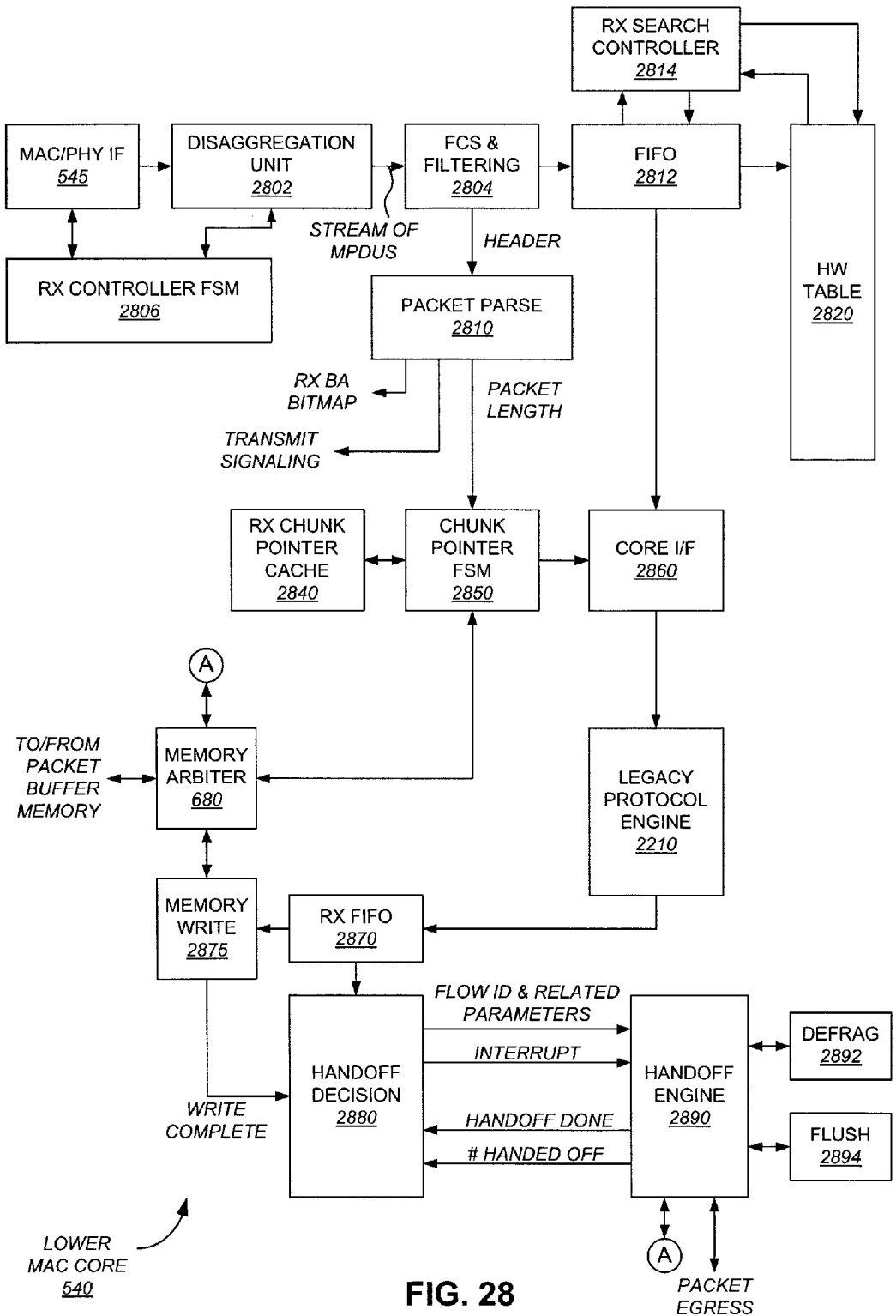
FIG. 28 depicts an example embodiment illustrating receive components of a lower MAC core.

FIG. 28 depicts an example embodiment illustrating receive components of lower MAC core 540. The receive components described in lower MAC core 540, or a subset of them, may comprise a portion of a receive engine, as described below with respect to the alternate embodiment shown in FIG. 49. Information data including packets received from WLAN 120 arrive at MAC/PHY interface 545 and are delivered to disaggregation unit 2802. As described above, with respect to aggregation in FIGS. 26 and 27, the example A-MPDU comprises an MPDU delimiter 2720 which may be used to separate the incoming data stream into its component packets in dissagregation unit 2802.

The resulting stream of MPDUs are delivered to FCS and filtering block 2804. In this block, the filtering function determines if any of the received packets are addressed for the instant device, including broadcast or multicast packets. The frame check sequence is checked as well. Those packets, addressed for the receiver, and for which frame check passes, are then delivered to FIFO 2812.

In an example embodiment, packets are stored into the FIFO as they are received, with the assumption that they are addressed appropriately and are good packets. A packet may then be easily flushed from the FIFO if it turns out to be an invalid packet, or not addressed for the current receiver. (One simple control mechanism is to retain a previous FIFO pointer, and to restore that pointer if the recently stored packet is to be flushed.) Packets (not flushed) from FIFO 2812 are delivered to core interface 2860.

RX controller FSM 2806 is deployed to control any of the various blocks detailed in FIG. 28. In particular, RX controller FSM 2806 may initiate processing upon a packet being received and provide various control signals to enable and store intermediate results as packets traverse through the receive chain.

In this example, the header is received and delivered to packet parse 2810 for processing. From the header of the packet, the transmit length is known, as well as where the packet starts and where in the packet to find the data and/or control bytes. The header also indicates the packet type (i.e. 802.11(a)(b)(g)(e)(n), or any other packet type supported).

Packet parse 2810 knows if the packet was received from a poll-type access (such as a contention-free poll) from the flow ID. The packet parse 2810 will thus send a signal to the transmitter to initiate a response when a response is required within a predetermined period (such as within SIFS). The packet parse 2810 may deliver the flow ID and the TXOP information to allow the transmitter to respond. When a block ack request is received, the received bitmap may also be delivered to the transmitter to perform block acknowledgement within the predetermined time frame if required (such as immediate block ack). Block ack, and other prompt response processing such as U-APSD, are detailed further below.

Packet parse 2810 delivers a packet length to chunk pointer FSM 2850 which determines the number of chunk pointers needed to store the incoming packet. Chunk pointer FSM will retrieve chunk pointers from RX chunk pointer cache 840, introduced earlier. In this example embodiment, chunks are identical to those described above, but the receive packets do not require the complexity and extra memory requirements of a true linked-list queue. Rather, a more simplified array may be deployed. This embodiment is detailed further below with respect to FIG. 33. In an alternate embodiment, the RX packets may also use the linked list structure identical to those used in transmit processing, if desired. Chunk pointer FSM 2850 interfaces with packet buffer 250 (i.e. through memory arbiter 1080) when it needs to retrieve additional chunks either for use with a packet or when updating RX chunk pointer cache 2840. In the example embodiment, up to four chunk pointers may be needed per packet, given the selected chunk size and a typical packet length. These chunk pointers are stored in the header of the packet as it traverses the rest of the receive processing chain, and used for ultimate writing of the packet into the packet buffer.

A core interface 2860 retrieves the chunk pointers and parameters included in an extended RX vector (from hardware table 2820) and adds them to the header of packets received from FIFO 2812. Packets are then delivered to legacy protocol engine 2210, which is used primary for decryption in the example embodiment, described above. Note that, in the example embodiment, and in typical legacy protocol engines available, the header will be ignored. Thus various control mechanisms can be performed by storing control information in the header as described in this example. The decrypted packets from legacy protocol engine 2210 are delivered to RX FIFO 2870. In the example embodiment, RX FIFO 2870 may be shared with or may be identical to the comparable FIFO 572 shown in FIG. 5.

While handoff and egress are detailed further below, their basic structure is illustrated in FIG. 28. One aspect of this structure is that the handoff decision is decoupled from the actual handoff process itself, allowing packets to be received and processed without waiting for bottlenecks that can form when other packets are awaiting egress handoff. Bottlenecks may form when in-order delivery of packets is prescribed, and retransmission is required for one or more packets. This is detailed further below.

Packets from RX FIFO 2870 are delivered to memory write 2875 which makes requests for access to the packet buffer memory 250 via memory arbiter 1080, as described above. While a packet is waiting to be written into the packet buffer, parameters for that packet are delivered to handoff decision block 2880 to begin the handoff decision. In order to prevent a quick handoff procedure occurring before the packet is fully written into the packet buffer, a write complete signal is sent from memory write 2875 to handoff decision 2880.

Handoff engine 2890 is connected to handoff decision 2880. A variety of example signals are shown for interaction between handoff decision 2880 and handoff 2890, which will be detailed further below. Handoff engine 2890 retrieves packets from the packet buffer, via a memory arbiter 1080, and ultimately delivers packets for egress. Handoff engine 2890, depending on the packet type, may use defrag block 2892 to remove headers, etc. from packet fragments and reform an unfragmented packet for delivery on packet egress. As detailed below with respect to FIG. 48, fragmentation may be optional and related components may be omitted. From time to time, situations may occur in which one or more packets are to be dropped. Flush block 2894 is connected to handoff engine 2890 for performing these tasks. Various other memory management functions associated with maintaining the linked list structures for queues, pointers, nodes, and chunks may also be handled in these blocks.

The RX search controller 2814 monitors packets that come into the FIFO 2812. RX search controller determines the flow ID for the packet. In the example embodiment, a TA and TID search table may be deployed, as described for ingress packet processing such as in FIG. 10 above. Hardware table 2820 is deployed to maintain state and parameters for both flows and links. Hardware table 2820 is detailed further below, and includes example embodiments for the two configurations detailed above with respect to FIGS. 3 and 4. In that context, hardware table 2820 may be a component of hardware table 320.

In one embodiment, separate hardware tables are maintained for ingress and egress (and possibly transmit processing). In an alternate embodiment, one or more functions may share a hardware table. In that case, hardware table 2820 may be virtually identical to hardware table 320 as detailed in FIGS. 3 and 4. Those of skill in the art will recognize that sharing tables may introduce complexity associated with arbitrating for multiple requests, and the need to ensure sufficient bandwidth for the number of accesses required. On the other hand, sharing tables may reduce overall area, and may reduce the number of updates to parameters that may be common to both, across multiple tables. For example, consider an AP with a merged receive and ingress hardware table. TSID and TID are the same when the AP is receiving from a STA to which the AP previously transmitted. While it is not always true that the destination MAC address and the transmit MAC address are the same (there could be additional devices coupled behind the destination), there are situations where they are the same. In those situations, there are benefits from sharing the table. Thus, the merged table can be made larger than either of the tables would have been alone to accommodate for cases in which the addresses are not the same. Nonetheless, sharing may yield an area advantage As described above, in the example embodiment, a ping-pong cache, allowing firmware to reorder the list while updating and simultaneous access for the search controller from a shadow list may be deployed. A binary search is performed to get the flow ID which is used to index hardware table 2820

Figure 29:
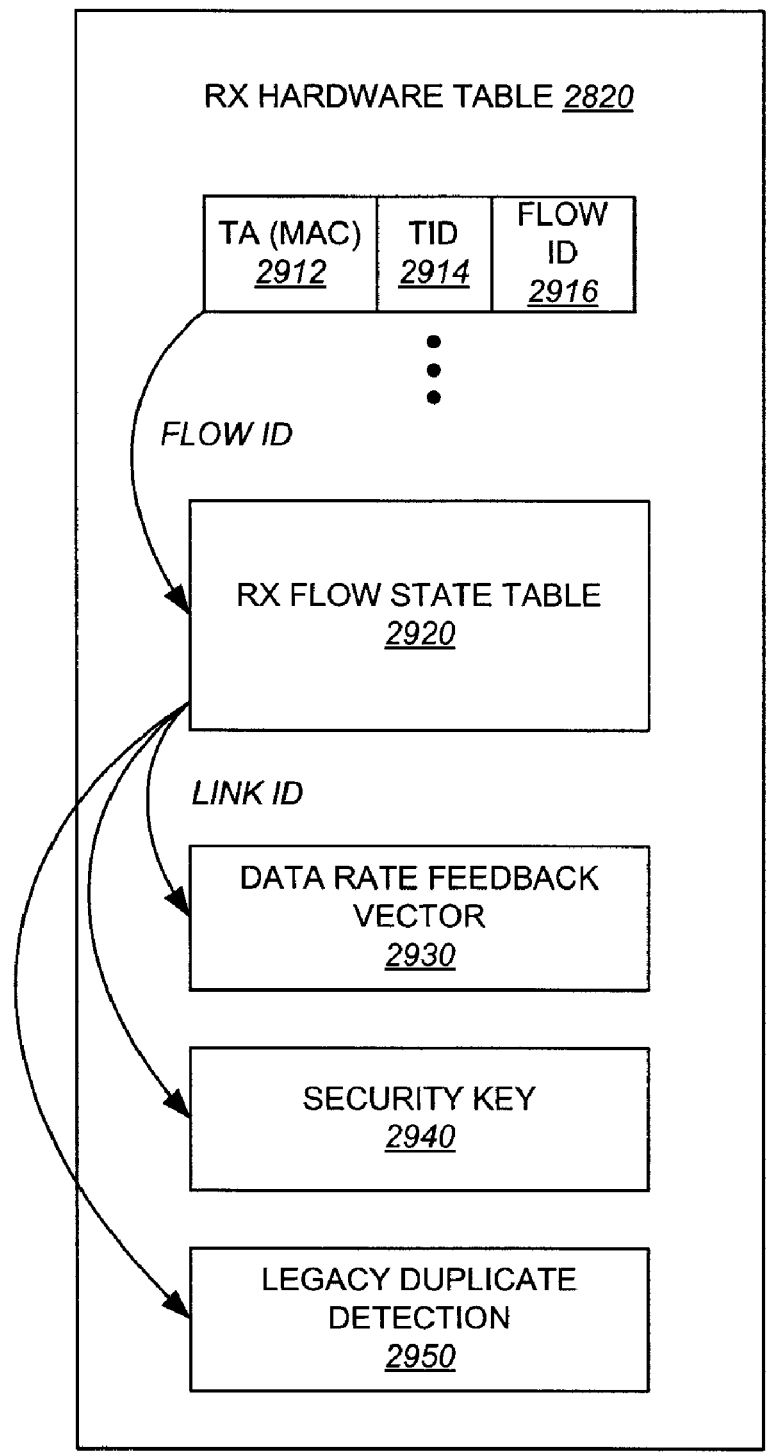
FIG. 29 depicts an example embodiment of a hardware table configured for a user terminal.

FIG. 29 depicts an example embodiment of hardware table 2920 configured as a STA, similar to the arrangement described above with respect to FIG. 3. Thus, in this case all the various parameters associated with flows and links are maintained in the hardware table, as the STA supports only 16 flows (in this example). In hardware table 2820 are a list of transmit addresses 2912, TIDs 2914, and flow IDs 2916, for each supported flow. Thus, the flow ID may be retrieved from the TA plus the TID and used as an index for the appropriate RX flow state table 2920. In the example embodiment, the firmware creates an ordered table directs the HW to work with one table or another. The binary search is done in HW on a current table. When a new flow needs to be added, the firmware adds the flow to a standby table, orders it, and then switches the hardware's current table to the standby table. Then, the original table becomes the new standby table. An example RX flow state table 2920 is described with respect to FIG. 31 below.

Additional link-specific parameters may also be included in hardware table 2920. These parameters may be addressed by the link ID, which may be stored in the Rx hardware table 2920. Examples include data rate vector feedback 2930, described above for use with respect to rate determination and rate determination, packet formation, and aggregation. The receive processor may have access to this information from messages delivered from the remote devices and may store this information in hardware table 2920. As described above, per link security key 2940 may be used for various types of encryption. Various security key types may be stored to support varying encryption protocols. Legacy duplicate detection block 2950 stores the sequence number of the last packet received correctly and the sequence number of the current packet may be compared with this value for the purpose of duplicate detection.

Figure 30:
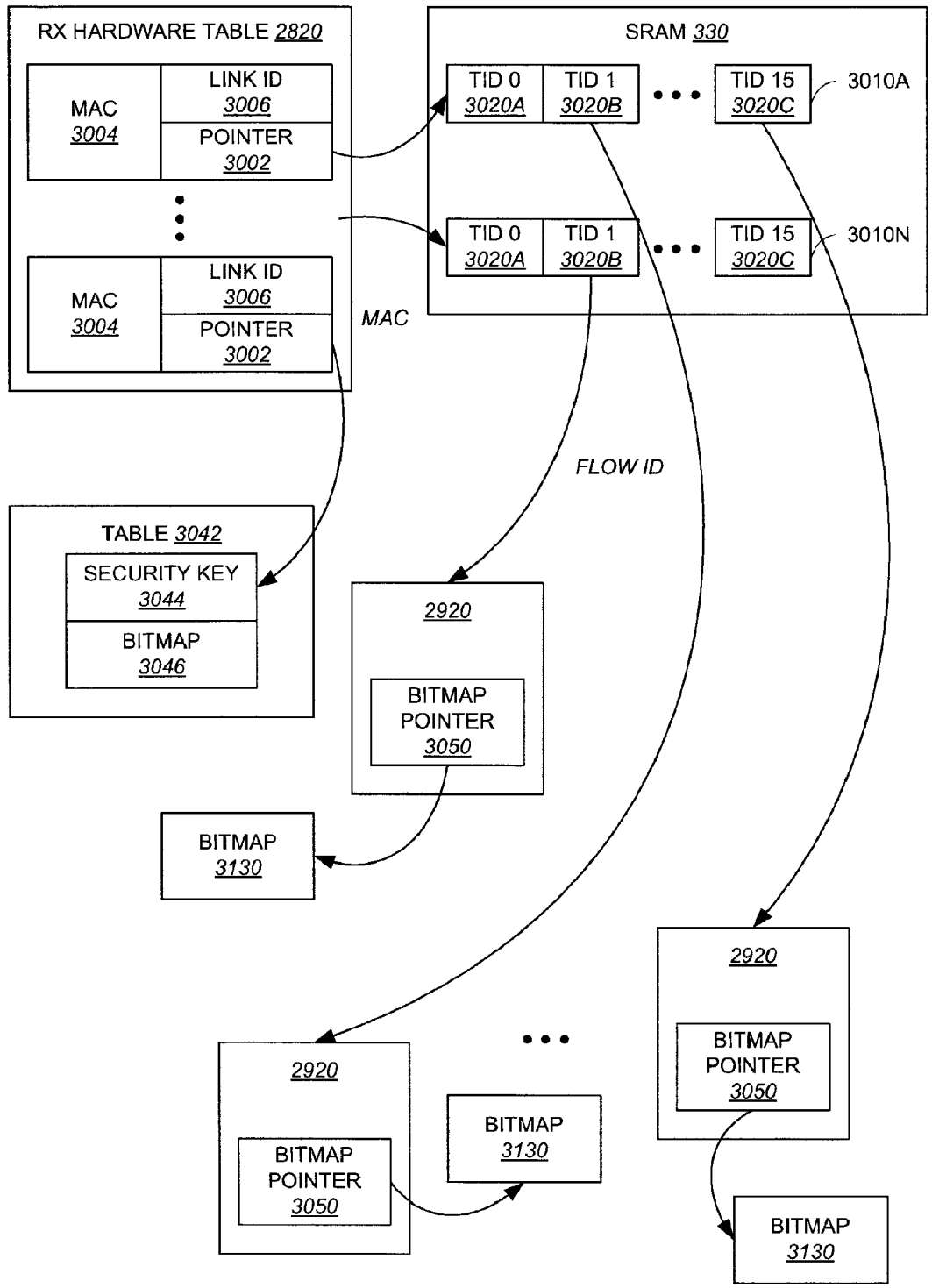
FIG. 30 depicts an example embodiment of a hardware table configured for use in an access point or super station.

FIG. 30 depicts an example embodiment of hardware table 2820 configured for use in an access point or super station, as detailed above with respect to FIG. 4. In this example, a variety of pointers 3002 are associated with MAC indexes 3004 within hardware table 2820. Note that, in this example, a link ID 3006 is also stored along with each MAC ID. Note that the link ID 3006 could be alternately stored along with other parameters in an alternate location, such as SRAM 330, for example. In contrast to the hardware table 2820 illustrated in FIG. 29 (in which various parameters for links and flows were stored in the hardware table), aside from the link ID 3006, all the parameters are stored in an alternate memory, such as SRAM 330.

SRAM 330 comprises common rate tables 3010A-N each of which comprise pointers for each MAC address (i.e. each link, for which up to 16 flows may be supported). The parameters for the various flows are stored in parameter tables pointed to by flow indexes 3020. This provides a level of indirection for the actual parameters. In the example embodiment, SRAM 330 is also used to store tables such as RX state tables 2920, an example of which is detailed further below. Thus, for each link, support for the maximum number of flows is included in the indexing scheme as shown in the common rate tables 3010. However, the memory usage can grow as flows are added.

Memory does not need to be allocated to store parameters in advance of when a flow becomes active. Thus, for a given link, if only one or two flows are active, then only one or two RX flow state tables 2920 need to be created and populated.

Also shown in FIG. 30 is an alternate table 3042, which simply includes a security key 3044 and a bitmap 3046. This example shows a reduced parameter set, suitable for use with 802.11 (g) packets. In such an alternate embodiment, using a reduced state table may save memory and time associated with additional memory accesses. However, a common structure may also be used for all packet types in an embodiment.

Details of an example RX flow state table 2920 will be illustrated below with respect to FIG. 31. However, one component, bitmap 3130, is illustrated here. Bitmap pointer 3050 is shown pointing to a bitmap 3130. Bitmaps 3130 are also stored in SRAM 330, in the example embodiment. This level of indirection allows a simple common format for accessing a bitmap, while allowing the memory usage to grow in response to need, in contrast with preallocation of the maximum memory that could be required. Thus, in similar fashion to the ability to grow RX flow state tables as needed, varying types of bitmaps may be supported without the need to pre-allocate the memory for them. For example, when fragmentation is supported, a bitmap may comprise 64 packets with 16 fragments each. This is a much larger bitmap than would be required by a simple block ack bitmap with a single bit for each packet in a 64-packet window. Thus, for flows requiring fragmentation, larger block ack bitmaps may be created, while those requiring less memory may be created with a smaller bitmap.

This figure illustrates various memory configuration aspects, including providing for increased flexibility and more efficient memory use. Additional block ack processing aspects are detailed further below.

Figures 31, 32:
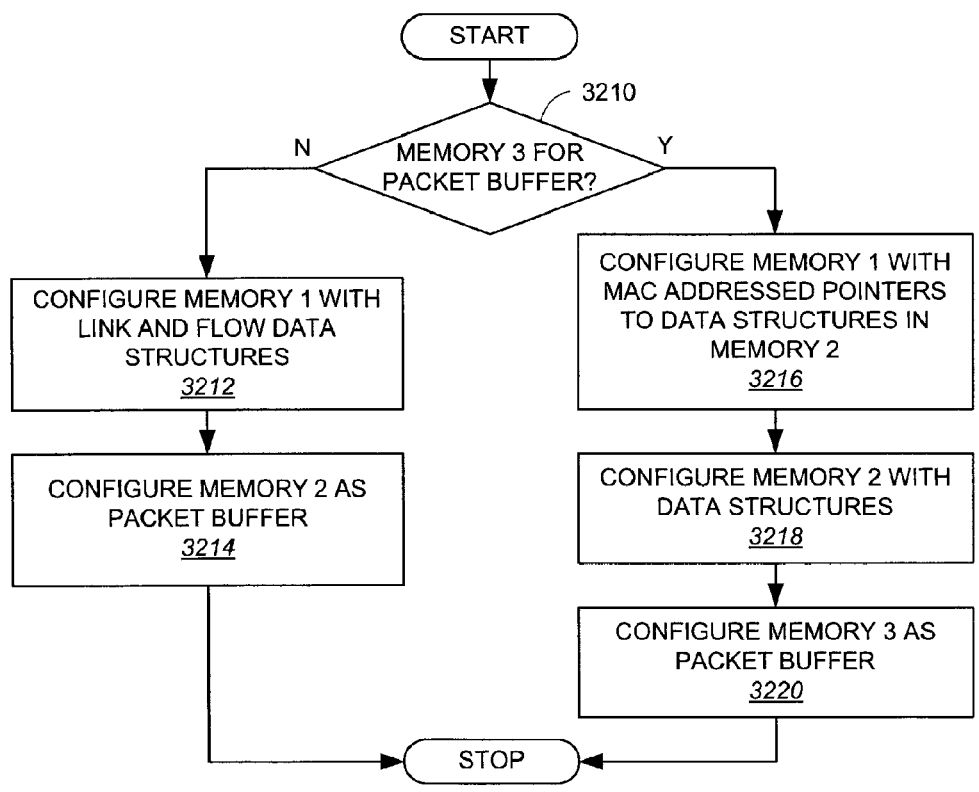
FIG. 31 depicts an example embodiment of an RX flow state table.
FIG. 32 depicts an example embodiment of a method for configuring hardware tables and memory in various configurations.

FIG. 31 depicts an example embodiment of an RX flow state table 2920. A variety of fields are illustrated. In alternate embodiments, additional fields may be introduced, or some of those shown may be omitted. Note that, in general, any of the flow state tables herein, including RX flow state table 2920, per-flow array state 1902, TX flow state table 1030, and similar per-flow tables may be combined or separated into any number of per-flow tables, as will be clear to one of skill in the art.

Starting sequence number 3102 may be used for indicating the sequence number of the beginning packet in a block transmission. The starting sequence number may be updated when transmitted packets are received (i.e., the window moves forward). In one embodiment, the existing starting sequence number plus a Window Size 3104 may determine the sequence numbers of the expected incoming packets. However, a transmitter is allowed to send packets that exceed this limit in sequence numbers and, in such case, the starting sequence number may be calculated by taking the largest received sequence number and subtracting (Window Size−1). The starting sequence number may also be explicitly updated by an incoming BAR (Block_Ack Request). Various block acknowledgement processing techniques are detailed further below. In one example, window size may signify the buffer allocated (in units of packets) to a given transmitter at a Receiver. In that case, the transmitter should not send unacknowledged packets that exceed the window size at the receiver.

The immediate block ack field 3106 may be used to indicate to the receiver whether the transmitter is expecting an immediate or a delayed block acknowledgement. Support for immediate block acknowledgment is mandatory in the current 802.11n draft standard.

Bitmap 3130 may be an actual block ack bitmap, i.e. when hardware table 2820 is configured as a STA, as described above with respect to FIG. 29. In an alternate configuration, bitmap 3130 may be a pointer to an actual bitmap, as described above with respect to FIG. 30. Ethernet header 3132 is stored for replacing the MAC header with the appropriate Ethernet header when preparing packets for egress. WIN pointer 3134 is a pointer to the data structure that holds the physical addresses of the packets stored by the reciever that need to be eventually handed off to the higher layer (see example handoff techniques detailed further below. In one example, these packets are stored in the buffers to be handed off in sequence to a higher layer. If there is a hole (lost packet) at the head of this data structure then the Rx has to wait until this hole is filled in order to hand off packets in sequence to the higher layer in order. Note that Window pointer 3320, detailed below, is one example of a pointer suitable for use in this field.

In one example, an old starting sequence number 3138 may be set equal to the starting sequence number to begin with. When an incoming packet causes the starting sequence number to change, the receiver may pass up to a higher layer all packets from the old starting sequence number to the current starting sequence number. After this operation is performed, the old starting sequence number may be set equal to the current starting sequence number. Link ID 3140 indicates the link associated with the flow. This may be used for retrieving link-specific parameters for use in receiving or transmitting on the WLAN 120. Various examples have been detailed above. A field 3136 indicating no more fragments are to be received may be deployed. In various embodiments in which fragmentation is not performed, or when it is performed in an alternate MAC processing unit, this field may be omitted.

FIG. 32 depicts an example embodiment of a method for configuring hardware tables and memory in various configurations. Note that the techniques discussed with respect to FIGS. 29-31 may be applied similarly with other hardware tables, such as transmit flow state table 1030, detailed earlier. The details of configuring transmit tables are omitted for the sake of brevity. Recall also that hardware tables may be combined to support various components (i.e. receive, transmit, ingress, egress, etc.). The principles identified by the levels of indirection for receive hardware, flow state tables, RAMs, and/or packet buffers may be applied with equal force to other state tables described herein, or combinations thereof.

A general process 3200 is described in FIG. 32. In this example, first, second and third memories are described. Note that, as detailed herein, any number of memories of various types may be deployed. In an example embodiment, memory 1 is a hardware table, such as hardware table 2820 or 320. Memory 2 is a larger memory, such as SRAM 330. Memory 3 is an external memory in this case, although internal third memories are also anticipated. In this example, memory 3 may be SDRAM 340.

In decision block 3210, if a third memory is to be used for the packet buffer, proceed to 3216 to configure various components of the wireless communication device in a first mode (i.e., components in a MAC processor ASIC 310 or various others). In the example embodiment, the first mode utilizes an external packet buffer stored in an external RAM such as SDRAM 340.

In decision block 3210, if a third memory is not to be used for the packet buffer, proceed to 3212 to configure various components of the wireless communication device in a second mode. In the example embodiment, the second mode is a STA-type mode, described above (wherein SRAM is used for the packet buffer) and the parameters are stored in the hardware table.

At 3216 configure the first memory (which may be a hardware table) with MAC addressed pointers to data structures in the second memory. At 3218, set up the second memory with the data structures. These data structures may include varying additional levels of indirection, such as described above with respect to FIG. 30. For example, a first data structure may identify flows associated with MAC addresses. The flow IDs may be used to index additional tables such as the RX flow state table or TX flow state table. Further still, one or more tables, such as the RX flow state table, may have pointers to additional data structures associated with the flow (such as the bitmap pointer pointing to the location of the block ack bitmap). At 3230, configure the packet buffer in the third memory. In one example, configuring a packet buffer may include setting up various free pointer lists (such as free node pointer list 710 and free chunk pointer list 720 and allocating space for nodes 720 and chunks 740. Additionally, arrays may be allocated (such as used for the receive processing of packets) with free window pointer lists associated with those arrays.

Firmware may perform many of the steps required to format the various memories with the appropriate data structures. Where necessary, various register settings or other techniques for setting variables may be used to indicate the mode to components within the device. These techniques will be well known to one of ordinary skill in the art. Thus, the first mode is configured, and the process may stop.

At 3212, configure the first memory with various data structures such as those just described. In this case, memory 1 may be a hardware table and the data structures are not necessarily accessed indirectly, but may be as described in FIG. 29 (e.g. RX flow state tables indexed per flow within the hardware table). At 3214, configure the second memory as a packet buffer in much the same manner as described above for memory 3 at 3220. Thus, the second mode is configured. Then the process may stop. MAC processing as detailed herein may continue.

Figure 33:
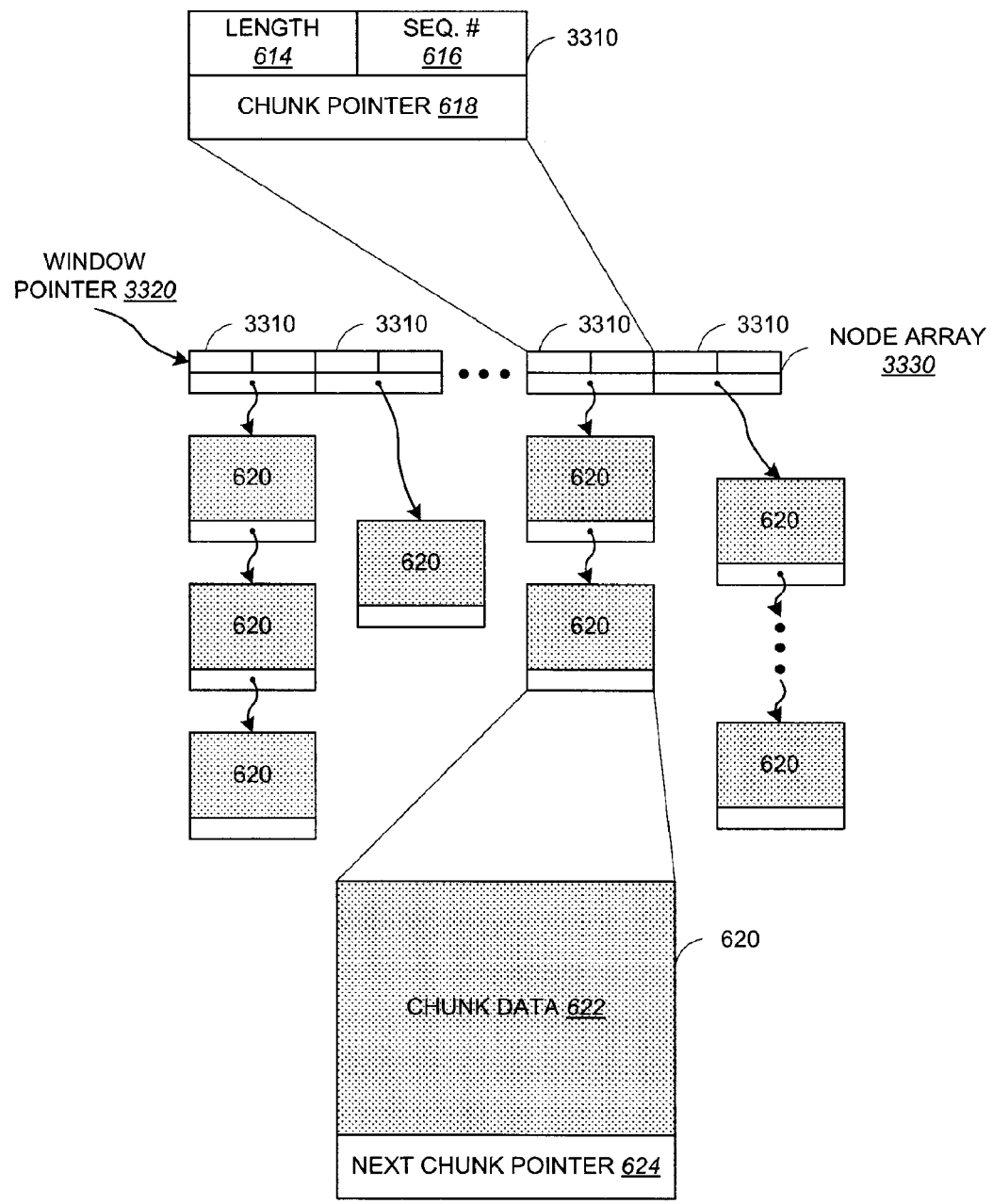
FIG. 33 depicts an alternate configuration for a portion of a packet buffer configured to support RX packet arrays.

FIG. 33 depicts an alternate configuration for a portion of packet buffer 250 configured to support RX packet arrays. This embodiment is similar to the packet buffer 250 depicted in FIG. 6. However, in this configuration, the data structure of the linked-list queue of FIG. 6 is replaced with a node array 3330. The use of an array data structure allows a few simplifications. In this example, the nodes in the node array are contiguous, so a next node pointer 612 is not required. Thus, node 610 is replaced with reduced node 3310. The fields remaining in node 3310, length 614, sequence number 616, and chunk pointer 618 are as described with respect to FIG. 6. Smaller nodes result in a reduction in memory usage.

As before, chunks 620 are used to store packets of various lengths. A difference is that the array structure does not require the threading of nodes to form a queue. Thus, as just mentioned, the next node pointer is not required to locate nodes. Queue tail pointer 640 and queue head pointer 630 are replaced with a single pointer, window pointer 3320, which identifies where in the packet buffer the desired node array 3330 is located. The use of this modified node/chunk structure will be clear to those of skill in the art in light of the teaching herein. Again, the array structure just described is not required for RX processing, as the structure of FIG. 6 is entirely suitable for that context as well. However, when deployed as shown in FIG. 33, a node array 3330 may store up to a full window worth of packet address locations. It may be indexed by a Window offset to the current starting sequence number. In this case, node array 3330 may be used as a circular buffer of packet locations.

Handoff Processing

In this section, handoff processing will be more fully detailed. Handoff decision 2880 and handoff engine 2890, along with associated signals and other interconnected blocks, were introduced above with respect to FIG. 28. Several aspects relating to handoff will be illustrated below.

In one aspect, handoff decision making is separated from the handoff process itself. The decision-making process may be performed at line speed, while the handoff engine operates autonomously in the background. One example context in which this aspect may be useful is illustrated by support for block ACK. In early wireless packet systems, such as 802.11 (g) or (b), there was no support for block ACK. When a packet arrived, it would be either acknowledged or not acknowledged. If the packet was acknowledged, it would be handed off and transmission of subsequent packets would resume. If the packet was not acknowledged, the transmitter would resend the packet until it was received correctly (or the packet was dropped because the process exceeded pre-defined limits). As such, packets would inherently be handed off in order as they arrived.

In systems supporting block ACK, it is possible to receive packets out of order. When packets are received correctly, an associated bit will be set in a window bitmap. For packets that are not acknowledged, the associated bits may be set to zero. Retransmission of packets may be attempted in the future. In the mean time, subsequent packets may be received and stored for handoff. In systems in which packets are meant to be handed off in order, a non-acknowledged packet creates a hole, which stalls handoff of subsequently received packets while waiting for the non-acknowledged packet to be correctly received. A single packet may then be received after being retransmitted, which would fill the hole, and, several packets having been subsequently received, a group of packets are immediately available for handoff. This can introduce a backlog of packets awaiting handoff, and handoff latency may ensue. Separating the handoff decision from the handoff engine processing allows the handoff decision block to operate at line speed, while the backlog of packets is processed for handoff. The handoff engine may operate autonomously, and, assuming the interface to the handoff memory is of high speed relative to the received speed, the handoff engine will be able to catch up. In this way, packet backlog does not limit the overall throughput of the receiver.

In another aspect, separating handoff decision and processing allows for flow handoff prioritization. For example, delay sensitive information such as voice, video, or other priority data may be handled differently than lower priority data.

Figure 34:
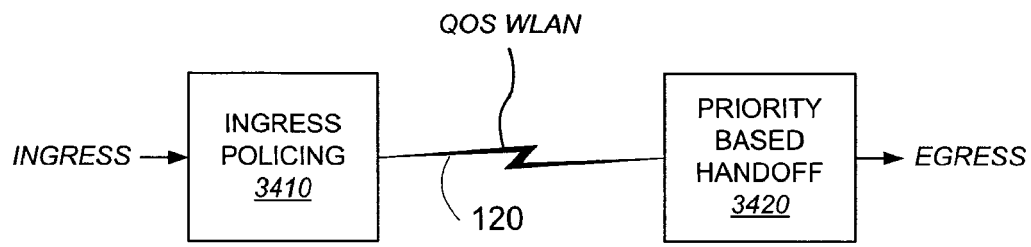
FIG. 34 illustrates an example end-to-end priority scheme for wireless networks, including ingress policing and priority-based handoff.

FIG. 34 illustrates an end-to-end priority scheme for wireless networks, including ingress policing and priority-based handoff. In FIG. 34, system 100 includes an ingress policing function 3410 for receiving ingress packets. Detailed above, various ingress policing functions allow for prioritization of incoming egress packets. Wireless LAN 120 couples the ingress policing block 3410 with a priority-based handoff block 3420. QoS WLANs (well known in the art) allow for identified packets and/or flows to be given priority over other types of packets or flows. However, prior art QoS processing occurs only over the point-to-point communication from the receiver and transmitter on WLAN 120. Priority-based handoff block 3420 performs handoff decisions incorporating priority. In this case, packets have already been transmitted and received, perhaps according to priority or QoS. Priority based handoff is above and beyond the concept of QoS in the WLAN such as WLAN 120. Thus, higher priority packets may be handed off for egress earlier than those of lower priority.

In this way, QoS may be maintained from ingress on a transmitter side all the way through egress following reception at the receiver. Ingress policing 3410 may prioritize packets through the ingress side, where they will be transmitted with priority on a QoS WLAN 120 (if QoS is supported) and, if there is any delay in handoff at the receiver, those packets of higher priority may be given first priority. Note that either ingress policing or priority based handoff may be deployed with or without a QoS WLAN, and may also be deployed separately from one another. Thus, priority based handoff may be used in a scheme with one or more other QoS techniques. These aspects may be desirable as well in applications that do not rely on a host processor. For example, higher layer applications may have some prioritization capability for determining the order in which packets are delivered to a MAC processor. As more and more devices move to wireless connectivity, such as cameras, digital music devices, and other examples, such devices may have limited host processing (or none at all). Ingress policing, then, may be usefully deployed to enable efficient multi-flow transmission and reception.

Ingress policing and priority-based handoff, as detailed herein, may be advantageously combined with the linked-list structure for management of packets (i.e. using linked-lists for nodes, chunks, and queues), although the combination of both is not required in any given embodiment. In particular, the dynamic allocation of packets as they arrive (via ingress or through the receiver) allows the memory to be flexibly allocated between high and low priority packets or flows. The linked-list structures allow for flexibility in changing the service order efficiently when congestion levels dictate that higher priority packets need to be serviced and just as easily serving all packet classes when congestion subsides.

Figure 35:
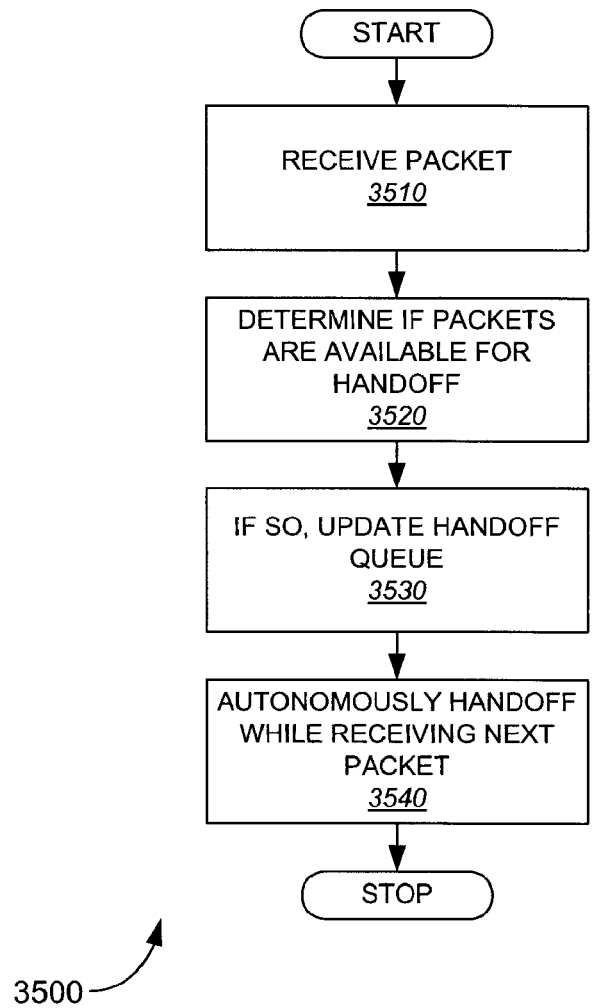
FIG. 35 depicts an example embodiment of a method illustrating the operation of a handoff decision block and a handoff engine.

FIG. 35 depicts an example embodiment of a method 3500 illustrating the operation of handoff decision 2880 and handoff engine 2890. At 3510, handoff decision 2880 will receive a trigger indicating that a packet has been received. In the example embodiment, the write complete signal will indicate when the packet has been completely written into the packet buffer, to avoid accidentally handing off a partially-written packet. Information needed for making a handoff decision, as detailed further below, is delivered to handoff decision 2880 from RX FIFO 2870.

At 3520, handoff decision 2880 determines if packets are available for handoff. In general, any method or technique may be used for prioritizing packets for handoff. In one example, as described above, priorities assigned to flows allow for flow handoff based reordering in accordance with priority not just order of arrival. Note that prioritization is not required. Flows may be handed off in order, as packets are made available. If packets are available for handoff, at 3530, a handoff queue is updated to indicate the flow ID associated with the one or more packets available for handoff. At 3540, handoff engine 2890 will autonomously hand off the available packets allowing handoff decision 2880 to await the next received packet and perform handoff decision for that packet.

The general concepts illustrated above may be more clearly understood with the following example embodiment. In the following example, handoff decision 2880 will make handoff decisions, update queues associated with packets for handoff, and issue directives to handoff engine 2890 to process the handoffs autonomously. As illustrated in FIG. 28, handoff decision 2880 delivers a flow ID and related parameters to initiate the handoff. In the example embodiment, a handoff count, indicating the number of packets available for handoff, a flow ID associated with those packets, and a flow type are delivered to handoff engine 2890 from handoff decision 2880.

In addition, an interrupt signal may be deployed. This optional interrupt may be used when a higher priority packet has been received, and handoff decision 2880 wishes to move the higher priority packet and its flow ahead of those being currently handed off. Interrupt techniques are well known in the art and may include polled-type interrupts as well as vector driven interrupts, and various others, depending on the type of handoff decision and handoff engine deployed. Those of skill will recognize that both handoff decision block 2880 and/or handoff engine 2890 may be deployed using state machines, software or firmware processes, in general or specific purpose processors, dedicated hardware, or any combination thereof. In this example, handoff engine 2890 will return a handoff done signal to indicate that handoff has been performed, along with the number of packets handed off. This example embodiment is detailed further below.

The separation of the tasks between the handoff decision block 2880 and handoff engine 2890 has been outlined above, and some of the benefits including flow prioritization and managing potential bottlenecks have been described. In this example embodiment, the general interface between handoff decision and the handoff engine is to maintain a handoff count parameter for each flow. The handoff decision block essentially indicates the need for handoff of a flow by increasing the handoff count. The handoff engine, as it performs handoff of the packets, decreases the handoff count. Thus, this parameter may be generally used between any handoff decision embodiment with any given handoff engines.

Note that this technique may be contrasted with the alternate use of a FIFO. A FIFO may also be deployed for handoff, in conjunction with various embodiments detailed herein. However due to large variability in the number of packets that may be awaiting handoff, in certain circumstances the FIFO may be required to be quite deep. Note further that, without additional complexity added to the FIFO, re-ordering of packets in order to accommodate priority may be difficult. In the example embodiment, a first-come first-served queue is maintained for each of a plurality of priority levels. In the example embodiment, four priorities are supported. Those of skill in the art will recognize that any number of queues and/or priorities may be supported.

In an alternate embodiment, handoff decision block 2880 may make handoff decisions and populate one or more queues and/or state tables to indicate the status of the queues and the packets awaiting handoff therein. A handoff engine 2890 may be deployed that does not require explicit triggering from the handoff decision 2880, as shown, but rather autonomously monitors the state of the various queues and state tables to determine which packets are available for handoff and to prioritize the order in which they are handed off. Those of skill in the art will readily deploy these and other alternate embodiments within the scope of the teachings herein. Details of this alternate embodiment are omitted.

Figure 36:
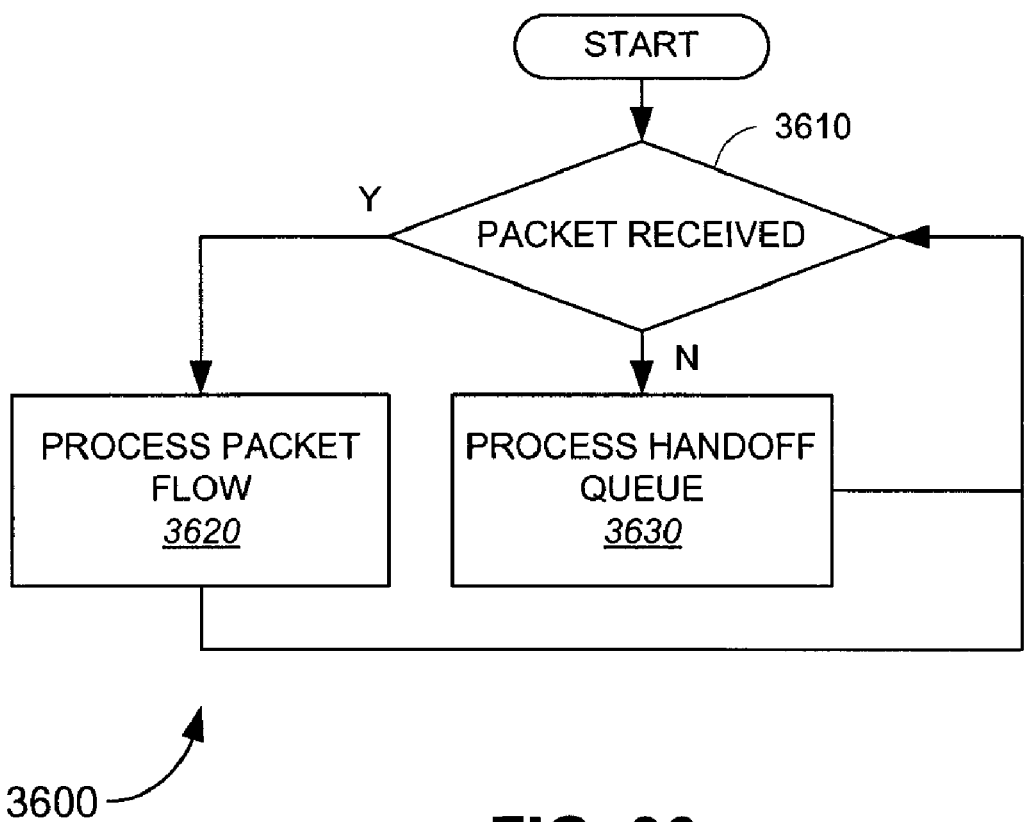
FIG. 36 illustrates an example embodiment of a method for performing a handoff decision.

FIG. 36 illustrates an example embodiment of a method 3600 for performing handoff decision, suitable for deployment in a handoff decision block 2880, as illustrated above. At 3610, when a packet is received, proceed to 3620 to process the flow for the received packet. An example process is detailed further below. In general, when supporting block acknowledgement, processing a packet includes determining whether a hole has been filled (i.e. one or more packets of higher sequence number have been correctly received and are awaiting handoff until a packet with a previous sequence number is received after retransmission). Naturally, packets correctly received in order may be available for handoff without filling a hole (i.e. there are no subsequently numbered packets awaiting handoff). Receiving a packet may trigger the availability of one or more packets for handoff, or the packet itself may be the only packet ready for handoff. If the received packet does not fill an existing hole, there may be no handoff available for that flow. The process returns then to decision block 3610.

In this example, the flow alternates between packet process block 3630 and queue process block 3630 (detailed further below). Those of skill in the art will recognize that method 3600 illustrates two simultaneous processes, one for processing the handoff queue and another for receiving packets as they arrive. Those of skill will recognize myriad techniques for performing such parallel processing, and the example embodiment serves as one illustration only.

Figure 37:
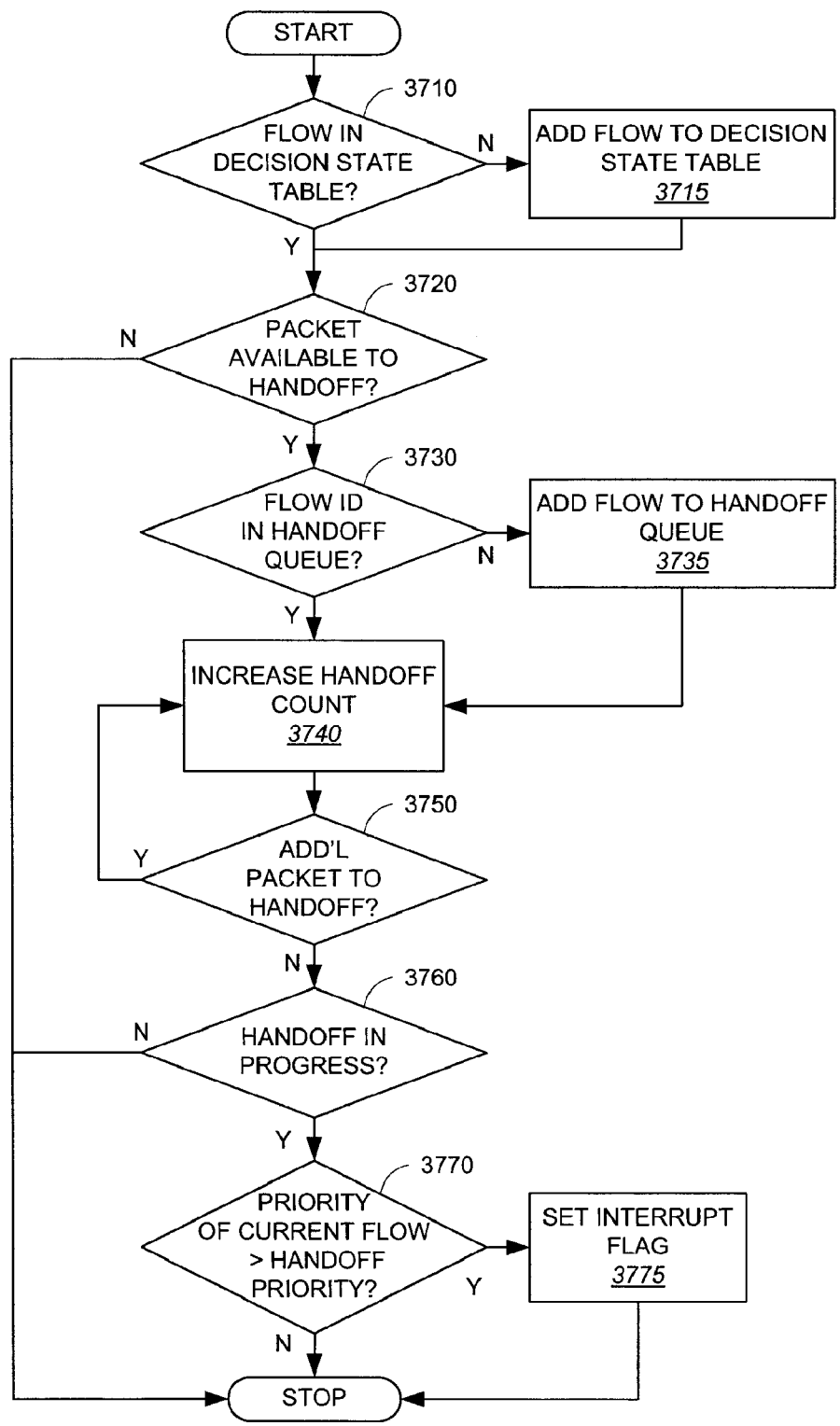
FIG. 37 illustrates an example embodiment of a method for processing a received packet.

FIG. 37 illustrates an example embodiment of a method for processing a received packet, suitable for deployment as block 3620, as illustrated above. At 3710, a packet has been received. Determine if the flow associated with that packet has been entered into a decision state table. An example decision state table is illustrated in FIG. 40. In the example decision state table 4000, illustrated in FIG. 40, there are N supported flow IDs at any one time. In the example embodiment, up to 256 flows may be supported. The decision state table 4000 includes, for each flow ID, a set of parameters 4010. In the example embodiment, decision state table 4000 includes, for each flow ID, a decision offset 4012, a handoff count 4014, a next pointer field 4016, an in-queue bit 4018, and a priority field 4020.

Returning to FIG. 37, at 3710, if the flow is not in the decision state table 4000, proceed to 3715 to add the flow to the decision state table. Once it is determined that the flow is in the decision state table, proceed to 3720 to determine if a packet is available for handoff. The decision offset field 4012 is used to determine the next potential packet in the flow that may be handed off. A variety of techniques may be used to maintain this information. For example, a bitmap, with an associated bit for each packet and/or fragment within a window may be deployed. When a packet is received correctly, the bitmap is updated to indicate the successful reception of the packet. Thus, in this example, if the packet associated with the position indicated by the decision offset field is set (i.e. one) then the packet is available for handoff. If that position in the bitmap is deasserted (i.e. set to zero), then a hole is indicated, and none of the subsequent packets for this flow (if any) are available for handoff.

In this example, the handoff decision process 3600 continues to iterate repeatedly. If a packet is available for handoff, proceed to decision block 3730 to determine if the flow ID is included in the handoff queue. An example embodiment of a handoff queue is illustrated as Q array state table 4100, illustrated in FIG. 41. In this example, queues are maintained for up to M priorities, each with entries 4110 in the Q array state table 4100. In this example, an entry 4110 includes a Q count variable 4112, a head pointer 4114, and a tail pointer 4116. The queues are maintained using a linked-list structure. In alternate embodiments, other types of queues may be deployed. In the example embodiment, M is set to 4, and thus 4 priority levels are supported. The priority level for a flow can be determined from the priority field 4020 of decision state table 4000. The in-queue bit 4018 may be used to determine whether or not the flow has been inserted in the Q array state table. In an alternate embodiment, handoff count 4014 may be used to help the decision logic determine whether a given flow already has packets waiting to be handed off or whether it needs to be added to the queue. The handoff count may be non-zero, but it may be unclear whether it was already non-zero or whether it just became non-zero. In this example, packets may be being processed one at a time. In various embodiments, this bit may not be necessary or may be used as a convenience.

If the flow ID is not in the handoff queue, proceed to 3735 to add the flow. As shown in FIG. 41, for each priority queue, a head pointer 4114 and a tail pointer 4116 is maintained. Head pointer 4114 includes a flow ID that can be used to index into decision state table 4000 to determine the first flow in the queue. In this example, recall that, within a priority, flows are served on a first-come first-served basis. Thus, head pointer 4114 is an index to the flow ID for the first flow to be served within the queue. Note that, once the flow ID indicated by head pointer 4114 is accessed, the next flow within that queue, if any, is indicated by the next pointer field 4016. Tail pointer 4116, in Q array state table 4100, indicates the last flow in the priority queue. When adding a new flow to the handoff queue, the process may be performed by updating the next pointer field for the flow ID identified by tail pointer 4116. This field will be replaced with a pointer to the flow being added. Subsequently, the tail pointer field 4116 is then updated to point to the newly arriving flow, which becomes the new tail of the queue (i.e, the last in line). In addition, the queue count field 4112 maintains the number of total flows within the priority queue. Thus, by reading the queue count value for priority level, it can be quickly determined whether there are any packets of that priority awaiting handoff. This procedure is followed to maintain the queues for each of the M priority queues, and the state is maintained readily in the Q array state table 4100.

Once it is determined that the flow is in the handoff queue, or it has been added, proceed to 3740 to increase the handoff count 4014. Recall that handoff count is the parameter used to determine the number of packets awaiting handoff for a particular flow, and is maintained in decision state table 4000. At 3750, determine if there are additional packets to handoff for the flow. When a first packet is determined to be ready for handoff, and the handoff count has been increased, the decision offset may move forward within the bitmap (i.e. decision offset ++). If the updated decision offset also shows a packet available for handoff, return to 3740, increase the handoff count and continue the process until all of the packets within the window have been tested, or a hole has been reached. Note that decision offset will then point to the next hole. In subsequent iterations of method 3620, each flow will be tested for available handoff packets as packets for that flow arrive.

Once a hole is reached, and there are no additional packets to handoff, proceed to 3760. Decision block 3760 illustrates an optional example of an interrupt procedure that may be deployed. Those of skill in the art will readily deploy any number of interrupt procedures. At 3760, determine if a handoff is currently in progress. If a handoff is not in progress, the process may stop. If a handoff is in progress, and if this optional reprioritization is deployed, proceed to 3770. At 3770, it may be determined whether the newly arriving packet's flow is of higher priority and should be moved ahead of any packets currently in handoff. Test the priority of the current flow with the priority of the flow that is being processed by handoff engine 2890. If the priority of the current flow is greater than that being processed, proceed to 3775 and set an interrupt flag. In this example, the interrupt flag will be recognized during the handoff queue processing, identified in block 3630 above, and illustrated in further detail below. If the priority of the current flow is less than that of the flow being processed by handoff engine 2890, there is no need to preempt, and the process may stop.

Figure 38:
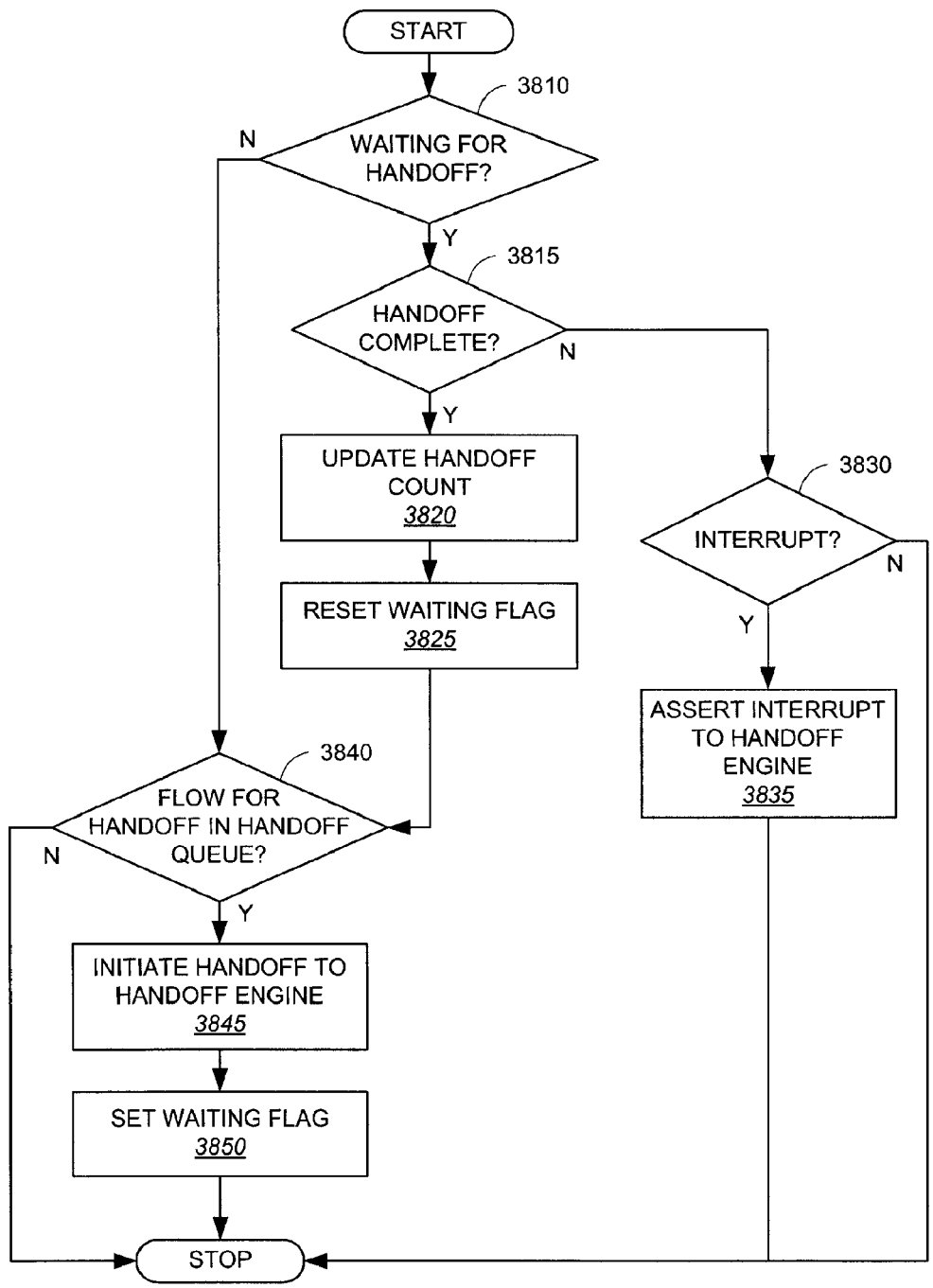
FIG. 38 illustrates an example embodiment of a method for processing one or more handoff queues.

FIG. 38 illustrates an example embodiment of a method for processing one or more handoff queues, suitable for deployment as block 3630, illustrated above. The process begins at decision block 3810. If a handoff, processed by handoff engine 2890, is currently in progress (i.e. a previous iteration of method 3630 initiated such a handoff), then proceed to decision 3815 to determine if that handoff is complete. If it has completed, then, at 3820, update the handoff count. In the example embodiment, the number of packets handed off will be returned by handoff engine 2890 and can be subtracted from the handoff count. The handoff done signal illustrated in FIG. 28 may be used to determine whether a handoff is complete. Note that when handoff count goes to zero, the flow ID may be removed from the respective priority queue, using the fields illustrated in FIG. 41. Furthermore, when a flow is removed from a queue, the respective Q count is also reduced. At 3825, a waiting flag, used for determining whether a handoff is being performed is reset. This flag is useful for determining whether a handoff is pending in decision block 3810, and may also be used in decision block 3760, described above, with respect to packet processing.

If the handoff is not complete, as determined in decision block 3815, and an interrupt feature is deployed, such as described above, proceed to decision block 3830 to determine if an interrupt flag has been set. For example, such a flag may be set as described in block 3775 described above. If not, the process may stop. The handoff engine 2890 may continue to perform its current handoff operations, and the process flow in FIG. 36 may return to decision block 3610 to await additional packets being received or a change in the handoff queue processing status. If, in decision block 3830, an interrupt flag has been set, assert an interrupt to the handoff engine at block 3835. An example embodiment of handoff engine processing of an interrupt signal is detailed further below.

At decision block 3840, the handoff engine has completed any previous processing and additional handoff instructions may be generated. At decision block 3840 determine if a flow is available for handoff in the handoff queue. An example embodiment is detailed further below. If not, the process may stop and continue to iterate as described above. If a flow is available, at 3845, initiate a handoff to the handoff engine. As described above, the flow ID and related parameters may be delivered to the handoff engine. In the example embodiment, handoff count may be any number. If handoff count is more than one, the handoff engine may handoff each packet until finished, unless interrupted. In an alternate embodiment, the handoff engine may process one packet each time a handoff is initiated. In this alternate embodiment, an interrupt may be unnecessary. At 3850, the waiting flag is set to indicate that a handoff process is pending. Then the current iteration of the process may stop.

Figure 39:
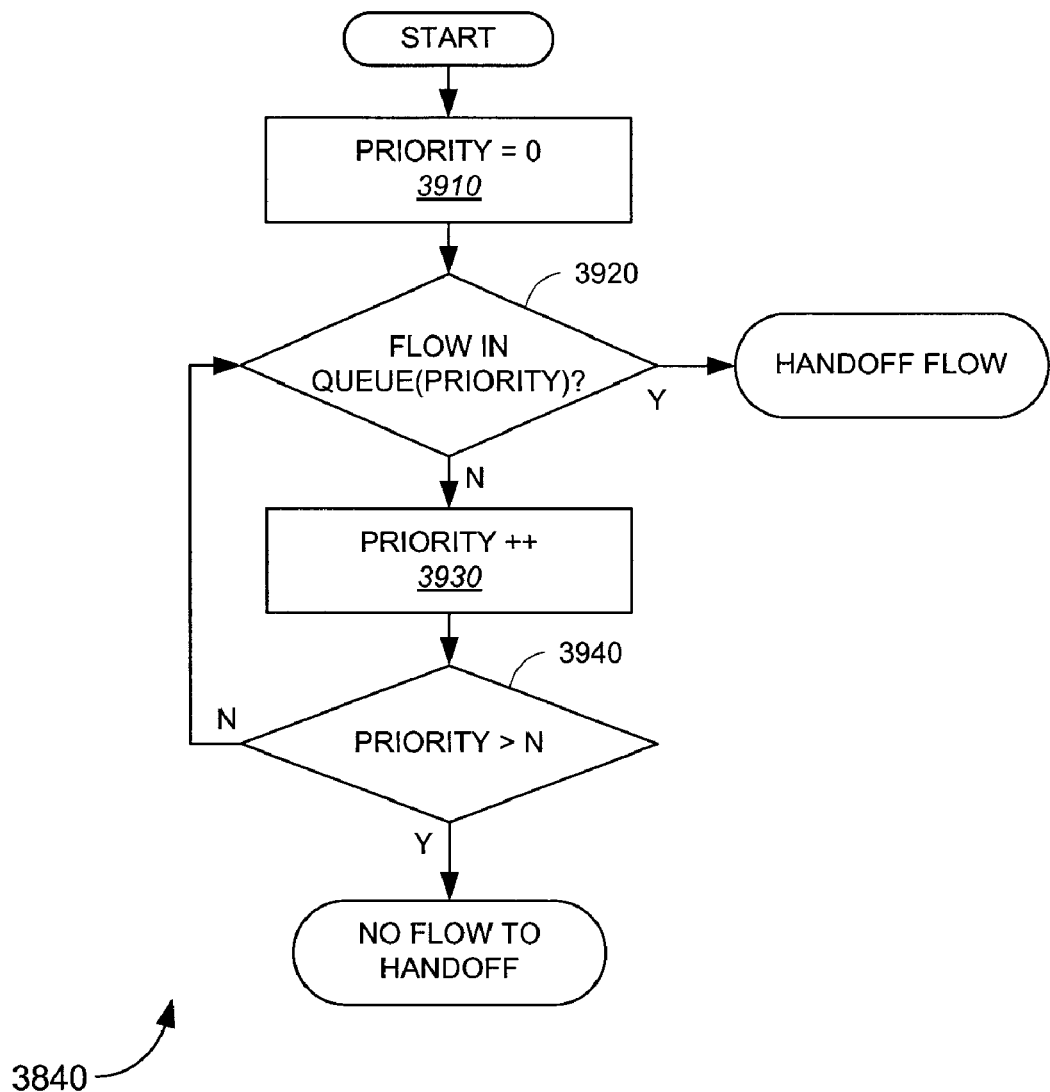
FIG. 39 depicts an example embodiment of a method of determining flows available for handoff.

FIG. 39 depicts an example embodiment of a method of determining flows available for handoff, suitable for deployment as block 3840, described above. Note that this example presumes that higher priority flows are assigned a lower numeric priority value. Thus, priority 0 is the highest priority. Those of skill in the art will readily adapt any type of priority scheme within the scope of the teaching herein. At 3910, set a priority index to 0. This is the first and highest priority to test. At decision block 3920, if there is a flow in the queue identified by the priority index (i.e. its Q count is greater than 0), then exit method 3840 and return the flow. Again, in the example embodiment, the first flow in the queue (identified by the head pointer) of the identified priority will be handed off.

If the identified priority queue does not contain any flows, increment the priority index at 3930. At 3940, if the priority index is greater than N, which is the number of priorities supported (N=4 in the example embodiment), there are no additional queues to test. In this case, all the queues are empty. If there are additional queues to test (i.e. the priority index is less than N), return to test the next queue at 3920. The process continues until a flow is found, or the queues are exhausted. Again, any type of flow selecting technique may be substituted for method 3840.

Figure 42:
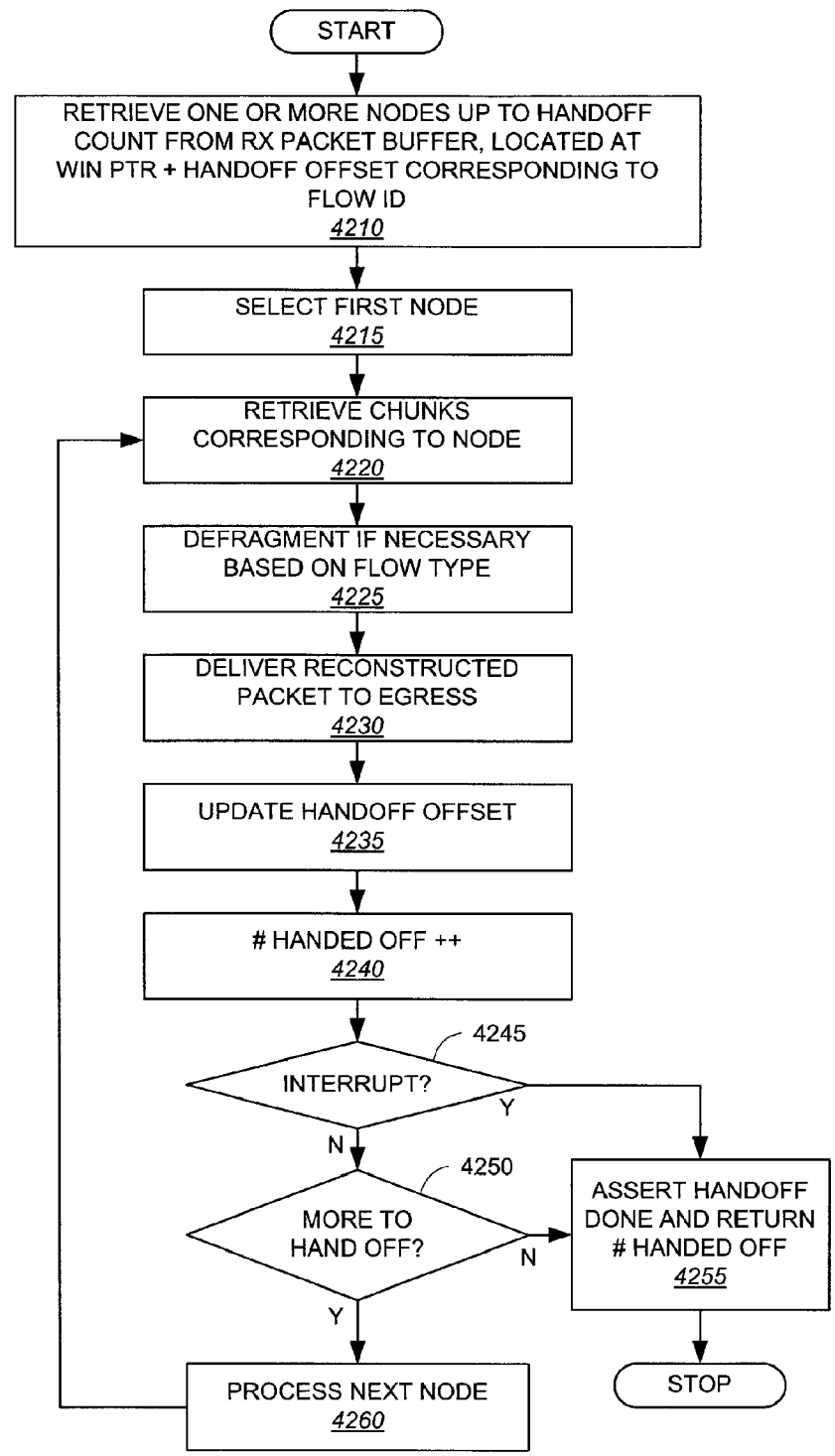
FIG. 42 illustrates an example embodiment of a method for performing handoff.

FIG. 42 illustrates an example embodiment of a method 4200 for performing handoff, suitable for deployment within a handoff engine 2890. In this example embodiment, the handoff decision block 2880 delivers to handoff engine 2890 a number of packets for handing off, handoff count, a flow type (which may be used if support for multiple packet types is deployed, such as 802.11 (b), (g), (n), etc.), and an interrupt. The handoff engine delivers packets for egress, which are fetched from the packet buffer via memory arbiter 680, as illustrated above with respect to FIG. 28. The number of packets handed off, along with the handoff done signal, are returned to decision 2880 for processing, as described above.

Figure 43:
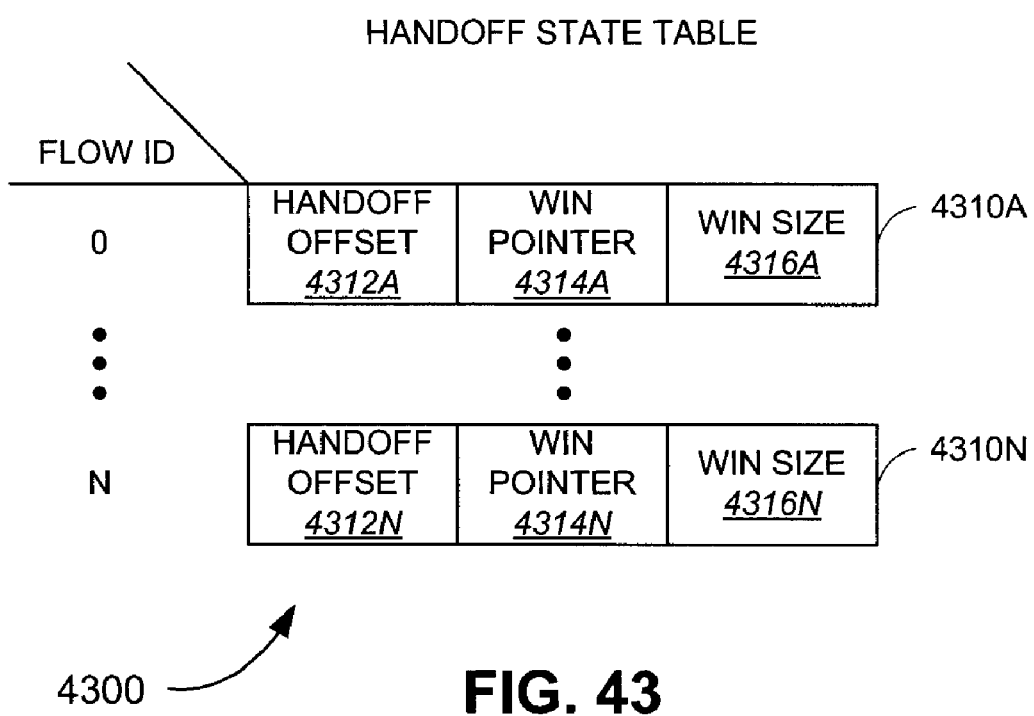
FIG. 43 illustrates example variables used for indexing a packet buffer in a handoff state table.

At 4210, handoff engine 2890 retrieves one or more nodes from the packet buffer, up to the amount indicated by handoff count. The nodes will be located in the packet buffer at a location identified by a window pointer plus a handoff offset, which are set corresponding to the flow ID. Recall that the example received packet buffer may be as illustrated in FIG. 33, in which a node array 3330 comprises nodes 3310, each corresponding to a packet, linked in an array format, with linked lists of chunks containing the packet data associated therewith. The variables used for indexing the packet buffer are maintained for the handoff engine in the handoff state table 4300, illustrated in FIG. 43. Again, N flow IDs are supported, and for each flow ID an entry 4310 is maintained in handoff state table 4300. In the example embodiment, up to 256 flows are supported. Firmware maintains the node array location in the packet buffer for each flow. This is identified in handoff state table 4300 by win pointer 4314. The size of the window for the flows indicated in win size 4316. Handoff offset 4312 is state maintained by the handoff engine to determine where the next packet to be handed off will be found. Thus, the nodes corresponding to packets for handing off are identified, as described above, by adding the handoff offset 4312 to the win pointer 4314. For more efficient SDRAM access, it may be desirable to retrieve more than one node at a time, although this is not required.

The win size 4316 may be used with the starting sequence number and the handoff offset to position the handoff engine to the packet that needs to be processed for handoff. In this example, the handoff offset points to the starting sequence number in the window data structure (i.e., a node array) and the sequence number to be handed off is identified with respect to the starting sequence number.

At 4215, select the first node corresponding to handoff offset 4312. At 4220, retrieve chunks corresponding to that node from the packet buffer. At 4225, defragment the packet, if necessary, based on the flow type. This may involve retrieving several fragments from the packet buffer, removing the fragment headers from each fragment, compacting the chunks into a single packet, and creating the appropriate header. This may be performed in the associated defrag block 2892 illustrated in FIG. 28. The flow type may be used to indicate when fragmentation is necessary. For example, in some embodiments, 802.11 (e) and (g) packets may be supported and fragmentation may be used. Note that, in an alternate embodiment, detailed further below, packet types requiring fragmentation are handled in firmware to reduce complexity. In such an embodiment, defrag block 2892 need not be deployed.

At 4230, once each of the chunks associated with the packet are retrieved, and the packet is reconstructed (including any defragmentation required), deliver the packet for egress. As described above, egress may be performed through any of a variety of interfaces, examples of which are given above.

Once a packet (or a set of fragments) is handed off, the handoff offset 4312 is updated to identify the next packet for handoff. At 4240, a variable, # handed off, to keep track of the number of packets handed off is incremented accordingly. At 4245, if interrupts are supported, and an interrupt has been issued, proceed to 4255. At 4255 handoff stops, handoff done is asserted and the number of packets handed off is returned. In this embodiment, the interrupt is acted on after each packet is completely handed off. Alternate interrupt schemes may be deployed, and will be apparent to those of skill in the art. Once interrupted, the handoff process stops. In this example, the handoff decision block 2880 may later issue a new handoff command to handoff engine 2890 to continue handoff of packets for an interrupted flow. At 4245, if no interrupt was received, proceed to decision block 4250. At 4250, if there are no additional packets to be handed off, which may be determined by comparing of the number of packets handed off with handoff count, the handoff is complete. Proceed to 4255, assert handoff done, and return the number of packets handed off.

If there are additional packets to hand off, proceed to 4260. Process the next node, and return to 4220 to retrieve chunks that corresponding to that node, resuming the process just described.

Flush block 2894 is connected to handoff engine 2890, as illustrated in FIG. 28. Flush block 2894 may be used to keep track of resend limits, timeouts and the like, which may be used to eventually flush a packet. This allows the handoff engine to move ahead before a hole is filled. Handoff then occurs, sending packets up and any subsequent retransmission will be handled through higher layers, if needed.

Flush block 2894 performs various functions when the ARQ window is moved. For example partially fragmented packets are flushed. Completed packets are handed off regardless of whether there are holes. Buffers are freed and thus chunk pointers are put back in the free chunk pointer list and windows are moved.

Those of skill in the art will readily adapt various circuits, components and techniques in alternate embodiments. In one example generalized embodiment (and compatible with alternate embodiment 4900 depicted in FIG. 49, detailed below) an Ingress State Machine (ISM) processes the incoming packets and updates information used by a Control State Machine (CSM). These updates may increment the number of packets in memory and also update the order in which Flow_IDs need to be processed by the CSM. The CSM may update a Four Packet Node Cache in the transmitter, as detailed above. This state machine operates on the information in a Flow_Packet_Table. A head pointer and tail pointer as well as the next flow pointer in the table allow the CSM to select the next Flow_ID to be processed. There may be an in-service bit in the table (per Flow_ID) which lets the CSM know if the packets from this Flow_ID are currently in transmission. This bit may be set to 1 by the Tx Engine before it starts the transmission and is set to 0 after the transmission is completed. A transmit state machine uses the information from the Command Queue to transmit packets out on the WLAN (similar to that described above with respect to FIG. 18). A Flush State Machine (FSM), which may be used as a flush block 2894, flushes from the SDRAM packets that are correctly received and acknowledged by the respective receiver. The FSM then decrements the packets in memory count in the Flow_Packet_Table.

The Flow_Packet_Table may have one or more of the following entries: a Flow_ID (1 byte), number of packets in memory (2 Bytes), Packets in Cache (2 bits), In-service bit (1 bit), Next_flow_ID (1 Byte), and a 2-bit Priority Field. When a packet comes in on ingress, the ISM updates the packets in memory, updates the Next_Flow_ID as well as the Tail_Pointer. The Transmit State Machine, when it is transmitting packets from a specific Flow_ID, sets the corresponding in-service bit. When set, the CSM will not update the Four Packet Node Cache. After the packets are transmitted, the Tx State Machine updates the number of packets in Cache and also resets the in-service bit. The CSM will act only when the in-service bit is reset. The order in which it processes the Flow_ID is determined by the Next_Flow_ID. If desired, a 2 bit priority bit may be added to the Table. In this case, the CSM will first process flows belonging to the highest priority, then the next, and so on. An example size of this table is approximately 4 Bytes times the number of Flows, or approximately 1 Kbyte for 256 flows. The CSM uses the header pointer of the Flow_ID (the first packet in the Linked_list) to figure out the node addresses of the packets that need to be included in the 4 packet node cache.

Thus, in an example embodiment, an example Flush Engine or flush block 2894 may remove from the packet buffer all packets that are successfully received and acknowledged. When a block acknowledgement Bit Map is received, the Tx State Machine first processes it and may perform immediate retransmissions to take care of certain unacknowledged packets. (Block acknowledgement is detailed further below). The Bit Map is then passed on to a Flush Engine State Machine in the Flush Engine or flush block 2894 which retrieves the Head_Pointer of the linked-list data structure for the corresponding Flow_ID—the Head_Ptr is available in the Flow State RAM. The Head_Ptr contains the node address of the first packet for the given Flow_ID as well as the sequence number of this packet. The Flush Engine State machine processes the Bit Map and queues it for flushing packets that have been acknowledged in sequence. This logic may be similar to the logic used by an Egress State machine, where packets received in sequence are passed to the host. Once the Flush Engine State Machine has identified the number of packets to be flushed and their sequence numbers, they may be put in a queue for flushing. The Head_Ptr yields the node address of the first packet in the linked-list. The node addresses of the packets to be flushed are obtained by accessing the node addresses of the corresponding packets from the linked list. In the example embodiment, memory is allocated to provide sufficient packet locations, chunks, and nodes. Thus, flushing may be done in the background, as there is generally not a stringent time requirement for this task. Memory Arbiter can provide accesses for the flushing functions as a low priority task.

Block Acknowledgment

The various aspects illustrated by example embodiments, detailed above, are well suited for performing block acknowledgement for high-speed media access control. In a typical block acknowledgement protocol, a transmitter transmits packets to a receiver for a period of time, without necessarily receiving an acknowledgement of any of the packets. Then, a block acknowledgement is returned from the receiver to the transmitter, indicating which of the previously transmitted packets were received correctly. A block acknowledgement may be transmitted in response to a block ack request, or alternate scheduling mechanisms may be deployed, such as a response after a pre-determined number of packets have been received. A block acknowledgement request may be a specific message transmitted to indicate a block acknowledgement is desired, or, the block acknowledgement may be inherent in another type of signal or message.

One mechanism for maintaining a state of acknowledged or non-acknowledged packets is to keep a bitmap in which each bit position corresponds to a packet or packet fragment, as described above with respect to FIGS. 30 and 31, above. An example bitmap 3130 has been described above.

In a high throughput system, it may be desirable to return a block ACK request in a relatively short amount of time subsequent to a triggering event, such as an explicit or inherent block ack request, or other block ACK request indicator. In an example 802.11 embodiment, it may be required for the block ACK request to be returned within the SIFS period subsequent to a block ack request (i.e. an immediate block ACK). Thus, it may be desirable to maintain state information for multiple flows, allowing a prompt block ACK response for any of the current pending flows and for processing block acknowledgements subsequent to the block ack request to retransmit any packets needing retransmission. A number of types of block acknowledgement may be supported. For example, partial or full state acknowledgement may be desired. In general, partial state acknowledgement may be less computational intensive or may require less delay. The example embodiments described herein may be readily adapted for partial or full state block acknowledgement, or a combination thereof. Aspects are described further by means of the below example embodiments.

Block ACK at the Receiver.

In an example embodiment a packet is received, which may be an aggregate packet. As packets are received at the receiver, they are tested to determine whether the packet has been received correctly, for example, a frame check sequence or the like may be used. Regardless of the method of determining correct reception of a packet, an indicator may be stored for each packet (or fragment, as appropriate). In the example embodiment these acknowledgement indicators are stored in a bitmap associated for each flow. A variety of techniques for storing bitmaps for flows are detailed above with respect to FIG. 30.

Figure 44:
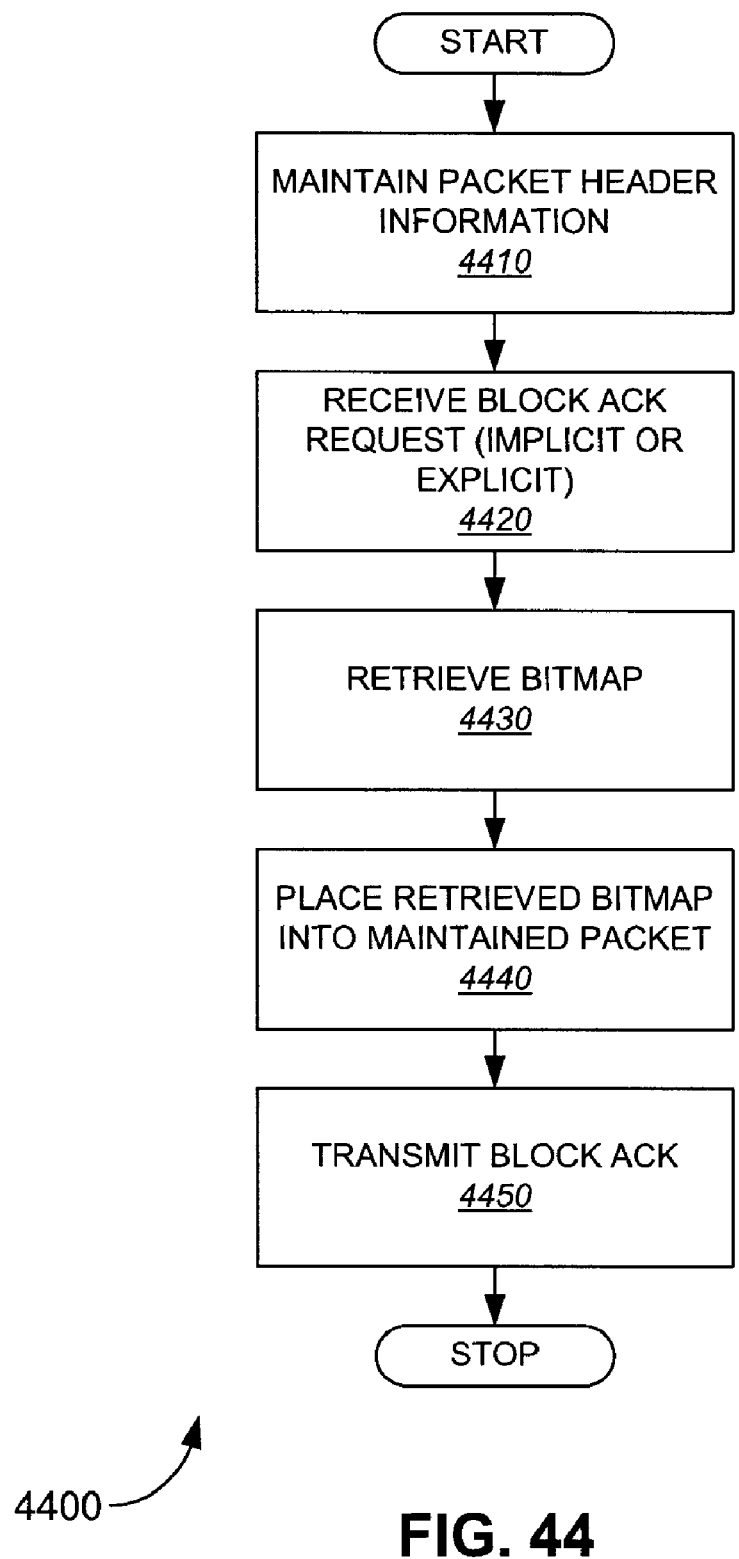
FIG. 44 depicts an example embodiment of a method for responding to an immediate block acknowledgment request.

FIG. 44 is an example embodiment of a method 4400 for responding to an immediate block ack request. This method is suitable for responding promptly to a block ack request.

At 4410, packet header information is maintained for any flow for which a block ACK may need to be generated. This header information may be maintained in any format, examples of which are well known in the art. The header information (or in alternate embodiments, any information that may be predetermined for use in preparing a block acknowledgement response) is stored for constructing a packet in advance of a potential block ACK transmission. In other words, the packet is sitting in some form of memory, properly formatted with all of the values for sending (that can be established a priori). The missing piece is the bitmap information indicating the actual acknowledgement or non acknowledgement of each individual packet or fragment (and any other information which cannot be established earlier). The bitmap (and any remaining information) is simply inserted into the waiting packet and transmitted.

Recall that in an example embodiment, described above, three levels of memory may be deployed to provide for various levels of indirection. In one example the first level of memory are hardware tables, such as hardware table 2820. A second level of memory may include SRAM 330. In an optional configuration, a third level such as SDRAM 340 may be deployed. Packet header information may be stored in any layer of memory deemed appropriate access to.

At 4420, a block ack request is received which may be implicit or explicit. At 4430, the bitmap associated with the flow is retrieved. Any flow identifier may be used to retrieve the bitmap. For example, as described above in FIG. 30, a MAC index 3004 is used to identify a link ID 3006 which has an associated pointer 3002. The pointer 3002 may point directly to a table 3042 including the bitmap 3046 directly or, pointer 3002 may point to a rate table 3010 which, based on transmit ID 3020, points to the RX state table 2920. As described above, state table 2920 may include a bitmap pointer 3050 to point to the actual bitmap 3130. Those of skill in the art will recognize that any type of indirection or direct storage of bitmaps may be deployed. In accordance with the technique used, the proper bitmap associated with the flow ID with the block ack request is retrieved.

At 4440, the retrieved bitmap is placed into the maintained packet and, at 4450 the now constructed block ACK is transmitted. Thus, in this embodiment, as much of the block ack packet as possible is pre-constructed. The bitmap information, or other acknowledgement data in an alternate embodiment, is maintained in an easily accessible portion of memory for prompt retrieval. The combination of these two pieces is then transmitted promptly to provide partial or full state immediate block ack in response to immediate block ack requests.

The above embodiments support immediate full state or partial state block acknowledgement. Support for partial state, full state, or any combination may be deployed in an example embodiment. However, other embodiments may need only to support partial state block acknowledgement, as will likely be the standard for 802.11(n). In this case, a block acknowledgment is sent only response to the aggregate received, sending status for only the packets received.

For partial state block ACK, you need maintain only a single memory at the receiver. There is no need to include the full-state (i.e. memory for 256 flows). The partial bit map state maintained at the receiver may be overwritten if a transmission from a different originator is received. Note that if state is accidentally overwritten, than a later request for block acknowledgment will not be possible. In one example, an all zero bitmap may be sent in this case. A given embodiment may be deployed to maintain more than the minimum amount of state, if desired.

Block ACK at the Transmitter

As described above, a transmitter may transmit a number of packets and then request reception status via an explicit or implicit block acknowledgement request. In order to maintain high throughput, it is desirable for the transmitter to be ready to continue transmission, or retransmit as necessary, promptly, when the corresponding block acknowledgement is received. Various embodiments are readily adaptable to take advantage of various aspects, detailed throughout this specification, to allow efficient and prompt retransmission in response to a block acknowledgement.

Figure 45:
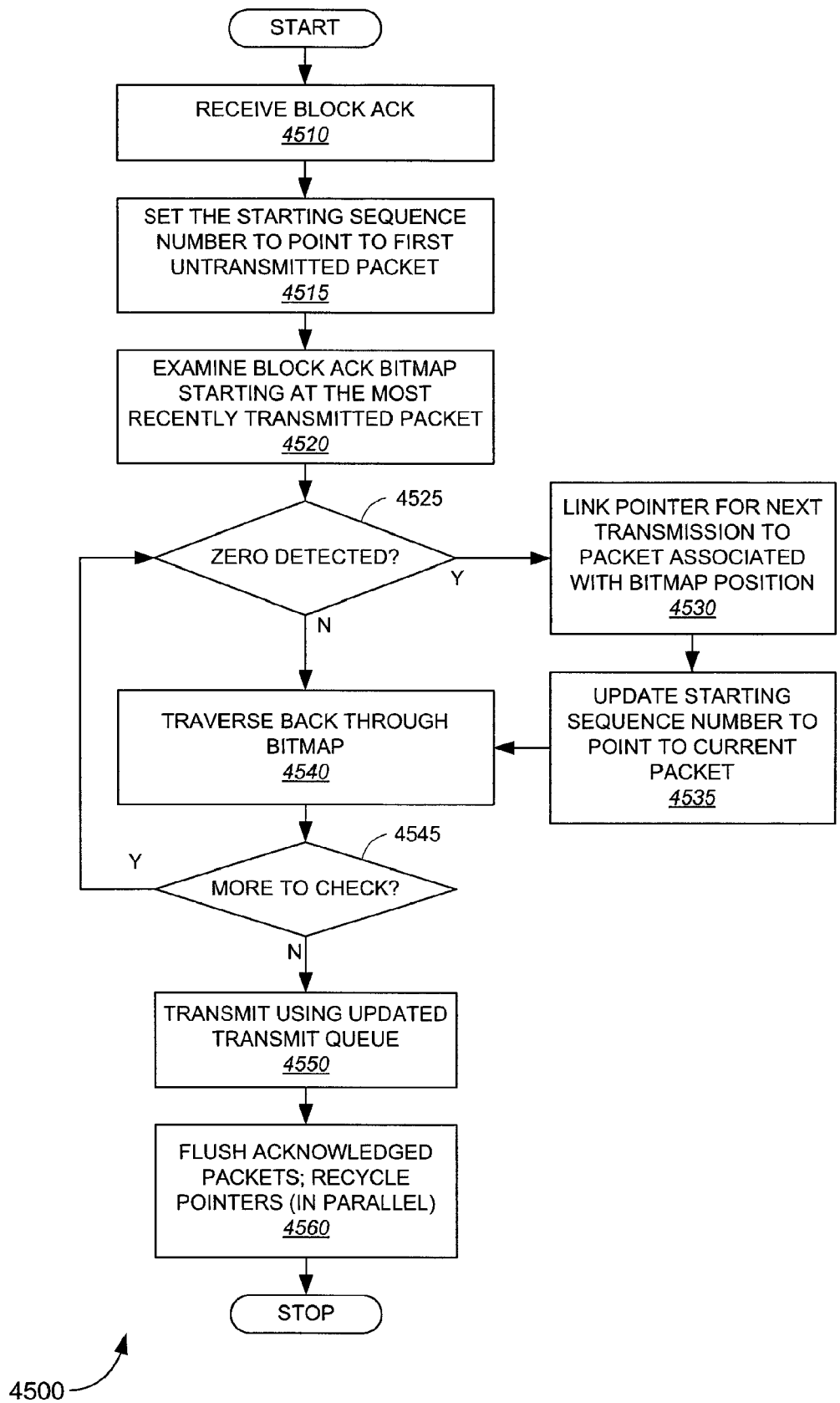
FIG. 45 depicts an example embodiment of the method for responding to a block acknowledgement.

FIG. 45 depicts an example embodiment of the method 4500 for responding to a block acknowledgement. This method is well suited for embodiments deploying node arrays such as those stored in node array caches 1810, detailed above. Furthermore, the queues described above, which can be altered and maintained by linked lists of nodes, are well suited for adaptation to method 4500 as well.

To summarize the procedure, recall that the block acknowledgement corresponds to a window size (which is up to size 64 in the example embodiment). The starting sequence number is set to the lowest sequence number represented by the window (conceptually the left most point of the window). The transmitter knows how many packets have been transmitted, thus it knows where the last packet is in the window. Starting from the last packet transmitted, the transmitter can then proceed to step packet by packet through the bitmap from the most recently transmitted to the earliest transmitted. If a non acknowledgement (a zero, in the example embodiment) is identified, then the node pointer for that packet is re-linked into the transmit queue (which re-queues the packet for retransmission). The transmitter proceeds through the bitmap reconstructing the linked-list transmit queue until the beginning of the bitmap (identified by the previous starting sequence) is reached. Method 4500 is one such technique that may be deployed, although any technique for determining the required retransmit parameters may be used in conjunction with embodiments detailed herein.

The example below illustrates using a block ACK bitmap to process the transmit queue in a packet buffer. The same or similar techniques are equally applicable to providing low-latency retransmission in response to a block ACK. For example, a queue, such as a node array 1842 may be loaded with a flow's nodes, which are then transmitted, as described above. Those nodes may remain until a block ACK is received and processed. The block ACK bitmap may be used to indicate which nodes need to be retransmitted. In one embodiment, the positions of nodes in the node array will correspond with positions in the block ACK bitfield. Upon receipt of a block ACK, packets that were not acknowledged can be promptly aggregated and retransmitted (assuming a transmit opportunity is available) using aggregation techniques detailed above. This is one example of low latency response techniques allowing remaining transmit opportunity to be efficiently utilized. The nodes in the node array may be moved as the window moves, in similar fashion as described below. Note that, whether using node arrays or transmit buffers for block ACK processing and retransmission, when packets are stored in a packet buffer using data structures such as nodes and chunks, detailed above, there is never a need to move the packet data within the packet buffer. It may remain in one location through first transmission and any subsequent retransmissions (although it may be re-accessed during each transmission) until the packet is successfully received, or exceeds predetermined limits and is flushed.

At 4510, a block acknowledgement is received. At 4515, the starting sequence number is set to point to the first untransmitted packet. Thus, in the example where a block ACK is received indicating all of the packets transmitted were received correctly, the window will be moved. The next packet for transmission will be the first packet in the new window, hence the starting sequence number should be associated with that packet. The following steps detail how to modify the starting sequence number and update the transmit queue, to accommodate any necessary retransmissions should they be necessary. When the process is finished, the starting sequence number will have automatically been updated to the proper place moving the window forward (if possible). The transmit queue will be updated, allowing for transmission or retransmission to begin immediately.

At 4520 examine the block ACK bitmap starting at the most recently transmitted packet. At 4525, if a zero is detected (or in an alternate embodiment a non acknowledgement indicator is detected) then that packet needs to be retransmitted. Proceed to 4530 and link the pointer for the next transmission to the packet associated with that bitmap position. For example, when a transmit queue is deployed such as detailed above with respect to FIG. 6, the queue head pointer 630 can be directed to point to the node associated with the packet for which a zero was detected. Then, the next node pointer field 612 contained in that node may be updated to point to the previous head pointer. In alternate embodiments, alternate techniques may be used for updating a transmit queue.

At 4535 the starting sequence number is updated to point to the current packet. Thus, for each zero received, the starting sequence number will be moved to a previous location. As described above, if all of the packets were received correctly, the window will have moved to the next packet awaiting transmission. However, that forward movement is then backed off until the earliest detected zero. Subsequent to the entire method 4500 process, if the packet associated with the starting sequence number in the block acknowledgement was not received correctly, naturally, the window will not be moved forward at all.

At 4540, traverse back through the bitmap to the next previous packet. At 4545, if there are more bitmap positions to check, return to decision block 4525 for the next acknowledgement. At 4525, if a zero is not detected, then the process flows through 4540, traversing through the bitmap and checking to see if the bitmap is complete. Once all packets in the bitmap have been tested, from decision block 4545, proceed to 4550 and begin transmitting using the updated transmission queue. At 4560, the packets that have been acknowledged may be flushed and their associated pointers recycled for subsequent use. Note that this step may operate in parallel (or in the background) as shown. Then the process may stop.

In summary, when a bitmap is received for a block ACK, the zeros in the bitmap are re-linked with the existing transmit queue to form a new transmit queue. The associated node pointers for these packets are re-written in memory. Note however, that the packets themselves (identified by chunk pointers and contained in chunks 620) never move. Only when the packets have been transmitted successfully and acknowledged (or another event such as a timeout occurs) will a node and chunk be flushed and the pointers returned to the free pointer list. This memory management process may be performed in parallel, may be delayed from the block ACK processing, may be performed in the background, and so forth. In a circumstance where, for example, the transmitter has remaining time in its TXOP, the retransmission queue is generated quickly and transmission may proceed to utilize any remaining TXOP. If the transmitter does not have permission to immediately retransmit (i.e. there is no more remaining TXOP) the same method may be performed, but transmission need not happen immediately.

Figure 46:
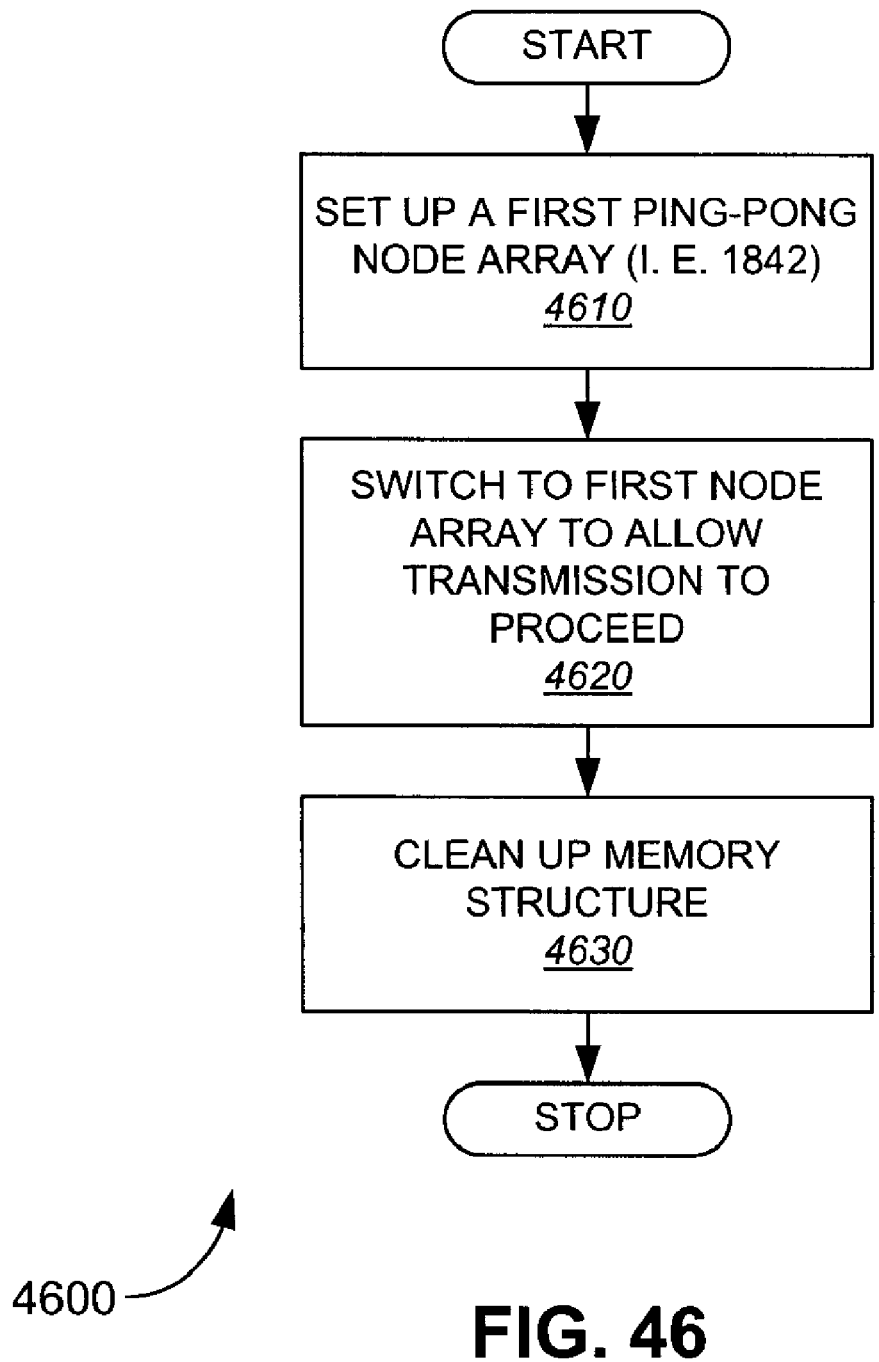
FIG. 46 depicts an example embodiment of a method for utilizing a ping-pong node array cache in a retransmission process.

Recall that, as described above with respect to FIG. 18, a ping-pong type cache may be deployed to allow node arrays 1842 to be updated without interfering with an ongoing transmission. This technique may be deployed in a block acknowledgement retransmission scheme as well. FIG. 46 depicts an example embodiment of a method 4600 which may be deployed for utilizing a ping-pong node array cache in a retransmission process. For example, method 4600 may be incorporated in block 4550 described above. At 4610, set up a first ping-pong node array 1842 using node pointers from the transmit queue, potentially updated in response to retransmission information in the block acknowledgement request. As appropriate, update the link ID in 1844, as detailed above. At 4620, switch to this first node array to allow transmission to proceed. At 4630, the memory structure may be cleaned up, as required (i.e. flushing packets, recycling pointers, and the like).

Multi-TID Block Acknowledgment

At a given station it may be possible to support a variety of flows (e.g. up to 16 flows), where each flow corresponds to a Traffic Identifier (TID). Recall that a TID maps a flow from a station. In one aggregate, it is possible to find packets corresponding to multiple TIDS, e.g. aggregating packets per link. Therefore a block ACK may be returned corresponding to multiple TIDs (or, a multi-TID block ACK). In one embodiment, a multi-TID block ACK comprises a TID, then a bitmap, then another TID, then another bitmap, and so forth. One issue arises in that the packets within an aggregate are not necessarily in serial order (i.e., due to retransmissions). So, for a given TID, the block ACK will start with a start sequence number, which specifies the lowest sequence number received in that aggregate for that TID. Then the TID bitmap is provided as an offset from starting sequence number. Several embodiments are detailed below for preparing a multi-TID block ACK.

In one embodiment, as the packets arrive, compare each sequence number and keep the lowest. The process may begin by saving the first received sequence number for each TID. Then, as each packet arrives, compare the saved sequence number for the TID with that of the new packet, and keep the lowest. At the end of the aggregate, you will have the lowest starting sequence number for each TID. After you find the lowest sequence number represented, subtract that sequence number from the sequence number of each packet for which you are responding (which can be saved as they arrive) to find that packet's offset within the bitmap. The lowest starting sequence number is the starting sequence number for the TID. At line speed, determine whether a packet is valid may occur at line speed and simply save each bit for ACK or NAK, along with the absolute sequence numbers. At the end of the aggregate, traverse through the series of saved packet sequence number, use the subtracted value as the offset or index into the bitmap, and place the saved ACK or NAK in the bitmap.

In an alternate embodiment, store the bitmap relative to the lowest sequence number currently received. Then a left or right shift (depending on the storage order) may be made to update the location. For example, while storing the bitmap, if the sequence number of an incoming packet is higher than the current lowest sequence number, simply mark the acknowledgement bit in the appropriate place (determined by the difference between the lowest received sequence number and the presently received sequence number. If the incoming sequence number is lower than the lowest previously received sequence number, then shift the bitmap (and put the new ACK or NAK in the lowest spot). The shift may be determined as the difference between the old starting sequence number (i.e. the lowest previously received starting sequence number) and the new starting sequence number (i.e. the number of the currently received packet, which will be the new lowest). In contrast to the first embodiment detailed above, in which traversing through saved sequence numbers was performed, in this embodiment it is only necessary to save the bitmap and the lowest starting sequent number. None of the other sequence numbers in the bitmap need to be retained.

The above embodiment descriptions apply to immediate partial-state block acknowledgement. To extend to full-state, simply retrieve the stored history for each flow first, then add to it. Either embodiment may be deployed for a single-TID situation, and may be repeated for each TID to support multi-TID.

Unscheduled U-APSD

Figure 47:
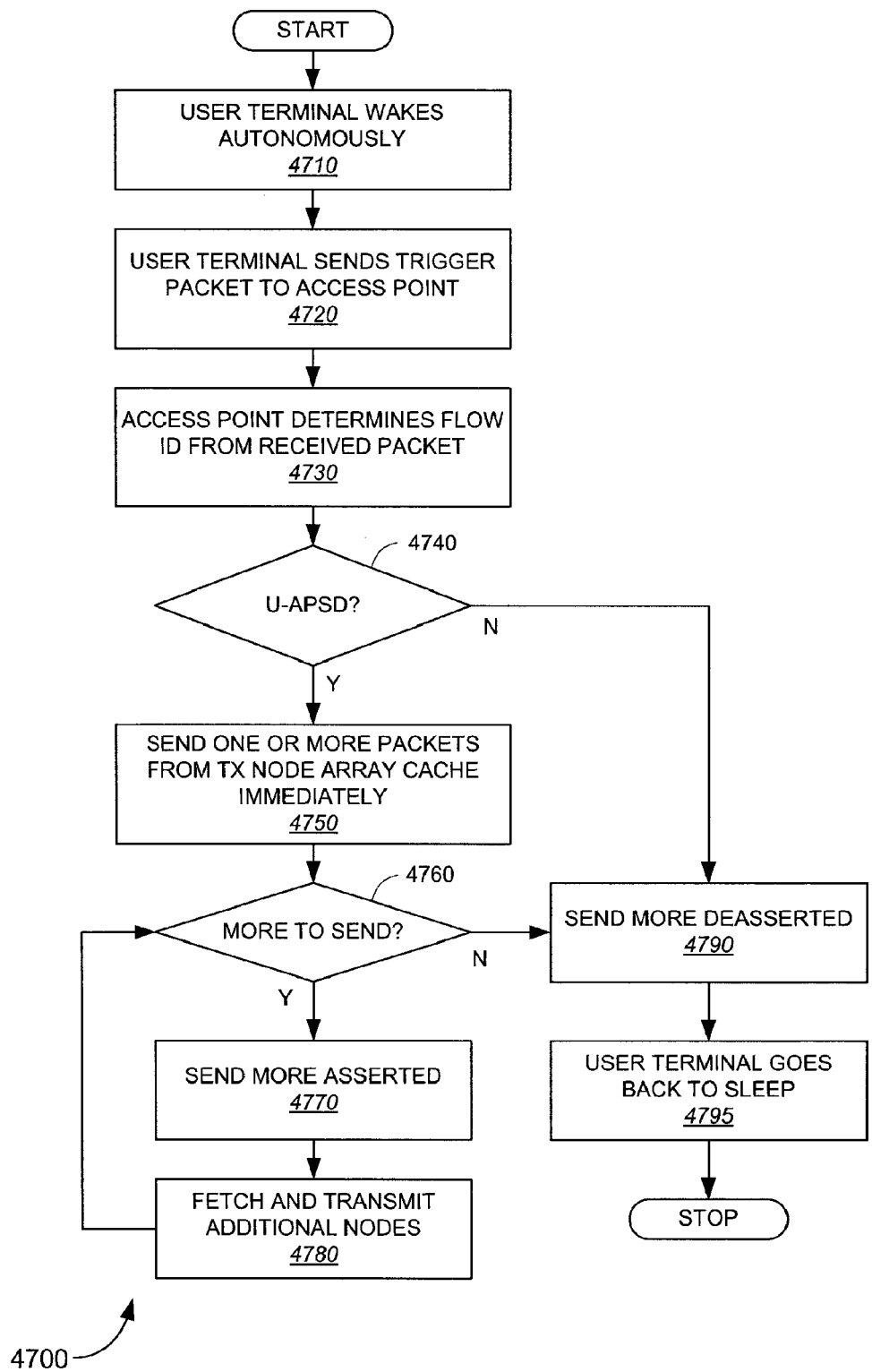
FIG. 47 depicts an example embodiment of a method for performing unscheduled automatic power save delivery.

Example embodiments detailed herein are also well suited for adaptation to provide Unscheduled Automatic Power Save Delivery (U-APSD). U-APSD is a technique used to conserve power. There are many variations, including scheduled and unscheduled techniques. FIG. 47 depicts an example embodiment of a method 4700 for performing unscheduled automatic power save delivery. At 4710, in a typical U-APSD scheme, a user terminal wakes up autonomously. At 4720, the user terminal sends a trigger packet to the access point. At 4730, the access point determines the flow ID from the received packet. At decision block 4740, if there are packets awaiting transmission to the user terminal associated with the flow ID, proceed to 4750. If not, proceed to 4790, where an indicator "send more" is deasserted, indicating there are no packets for transmission (e.g. the End Of Service Period (EOSP) bit). At 4795 the user terminal may then go back to sleep, and the process may stop. In decision block 4740 if there are packets for transmission to the user terminal, proceed to 4750.

At 4750, send one or more packets from the TX node array cache immediately. For example, a TX node array cache 1810, such as described in FIG. 18 above, may be accessed. Using the techniques illustrated in FIG. 18, a transmitter may reply to the awakened user terminal immediately. This avoids having to employ an alternate technique to keep the user terminal awake, such as sending a packet without data. This avoids wasting of bandwidth as well as power, as the user terminal need not remain awake any longer than necessary. Since the packets are queued up and readily accessible, as described above, it is likely using this technique that a response to the user terminal can be made including data. Note that, in some example systems, such as a typical Voice Over Internet Protocol (VOIP) system, only a single packet or two may be needed to support the voice communications. Thus, a user terminal, employing U-APSD may awaken in an unscheduled manner, quickly retrieve the packet or two with relatively little delay, and proceed to return to sleep to save power.

At decision block 4760, if there are packets to send in addition to those included in the response packet sent at 4750, proceed to 4770. At 4770 assert a "send more" indicator, which may be included in a packet transmitted to the user terminal. This "send more" assertion will indicate to the user terminal that it should remain awake to receive additional packets. At 4780, fetch additional nodes and transmit associated additional packets, as described above. Return to 4760 to determine if there are additional packets to send. Once all the packets designated for this user terminal are transmitted then, as described above, at 4790, "send more" is deasserted and at 4795, the user terminal may return to sleep.

Thus, in the example U-APSD embodiment detailed above, up to four packets may be transmitted to any user terminal immediately since they are available in the node array cache. These four packets may be sent promptly and if more are to follow, an indicator may be set. Subsequently, after SIFS, block ACK, and the like, additional packets will be ready for transmission. In this example, a variable is maintained in the TX flow state table (e.g. 1030) to indicate to an AP whether or not a UT is awake or asleep. This embodiment describes using caching as illustrated in the transmitter shown in FIG. 18 (node array caches 1810). Note that alternate amounts of caching may be used, or partitioned differently, if increased storage is desired for particular flows (i.e. repartition to allow for more than 4 packets in response).

Power Save Multi Poll (PSMP)

The Power Save Multi Poll (PSMP) is another area where the node caching scheme detailed above provides benefits. There are two varieties of PSMP, unscheduled and scheduled.

Unscheduled PSMP (U-PSMP) is similar to Unscheduled APSD. When a Station wakes up, it uses EDCA procedures to send a trigger message, which can be either a QoS_Data or QoS_Null message for the Access Class that has been configured to be Trigger Enabled (via setup messages). Upon receiving this packet, the AP sends packets stored for this Station, which are advantageously stored in the node array cache 1810. In the last packet, the AP sets EOSP to 1 to indicate there are no more packets. After receiving this packet, the Station goes back to sleep. When a Station is configured to be U-PSMP enabled for a specific Access Class, the corresponding Flow is indicated to be U-PSMP enabled in the TA/TID-Flow Mapping Table (e.g. 1030). In addition, a State Variable indicating whether the Flow is in Sleep or Active mode is also maintained in the TA/TID-Flow Mapping Table.

Thus, the above embodiments are well suited to support U-PSMP. In an example embodiment, a first variable indicating whether a flow is a PSMP flow, and a second variable indicating whether a particular station is awake or asleep may be maintained, and added to other variables as described above. After a receive data (or trigger), the AP checks that this trigger is a legitimate U-PSMP flow (in accordance with the first variable), and sets the second variable from "asleep" to "awake". The AP sends out packets stored for that STA, which are readily available, then sends the station to sleep and sets the second variable back to "asleep". The awake bit can also be used if there is remaining TXOP. In such a case, the awake bit is checked, and TXOP is only used for a STA when it is awake. The AP has the discretion to keep a station awake to perform transmissions and so forth. The variables may be added to TX array state table 1830.

In scheduled PSMP (S-PSMP), a template is developed and then an uplink and downlink schedule is published (for example, firmware in an AP could perform this function, as well as any other device). Wireless communication devices within the WLAN may use the same template until a new call is added or a call goes away. Then a new template may be created.

In one embodiment, the AP is in control of the scheduled PSMP. One method may be performed as follows: 1) the AP sends itself a Clear to Send (CTS) to clear the medium. The CTS sets a NAV duration equal to the down stream plus up stream transmission opportunities. 2) The AP sends the PSMP frame, which details the uplink and downlink schedule (per station, to the microsecond). 3) The downlink transmission then commences. 4) The uplink transmission follows the downlink transmission. 5) This format is highly scheduled, and the AP avoids going past the scheduled end-time, to remove jitter. This may be accomplished by restricting access to the medium near the end of the NAV duration. It is important to avoid jitter so that user terminals don't wake up to check their status, miss their messages due to an offset introduced by jitter, and go back to sleep, missing their transmission opportunities.

In an example embodiment, the data structure used to generate the schedule will be kept in a ping-pong data structure, as described above. The data structure comprises the template used for the uplink and downlink schedule used for scheduled PSMP. The current schedule is kept in one half of the ping-pong data structure. This may be transmitted to the stations on the WLAN. The AP may then make changes to the template in the other half of the ping-pong data structure. A selector may be deployed to alternate between the first template and the second template. The AP is free to work on whichever template is not active without interfering with the active template. This technique is analogous to the use of the node arrays 1842, or the shadow flow tables (1092 and 1096).

Alternate Embodiment: Bifurcated High and Low Throughput

As described above with respect to FIG. 10A, various functions, such as fragmentation, may not be required for high speed packet processing, while support for other packet types or legacy 802.11 packets may still be desired. FIG. 48 illustrates an alternate embodiment deploying more than one MAC processor. A high speed MAC processor, such as detailed H2W processor 530 and lower MAC 540 (deployed in a MAC processor such as 240, detailed above), may be deployed (perhaps with simplified functionality) for efficient high speed processing, while an alternate MAC processor 4810 is deployed in parallel for processing other packet types (or legacy packets, such as various types of 802.11 packets, for example).

In one example embodiment, a lower throughput MAC processor 4810 is embodied in processor 210 (and may also include other components, such as components deployed for legacy packet processing, if desired). Processor 210, in the example embodiment, is sufficiently powered to process the low throughput and legacy packets, allowing higher throughput components such as H2W processor 530 to be designed to efficiently support high throughput packets. Other embodiments may include additional MAC processors, as described below.

In this example, since 802.11(n) packets will not support fragmentation, the embodiments detailed above may be simplified by removing fragmentation support from the hardware and implementing it in firmware. Various example simplifications are noted above. Having the firmware process all the legacy packets allows removal of fragmentation support, simplifies the transmit and receive engines, and simplifies node and chunk management (since the fragmentation threshold can be different from chunk sizes). Those of skill in the art will readily adapt the embodiments detailed herein to include or omit various processing blocks depending on which features are supported.

Those of skill in the art will readily appreciate the tradeoffs when deploying an embodiment including a single processor capable of processing all the functions of various packet types and another embodiment comprising two or more MAC processors, each capable of providing any subset of functionality. Of course, a single MAC processor capable of processing packets requiring a single set of functionality may also be deployed.

Bifurcated high and low throughput is but one example of partitioning functionality between multiple MAC processors. In general, any set of functions may be deployed in different MAC processors. For example, it may be desirable to process two equally high speed (or any speed) packet types in separate processors when the processing requirements for the different packet types do not share sufficient similarities to achieve efficiency by sharing components, or if circuit design considerations are sufficiently dissimilar between designs for supporting various packet types.

Figure 49:
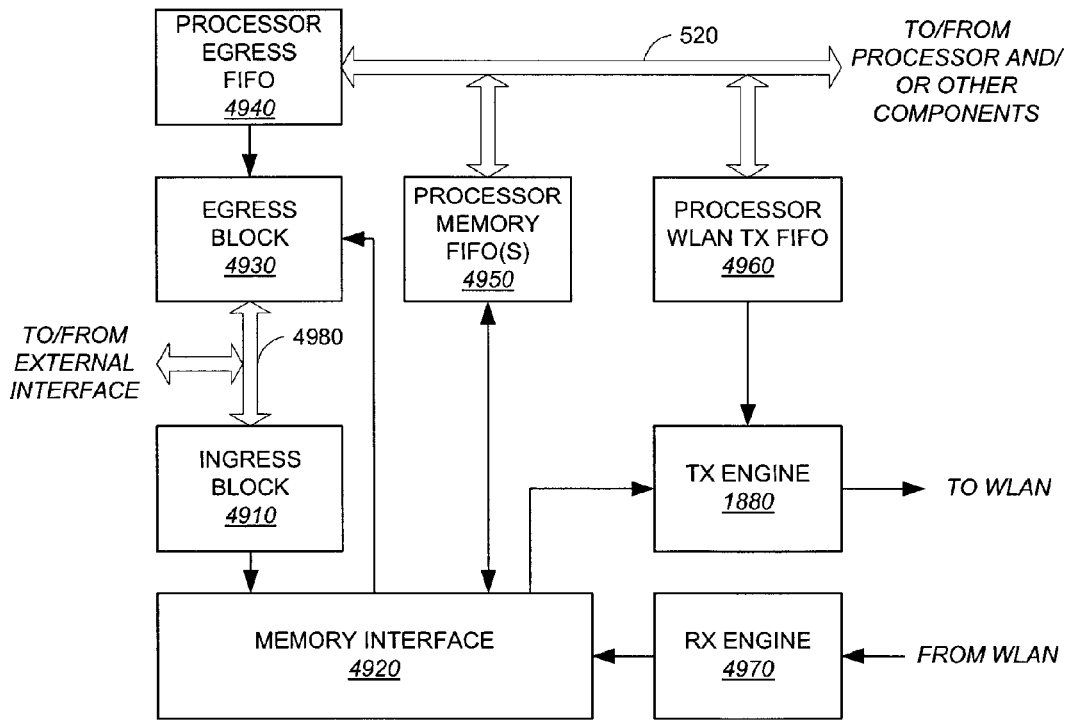
FIG. 49 depicts an example embodiment of a wireless communication device including two MAC processors, including a first MAC processor and a second MAC processor embodied in a microprocessor.

FIG. 49 depicts an example embodiment of a wireless communication device 4900 (e.g. an access point 104 or user terminal 106) including two MAC processors, including a first MAC processor as described above and a second MAC processor embodied in the microprocessor. This example is a more detailed example similar to the generalized embodiment of FIG. 48.

Those of skill in the art will readily adapt the embodiment shown in FIG. 5 above to the alternate embodiment depicted in FIG. 49. In this example, ingress and egress packets arrive and depart from an external interface on bus 4980. Example external interfaces include SDIO I/F 582, PCI I/F 584, a USB interface, or any other type of interface. The interface may include circuitry to arbitrate and/or multiplex between one or more interfaces. Incoming packets are processed by ingress block 4910 and stored in memory via memory interface 4920, using any of the ingress and memory management techniques described above. Memory interface 4920 may include, for example, memory arbiter 552 and/or 556, mux 554, SRAM interface 558, SDRAM interface 562, or various other components. Those of skill in the art will adapt other memory interfaces as well.

In contrast with the embodiment of FIG. 5, certain packet types are processed in the processor (e.g. processor 210). In this example, ingress packets which are to be formatted by the processor are delivered from memory interface 4920 to the processor via processor bus 520 (various other components may also be attached to processor bus 520, examples of which are shown in FIG. 5). A processor interface may be deployed between memory interface 4920 and bus 520. In this example, one or more processor memory FIFOs 4950 are deployed (any other interface for delivering received packets. This allows packets (as well as data structures such as nodes, chunks, etc.) to be stored for use by processor 210. Received low throughput packets are also processed by processor 210, and may be transferred from memory interface 4920 to processor bus 520 via a processor memory FIFO 4950.

In an alternate embodiment, Processor Memory FIFOs may be replaced with a direct connection to processor memory. For example, DMA may be used to place low speed packets into memory for processing by processor 210. In one embodiment, memory interface 4920 may write low speed packets directly into processor memory 4950 (not a FIFO) without storing the packet in the high speed packet RAM.

In this example, packets may also be deposited in memory (via memory interface 4920) by Processor 210 as well. For example, the processor may re-route a received packet back out on the WLAN without sending the packet out on the external interface. Note that all embodiments detailed herein may be adapted to reroute received packets back out for transmission. Packets delivered to bus 520 may be formatted using any of the techniques described above.

In the example embodiment, 802.11 (b), (g) and (e) packets are routed to the processor for formatting (including any fragmentation that may be appropriate). Other packet types may also be suitable for processor formatting. For example, 802.11(n) specifies an Aggregated MAC Service Data Unit (A-MSDU) which is also suitably formatted by the processor. Various techniques for rerouting may be deployed. In this example, when a packet is received for processor formatting, the packet is stored in memory and an interrupt is given to the processor to initiate the formatting for transmission (details not shown).

Formatted low throughput or legacy packets, after processing by processor 210, may be stored for transmission in processor WLAN transmit FIFO 4960. Feedback may be provided to the processor WLAN transmit FIFO 4960, such as a ready signal, signals to provide throttle control, and the like. These packets may also be delivered to TX engine 1880 for queuing and possible further processing (e.g. with legacy protocol engine 2210) and ultimately for transmission on PHY 260. They may be delivered directly to TX engine 1880, or they may be incorporated into queues 1850 (as described in FIG. 18), managed by array control 1840, etc. Note that in the example embodiment aggregation module 2610 may be bypassed for legacy and A-MSDU packets.

High speed packets, such as the 802.11(n) Aggregated Mac Protocol Data Units (A-MPDU), are also received by ingress block 4910 and stored in memory via memory interface 4920. In this case the packets are transmitted by TX engine 1880 using techniques detailed above (e.g. with respect to FIG. 18). In this example, hardware processing of the high speed packets allows for high speed transmission, while lower speed packets such as the legacy packets described above can be carried out in firmware of processor 210 without creating a throughput bottleneck. This allows for the legacy details of various legacy packets to be left out of the high speed MAC processing hardware, allowing it to be designed more efficiently, while still providing legacy support through the firmware implemented MAC processor. High speed packets are ultimately transmitted on the WLAN via the PHY. A header may used to indicate high speed or low speed physical transmission.

Packets received from the WLAN are delivered to a coupled RX engine 4970 and ultimately stored in memory via memory interface 4920. Low speed packets may be passed through to processor 210 for processing (i.e. legacy packets, or for packets using features not supported in the hardware MAC processor, such as fragmentation, etc.) In an alternate embodiment, the packets may go directly to processor 210 (without being stored in memory) or may be connected to any other alternate MAC processor (recall that may number of MAC processors may be deployed, for supporting any number of sets of packet features). In this example, low throughput or legacy packets are delivered to the processor from memory interface 4920 via a processor memory FIFO 4950, as described above. They may or may not be partially processed with legacy protocol engine 2210. Note that disaggregation unit 2802 may be bypassed for non-aggregated data units (Such as legacy packets).

RX engine 4970 (as well as other components, such as legacy engine 2210, if deployed, for example) process disaggregated packets as detailed above in lower MAC core 540. In this example, the high speed packets are the only packets processed in the hardware MAC processor, but in alternate embodiments any type of packets may be processed.

The RX engine 4970 may decrypt either packet type using legacy engine 2210, as detailed above. Note that received packets may be tagged by a MAC/PHY interface (e.g. MAC/PHY interface 545, detailed above) to indicate the packet type. For example, packets may be identified as 802.11 (a), (b) (e), (g), (n), etc. Packets may be identified as A-MSDU or A-MPDU. In general, any tag may be applied to indicate the routing of a packet to one of any number of MAC processors.

In the example embodiment just described, note that aggregation and disaggregation only apply to high speed packets (aggregation is optional for high speed packets, as described above). Low speed packets are passed through the aggregation and disaggregation blocks. Fragmentation is supported for legacy or low speed packets only, not high speed packets. The processor (i.e. 210) is a first MAC processor and the second MAC processor comprise various components detailed above (i.e. in FIG. 5). As described above, these are examples only. In general, any feature set may be supported in a first MAC processor and the same set or a different set of features in a second MAC processor (either of which or neither of which may be performed using a processor such as processor 210).

Egress block 4930 may receive and handoff high speed packets from the packet buffer via memory interface 4920. Egress block 4930 may also arbitrate between low speed packets delivered from processor egress FIFO 4940 and high speed packets. In the example embodiment, the processor delivers processed packets ready to handoff in priority order to processor egress FIFO 4940. In an alternate embodiment, an alternate memory could replace processor egress FIFO 4940 to allow egress block 4930 to select packets for prioritization within egress block 4930, if desired. In yet another alternate embodiment, processor egress FIFO 4940 could be eliminated, and egress block 4930 could hand off low speed packets via direct access to the processor memory (e.g. with DMA or other access method). In yet another embodiment, processor egress FIFO 4940 may have multiple priority queues from which egress block 4930 could select to implement a priority scheme.

Those of skill in the art will recognize myriad alternate configurations of the teachings embodied in the wireless communication device 4900.

Figure 50:
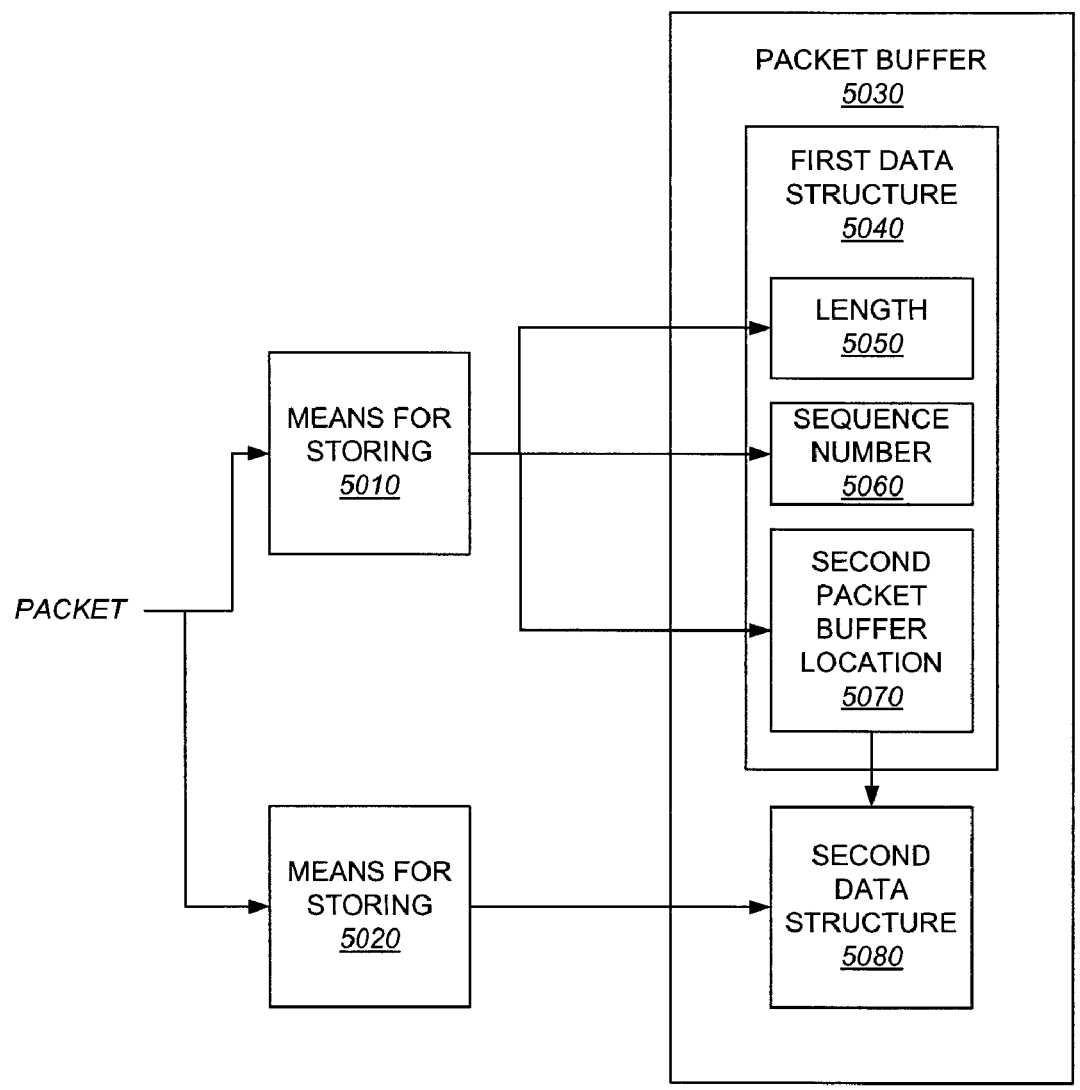
FIG. 50 illustrates aspects of multi-flow packet buffering and queuing.

FIG. 50 illustrates aspects of multi-flow packet buffering and queuing. FIG. 50 comprises a means for storing 5010 in a first data structure 5040 in a packet buffer 5030 the length of a first packet 5050, the sequence number of the packet 5060, and a second packet buffer location 5070 of a second data structure 5080 in the packet buffer; and means for storing data 5020 from the first packet in the second data structure 5080 identified by the stored second packet buffer location 5070.

Figure 51:
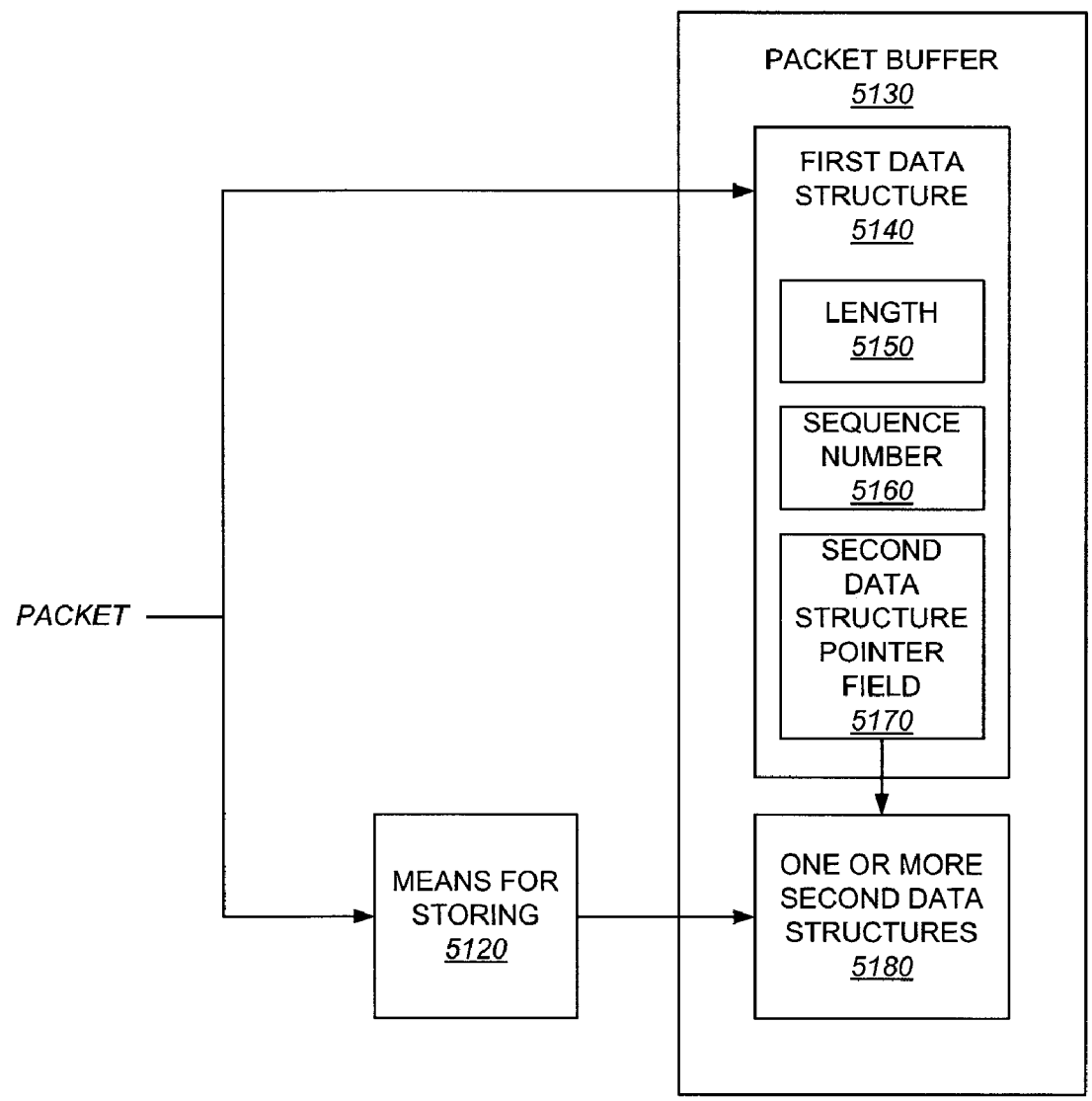
FIG. 51 illustrates aspects of multi-flow packet buffering and queuing.

FIG. 51 illustrates aspects of multi-flow packet buffering and queuing. FIG. 51 comprises a first data structure 5140 associated with a packet; and one or more second data structures 5180 comprising data from the associated packet; and shows the first data structure comprising a length field 5150 indicating the length of the associated packet; a sequence number field 5160 indicating the sequence number of the associated packet; and a second data structure pointer field 5170 indicating the location in a packet buffer 5130 of one of the second data structures 5180; and shows means for storing 5120 the packet in one or more of the second data structures 5180.

Figure 52:
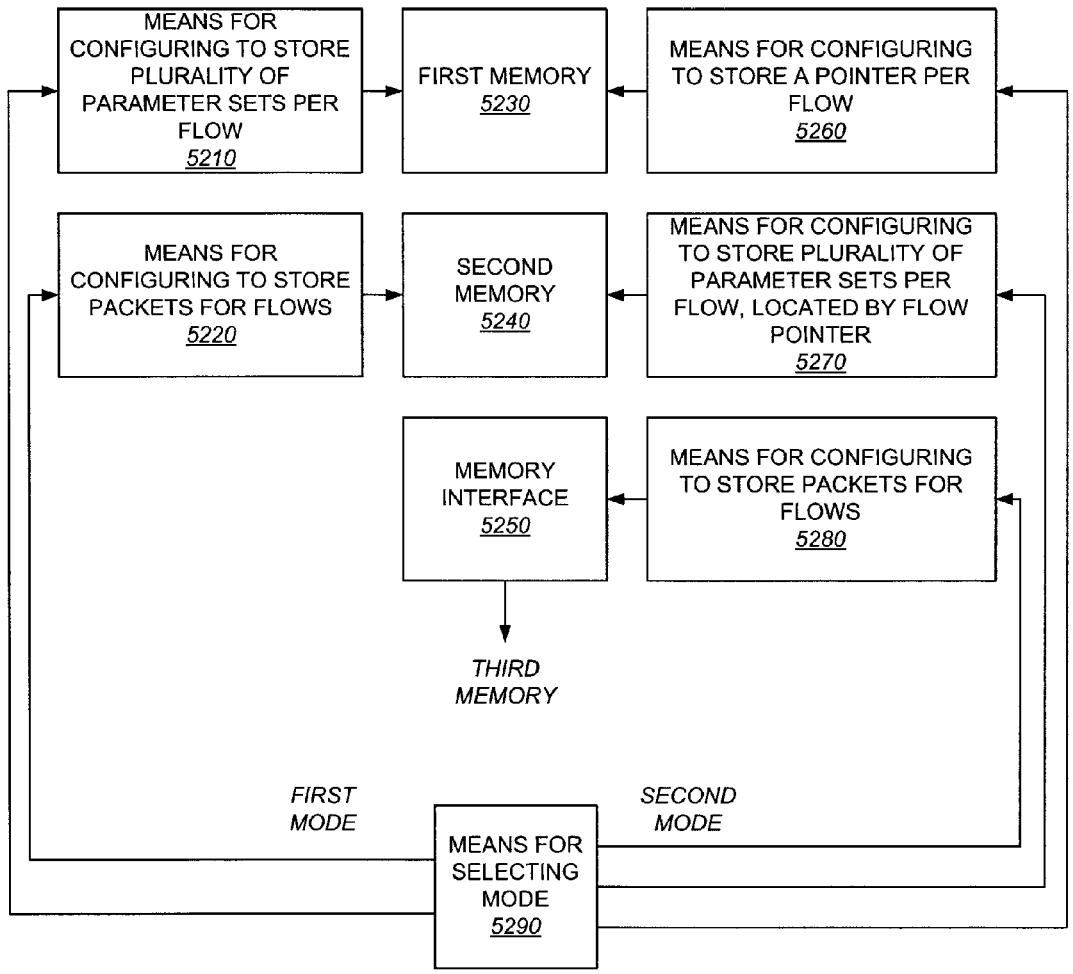
FIG. 52 illustrates aspects of memory management for high speed media access control.

FIG. 52 illustrates aspects of memory management for high speed media access control. FIG. 52 comprises means 5290 for selecting a first or second mode; means 5210 for configuring a first memory 5230 in a first mode to store one or more parameters for each of a plurality of communication flows; means for configuring 5260 the first memory in a second mode to store a pointer for each of the plurality of communication flows, each pointer indicating a location associated with the respective communication flow; means for configuring 5220 a second memory 5240 in the first mode to store packets for each of the plurality of communication flows; means for configuring 5270 the second memory in the second mode to store a plurality of sets of one or more parameters for each of the plurality of communication flows, each set of one or more parameters stored in the location indicated by the pointer associated with the respective communication flow; and means for configuring 5280 a memory interface 5250 operable with a third memory in the second mode to be operative to store packets for each of the plurality of communication flows.

Figure 53:
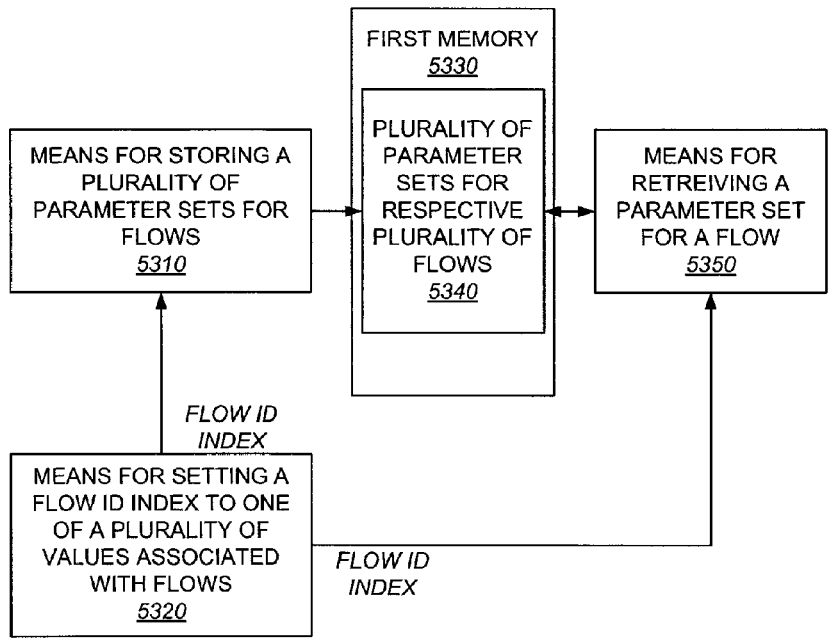
FIG. 53 illustrates aspects of multi-flow media access control.

FIG. 53 illustrates aspects of multi-flow media access control. FIG. 53 comprises means for setting 5320 a flow identifier index to one of a plurality of flow identifier index values, each flow identifier index associated with a respective one of a plurality of flows; means for storing 5310 a plurality of parameter sets 5340 in a first memory 5330 at a plurality of first memory locations, each parameter set comprising one or more parameters for a respective one of a plurality of flows, the first memory location for each parameter set identified by a respective flow identifier index value as set in the flow identifier index; and means for retrieving 5350 one or more of the parameters of one of the plurality of parameter sets from the first memory in accordance with the flow identifier index.

Figure 54:
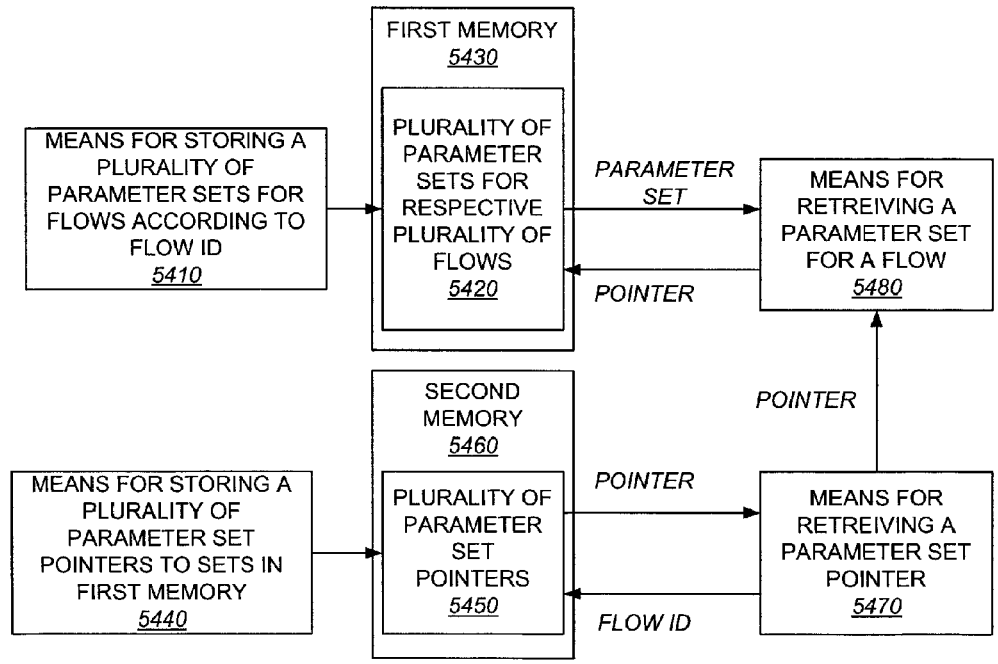
FIG. 54 illustrates aspects of multi-flow media access control.

FIG. 54 illustrates aspects of multi-flow media access control. FIG. 54 comprises means for storing 5410 a plurality of parameter sets 5420 in a first memory 5430, each parameter set stored at a respective one of a plurality of parameter set locations, each parameter set comprising one or more parameters for a respective one of a plurality of flows, each of the plurality of flows identified by one of a plurality of flow identifiers; means for storing 5440 a plurality of parameter set pointers 5450 in a second memory, each parameter set pointer identifying one of the plurality of parameter set locations in the first memory, each parameter set pointer associated with one of the plurality of flows; means for retrieving 5470 a parameter set pointer from the second memory in accordance with a flow identifier; means for retrieving 5480 one or more parameters from the first memory by accessing the parameter set in accordance with the retrieved parameter set pointer.

Figure 55:
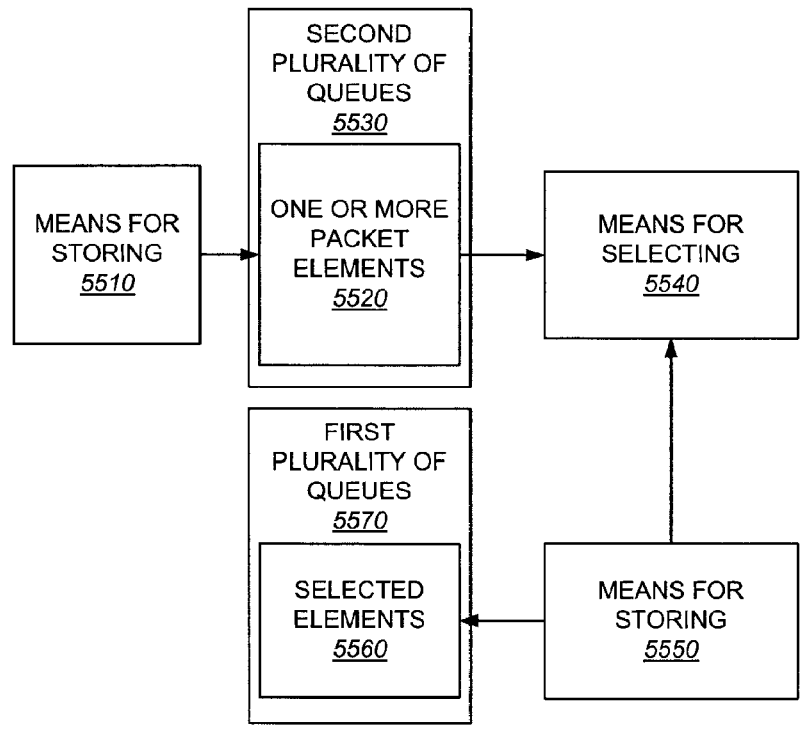
FIG. 55 illustrates aspects of multiple flow multiplexing for high speed media access control.

FIG. 55 illustrates aspects of multiple flow multiplexing for high speed media access control. FIG. 55 comprises means for storing 5510 one or more packet elements 5520 associated with one of a plurality of flows in each of a second plurality of queues 5530; means for selecting 5540 an element from one of the second plurality of queues; and means for storing 5550 the selected element 5560 in one of a first plurality of queues 5570, each queue associated with one of a plurality of channels.

Figure 56:
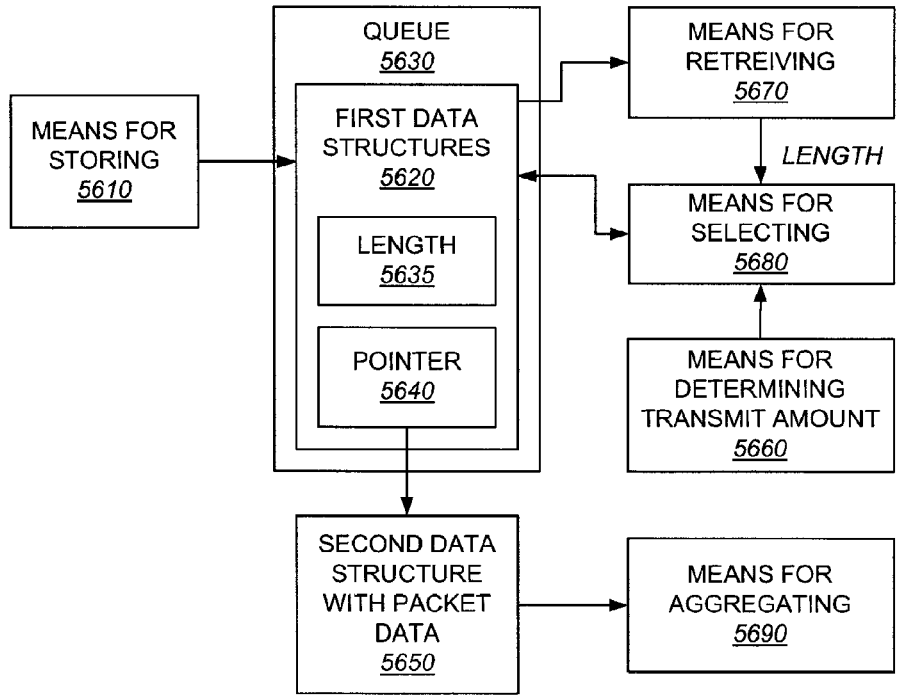
FIG. 56 illustrates aspects of aggregation in a high speed communication system.

FIG. 56 illustrates aspects of aggregation in a high speed communication system. FIG. 56 comprises means for storing 5610 one or more first data structures 5620 in a queue 5630, wherein each first data structure comprises a length field 5635 of a respective associated packet and a pointer 5640 to a second data structure 5650, the second data structure comprising at least a portion of the respective associated packet data; means for determining a transmit data amount 5660; means for retrieving 5670 one or more length values from the length field of one or more of the first data structures in the queue; means for selecting 5680 a set of one or more first data structures such that the sum of the retrieved length values from the set of first data structures is less than or equal to the transmit data amount; and means for aggregating packets 5690 in an aggregate protocol data unit, each aggregated packet identified by the pointer to the second data structure in the selected set of first data structures.

Figure 57:
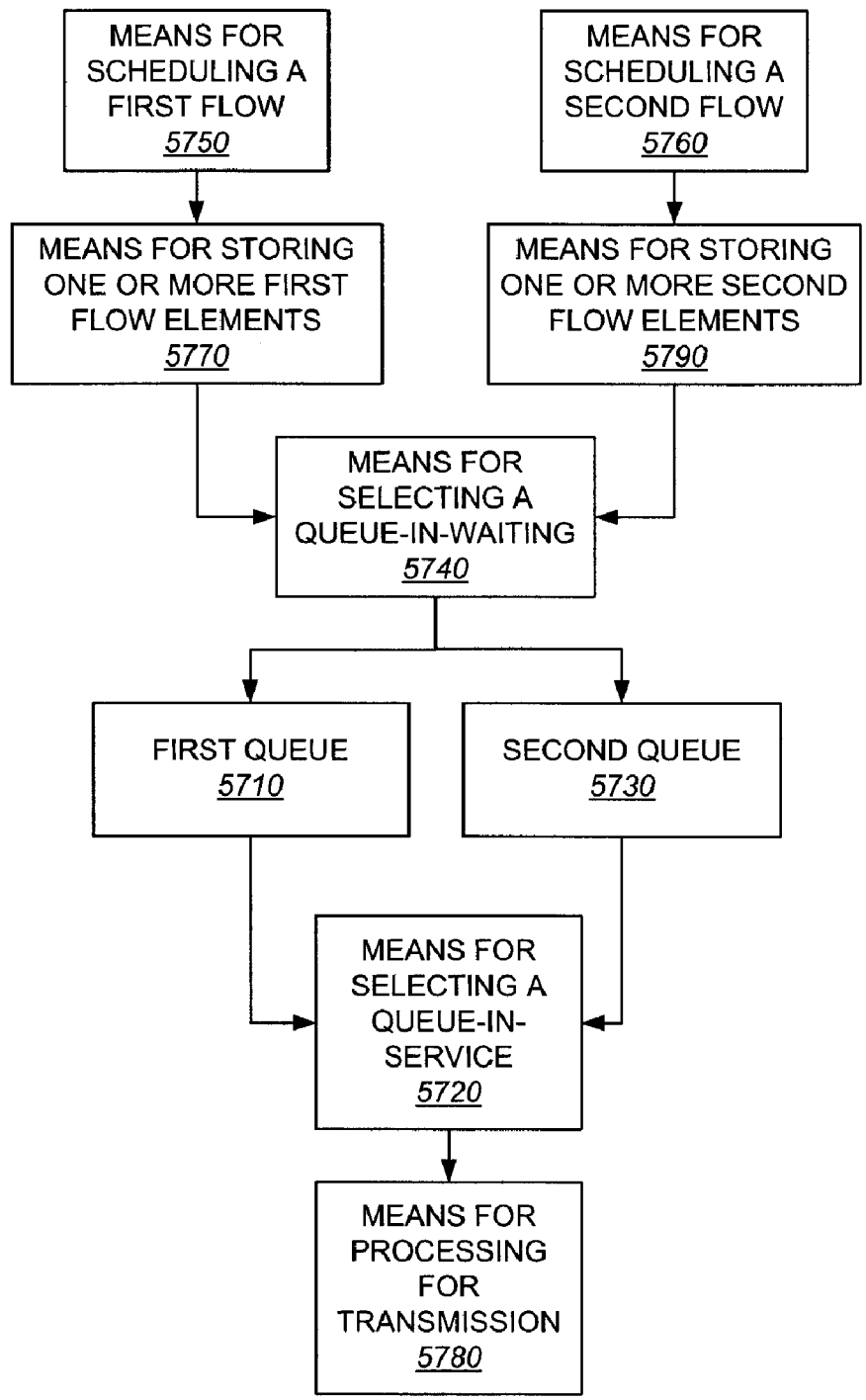
FIG. 57 illustrates aspects of shadow caches serving as queues-in-service and queues-in-waiting.

FIG. 57 illustrates aspects of shadow caches serving as queues-in-service and queues-in-waiting. FIG. 57 comprises means for selecting 5720 a first queue 5710 as a queue-in-service; means for selecting 5740 a second queue 5730 as a queue-in-waiting; means for scheduling a first flow 5750; means for scheduling a second flow 5760; means for storing one or more elements 5770 associated with the first scheduled flow in the queue-in-service; means for processing 5780 the queue-in-service for transmission during a first transmission opportunity; and means for storing 5790 one or more elements associated with the second scheduled flow in the queue-in-waiting, wherein the storing may occur simultaneously with the queue-in-service processing.

Figure 58:
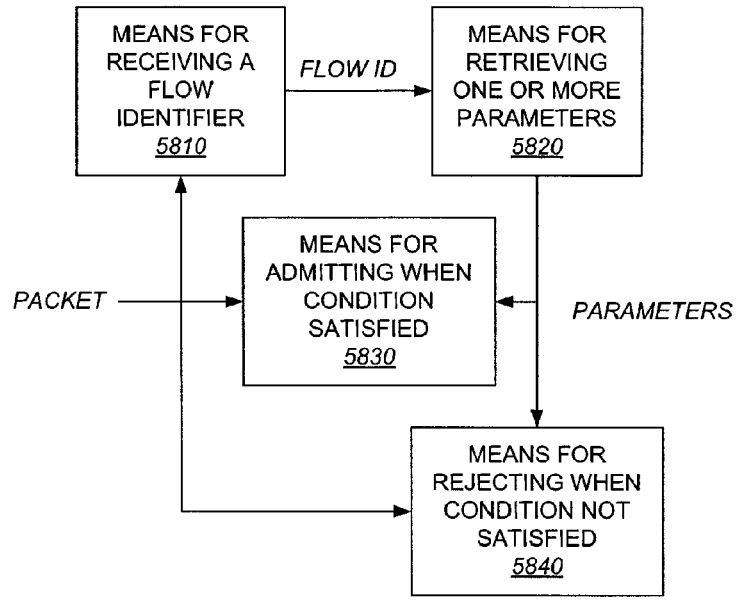
FIG. 58 illustrates aspects of ingress policing.

FIG. 58 illustrates aspects of ingress policing. FIG. 58 comprises means for receiving 5810 a flow identifier associated with a packet for one of a plurality of flows; means for retrieving 5820 one or more parameters associated with the flow identifier; means for admitting 5830 the packet when a predetermined condition is satisfied in accordance with the one or more retrieved parameters associated with the flow identifier; and means for rejecting 5840 the packet when the predetermined condition is not satisfied in accordance with the or more retrieved parameters associated with the flow identifier.

Figure 59:
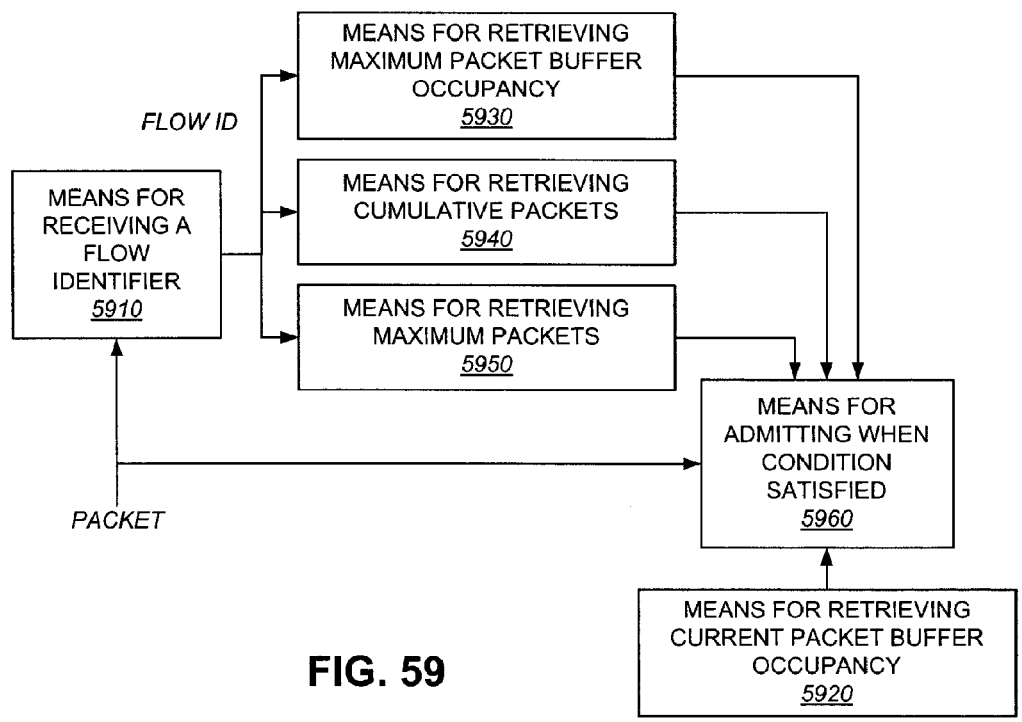
FIG. 59 illustrates aspects of ingress policing.

FIG. 59 illustrates aspects of ingress policing. FIG. 59 comprises means for receiving 5910 a flow identifier associated with a packet for one of a plurality of flows; means for retrieving a current packet buffer occupancy 5920; means for retrieving a maximum buffer occupancy 5930 associated with the flow identifier; means for retrieving cumulative packets 5940 associated with the flow identifier; means for retrieving maximum packets 5950 associated with the flow identifier; and means for admitting the packet 5960 when the current packet buffer occupancy is less than the maximum buffer occupancy associated with the flow identifier or the cumulative packets associated with the flow identifier is less than the maximum packets associated with the flow identifier.

Figure 60:
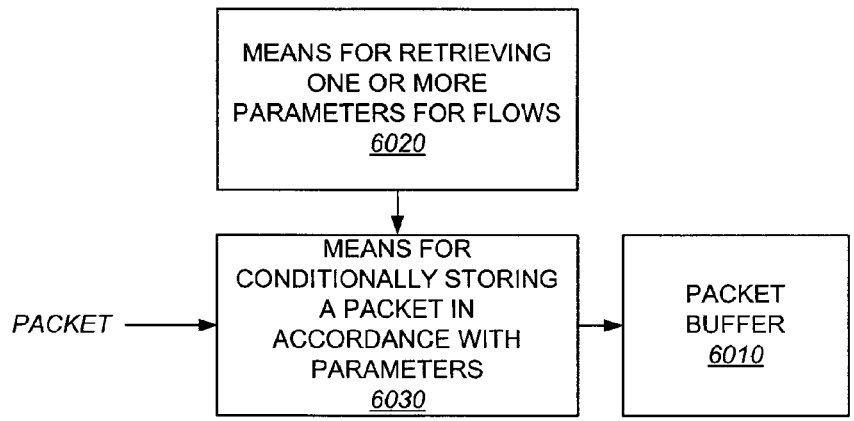
FIG. 60 illustrates aspects of ingress policing.

FIG. 60 illustrates aspects of ingress policing. FIG. 60 comprises a packet buffer 6010; means for retrieving 6020 one or more parameters for each of a plurality of flows; and means for conditionally storing 6030 a packet associated with one of the plurality of flows in the packet buffer in accordance with the one or more retrieved parameters.

Figure 61:
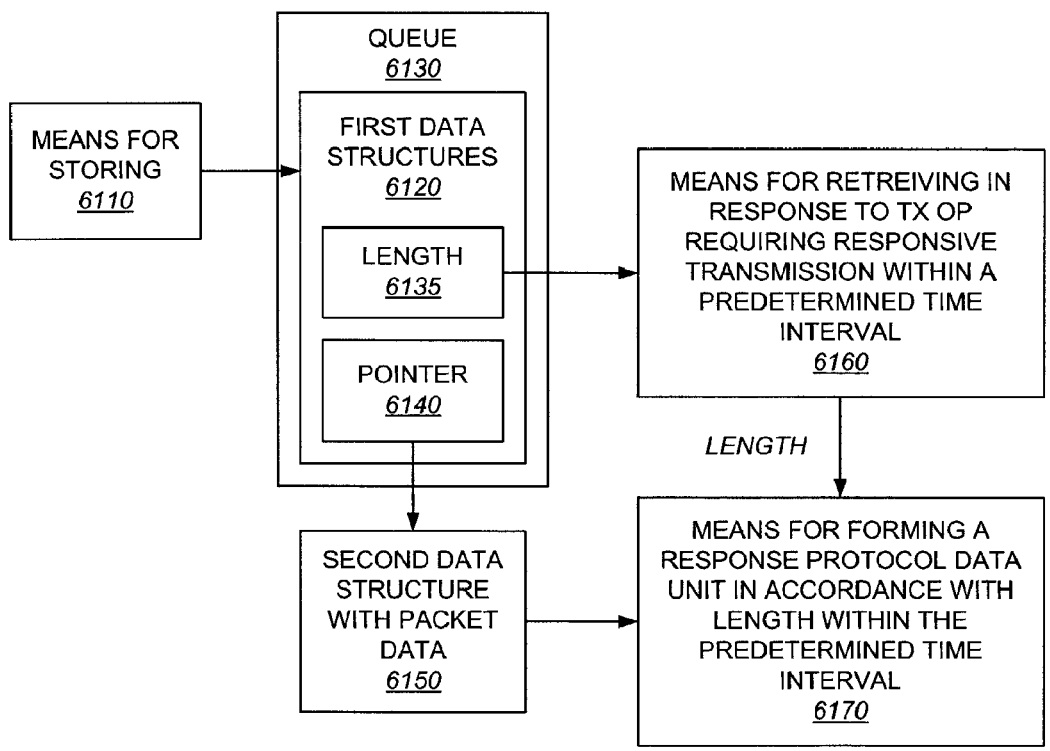
FIG. 61 illustrates aspects of media access control for low-latency response.

FIG. 61 illustrates aspects of media access control for low-latency response. FIG. 61 comprises means for storing 6110 one or more first data structures 6120 in a queue 6130, wherein each first data structure comprises a length field 6135 of a respective associated packet and a pointer 6140 to a second data structure 6150, the second data structure comprising at least a portion of the respective associated packet data; means 6160 for retrieving one or more length values from the length field of one or more of the first data structures in the queue in response to a transmit opportunity requiring a responsive transmission within a predetermined time interval; and means 6170 for forming a response protocol data unit within the predetermined time interval, the protocol data unit comprising a protocol data unit length value determined in accordance with the at least one length value within the predetermined time interval.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   storing in a first data structure in a packet buffer the length of a first packet, the sequence number of the first packet, and a second packet buffer location of a second data structure in the packet buffer; and
   storing data from the first packet in the second data structure identified by the stored second packet buffer location.

2. The method of claim 1, further comprising:
   storing in a third data structure in the packet buffer the length of a second packet, the sequence number of the second packet, and a fourth packet buffer location of a fourth data structure in the packet buffer;
   storing data from the second packet in the fourth data structure identified by the stored fourth packet buffer location; and
   storing the location of the third data structure in the first data structure.

3. The method of claim 1, further comprising forming a packet queue by storing a linked list of a plurality of first data structures, each first data structure associated with one of a plurality of packets.

4. The method of claim 1, further comprising forming an array of first data structures, each first data structure associated with one of a plurality of packets.

5. The method of claim 1, further comprising forming a free first data structure pointer list, the free first data structure pointer list comprising one or more first data structure pointers for associating with a first data structure.

6. The method of claim 5, further comprising:
   retrieving a first data structure pointer from the free first data structure pointer list;
   removing the retrieved first data structure pointer from the free first data structure pointer list; and
   storing the first data structure in the packet buffer at a location identified by the retrieved first data structure pointer.

7. The method of claim 5, further comprising adding a previously removed first data structure pointer to the free first data structure pointer list to remove the first data structure from the packet buffer.

8. The method of claim 1, further comprising forming a free second data structure pointer list, the free second data structure pointer list comprising one or more pointers for associating with the second data structure.

9. The method of claim 8, further comprising:
retrieving a second data structure pointer from the free second data structure pointer list;
removing the retrieved second data structure pointer from the free second data structure pointer list; and
storing the retrieved second data structure pointer in the second packet buffer location of the first data structure.

10. The method of claim 9, further comprising storing the second data structure in the packet buffer at a location identified by the retrieved second data structure pointer.

11. The method of claim 8, further comprising adding a previously removed second data structure pointer to the free second data structure pointer list to remove the second data structure from the packet buffer.

12. The method of claim 11, wherein the second packet buffer location of the second data structure in the packet buffer is stored in a second data structure pointer field of the first data structure, and further comprising retrieving a second data structure from the packet buffer, the second data structure identified by the second data structure pointer field of the first data structure.

13. The method of claim 1, wherein the first and second data structures are distinct from each other.

14. The method of claim 1, further comprising partitioning a payload of the first packet into a plurality of payload chunks.

15. The method of claim 14, wherein the storing comprises storing each of the plurality of payload chunks from the first packet in the second data structure identified by the stored second packet buffer location.

16. The method of claim 15, wherein the second data structure includes a plurality of nodes with each node storing one of the plurality of payload chunks.

17. An apparatus comprising:
means for storing in a first data structure in a packet buffer the length of a first packet, the sequence number of the first packet, and a second packet buffer location of a second data structure in the packet buffer; and
means for storing data from the first packet in the second data structure identified by the stored second packet buffer location.

18. The apparatus of claim 14, further comprising:
means for storing in a third data structure in the packet buffer the length of a second packet, the sequence number of the second packet, and a fourth packet buffer location of a fourth data structure in the packet buffer;
means for storing data from the second packet in the fourth data structure identified by the stored fourth packet buffer location; and
means for storing the location of the third data structure in the first data structure.

19. The apparatus of claim 14, further comprising means for forming a packet queue by storing a linked list of a plurality of first data structures, each first data structure associated with one of a plurality of packets.

20. The apparatus of claim 14, further comprising means for forming an array of first data structures, each first data structure associated with one of a plurality of packets.

21. The apparatus of claim 17, further comprising means for partitioning a payload of the first packet into a plurality of payload chunks, wherein the means for storing comprise means for storing each of the plurality of payload chunks from the first packet in the second data structure identified by the stored second packet buffer location, and wherein the second data structure includes a plurality of nodes with each node storing one of the plurality of payload chunks.

22. An apparatus comprising:
a first memory,
configured in a first mode to store one or more parameters for each of a plurality of communication flows and
configured in a second mode to store a pointer for each of the plurality of communication flows, each pointer indicating a location associated with the respective communication flow;
a second memory,
configured in the first mode to store packets for each of the plurality of communication flows and
configured in the second mode to store a plurality of sets of one or more parameters for each of the plurality of communication flows, each set of one or more parameters stored in the location indicated by the pointer associated with the respective communication flow;
a memory interface operable with a third memory,
configured in the second mode to be operative to store packets for each of the plurality of communication flows; and
a processor selecting a selected mode as the first mode or the second mode, configuring the first memory according to the selected mode, configuring the second memory according to the selected mode, and configuring the memory interface according to the selected mode.

23. The apparatus of claim 22, wherein the second memory, when configured in the first mode, comprises a packet buffer, the packet buffer comprising:
a first data structure associated with a packet; and
a second data structure comprising data from the associated packet; and
wherein the first data structure comprises:
a length field indicating the length of the associated packet;
a sequence number field indicating the sequence number of the associated packet; and
a second data structure pointer field indicating the location in the packet buffer of the second data structure.

24. The apparatus of claim 23, further wherein the memory interface, when configured in the second mode, is operable to store packets in a packet buffer in the third memory, the memory interface for storing:
a first data structure associated with a packet; and
a second data structure comprising data from the associated packet; and
wherein the first data structure comprises:
a length field indicating the length of the associated packet;
a sequence number field indicating the sequence number of the associated packet; and
a second data structure pointer field indicating the location in the packet buffer of the second data structure.

25. A wireless communication device comprising:
a first integrated circuit, comprising:
a first memory,
configured in a first mode to store one or more parameters for each of a plurality of communication flows and
configured in a second mode to store a pointer for each of the plurality of communication flows, each pointer indicating a location associated with the respective communication flow;
a second memory,
configured in the first mode to store packets for each of the plurality of communication flows and
configured in the second mode to store a plurality of sets of one or more parameters for each of the plurality of communication flows, each set of one or more parameters stored in the location indicated by the pointer associated with the respective communication flow;
a memory interface operable with a third memory,
configured in the second mode to be operative to store packets for each of the plurality of communication flows; and
a processor selecting a selected mode as the first mode or the second mode, configuring the first memory according to the selected mode, configuring the second memory according to the selected mode, and configuring the memory interface according to the selected mode; and
a second integrated circuit comprising a third memory storing packets for each of the plurality of communication flows, coupled with the memory interface of the first integrated circuit.

26. A wireless communication device comprising:
a first memory storing one or more parameters for each of a plurality of communication flows; and
a second memory storing packets for each of the plurality of communication flows, comprising:
a first data structure associated with a packet; and
a second data structure comprising data from the associated packet; and
wherein the first data structure comprises:
a length field indicating the length of the associated packet;
a sequence number field indicating the sequence number of the associated packet; and
a second data structure pointer field indicating the location in the second memory of the second data structure.

27. The wireless communication device of claim 26, wherein the first data structure further comprises a next first data pointer field indicating the location in the second memory or a second first data structure.

28. The wireless communication device of claim 27, further comprising a packet queue of a plurality of packets, the queue formed by a linked list of a plurality of first data structures, each first data structure associated with one of the plurality of packets, the order of the queue determined by linking each of the plurality of first data structures in the linked list in accordance with the next first data pointer field of each respective first data structure.

29. The wireless communication device of claim 26, wherein the second data structure comprises a plurality of partitioned payload chunks from the associated packet, wherein each of the partitioned payload chunks are stored in separate nodes of the second data structure.

30. A non-transitory computer-readable storage medium including instructions stored thereon, the instructions comprising:
instructions for selecting a first or a second mode;
instructions for configuring a first memory in the first mode to store one or more parameters for each of a plurality of communication flows;
instructions for configuring the first memory in the second mode to store a pointer for each of the plurality of communication flows, each pointer indicating a location associated with the respective communication flow;
instructions for configuring a second memory in the first mode to store packets for each of the plurality of communication flows;
instructions for configuring the second memory in the second mode to store a plurality of sets of one or more parameters for each of the plurality of communication flows, each set of one or more parameters stored in the location indicated by the pointer associated with the respective communication flow; and
instructions for configuring a memory interface operable with a third memory in the second mode to be operative to store packets for each of the plurality of communication flows.

31. A non-transitory computer-readable storage medium including instructions stored thereon, the instructions comprising:
instructions for storing in a first data structure in a packet buffer the length of a first packet, the sequence number of the first packet, and a second packet buffer location of a second data structure in the packet buffer; and
instructions for storing data from the first packet in the second data structure identified by the stored second packet buffer location.

32. The non-transitory computer-readable storage medium of claim 31, wherein the instructions further comprise instructions for partitioning a payload of the first packet into a plurality of payload chunks, wherein the instructions for storing the data from the first packet comprise instructions for storing each of the plurality of payload chunks from the first packet in the second data structure identified by the stored second packet buffer location, and wherein the second data structure includes a plurality of nodes with each node storing one of the plurality of payload chunks.

33. An apparatus for memory management, comprising:
means for storing in a first memory, in a first mode, one or more parameters for each of a plurality of communication flows and
for storing, in a second mode, a pointer for each of the plurality of communication flows, each pointer indicating a location associated with the respective communication flow;
means for storing in a second memory,
in the first mode, packets for each of the plurality of communication flows and
in the second mode, a plurality of sets of one or more parameters for each of the plurality of communication flows, each set of one or more parameters stored in the location indicated by the pointer associated with the respective communication flow;
means for a memory interface operable with a means for storing in a third memory,
in the second mode, to store packets for each of the plurality of communication flows; and
a processor means for selecting a selected mode as the first mode or the second mode, configuring the first memory according to the selected mode, configuring the second memory according to the selected mode, and configuring the memory interface according to the selected mode.

* * * * *